US012561205B2

(12) United States Patent
Crafton et al.

(10) Patent No.: US 12,561,205 B2
(45) Date of Patent: Feb. 24, 2026

(54) BIT ERROR DETECTION IN A COMPUTE-IN-MEMORY SYSTEM, METHOD OF OPERATING SAME, AND METHOD OF MANUFACTURING SAME

(71) Applicant: TAIWAN SEMICONDUCTOR MANUFACTURING COMPANY, LTD., Hsinchu (TW)

(72) Inventors: Brian Crafton, Hsinchu (TW); Xiaoyu Sun, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/618,207

(22) Filed: Mar. 27, 2024

(65) Prior Publication Data

US 2025/0208952 A1 Jun. 26, 2025

Related U.S. Application Data

(60) Provisional application No. 63/613,201, filed on Dec. 21, 2023.

(51) Int. Cl.
*G06F 11/10* (2006.01)
*G06F 11/07* (2006.01)
(52) U.S. Cl.
CPC ...... *G06F 11/1072* (2013.01); *G06F 11/0772* (2013.01); *G06F 11/1016* (2013.01)

(58) Field of Classification Search
CPC ............. G06F 11/1072; G06F 11/0772; G06F 11/1016
See application file for complete search history.

(56) References Cited

U.S. PATENT DOCUMENTS

| | | | |
|---|---|---|---|
| 5,761,221 A | 6/1998 | Baat et al. | |
| 5,898,868 A | 4/1999 | Krueger et al. | |
| 6,480,982 B1 | 11/2002 | Chan et al. | |
| 2007/0230813 A1* | 10/2007 | Yamamoto | G09G 3/298 382/252 |

(Continued)

FOREIGN PATENT DOCUMENTS

| | | |
|---|---|---|
| TW | 202209318 | 3/2022 |
| WO | 2016135500 | 9/2016 |

*Primary Examiner* — Thien Nguyen
(74) *Attorney, Agent, or Firm* — Hauptman Ham, LLP

(57) ABSTRACT

A compute-in-memory memory (CIM) system includes: in a first region of a semiconductor die, first components including memory cells correspondingly configured to store single bits, and arrays including multipliers and first bit-error detectors; first ones of the memory cells being arranged in corresponding first arrays and being configured to store first bits; second ones of the memory cells being arranged in corresponding second arrays and being configured to store parity bits corresponding to the first bits; and for first groups each of which including a corresponding one of the first arrays, the second arrays, the multipliers and the first bit-error detectors, the multiplier being configured to perform a multiplication of input bits and corresponding ones of the first bits, and the first bit-error detector being configured to perform a detection of a bit-error in the corresponding first bits based on the corresponding parity bits.

20 Claims, 26 Drawing Sheets

(56)             References Cited

U.S. PATENT DOCUMENTS

| | | | |
|---|---|---|---|
| 2009/0094489 A1* | 4/2009 | Seh ..................... | G06F 11/1004 |
| | | | 714/E11.03 |
| 2015/0161005 A1 | 6/2015 | Casper et al. | |
| 2020/0104205 A1* | 4/2020 | Noguchi ................ | G11C 29/42 |
| 2023/0333814 A1 | 10/2023 | Tsai et al. | |

* cited by examiner

104B, Weight & Parity Array

120(0)
2D Weight Sub-Array

122(0)
1D
Parity
Sub-Array

118(0), Slice of Weight & Parity Array

...

120(Q-1)
2D Weight Sub-Array

122(Q-1)
1D
Parity
Sub-Array

118(Q-1), Slice of Weight & Parity Array

Y-axis

X-axis

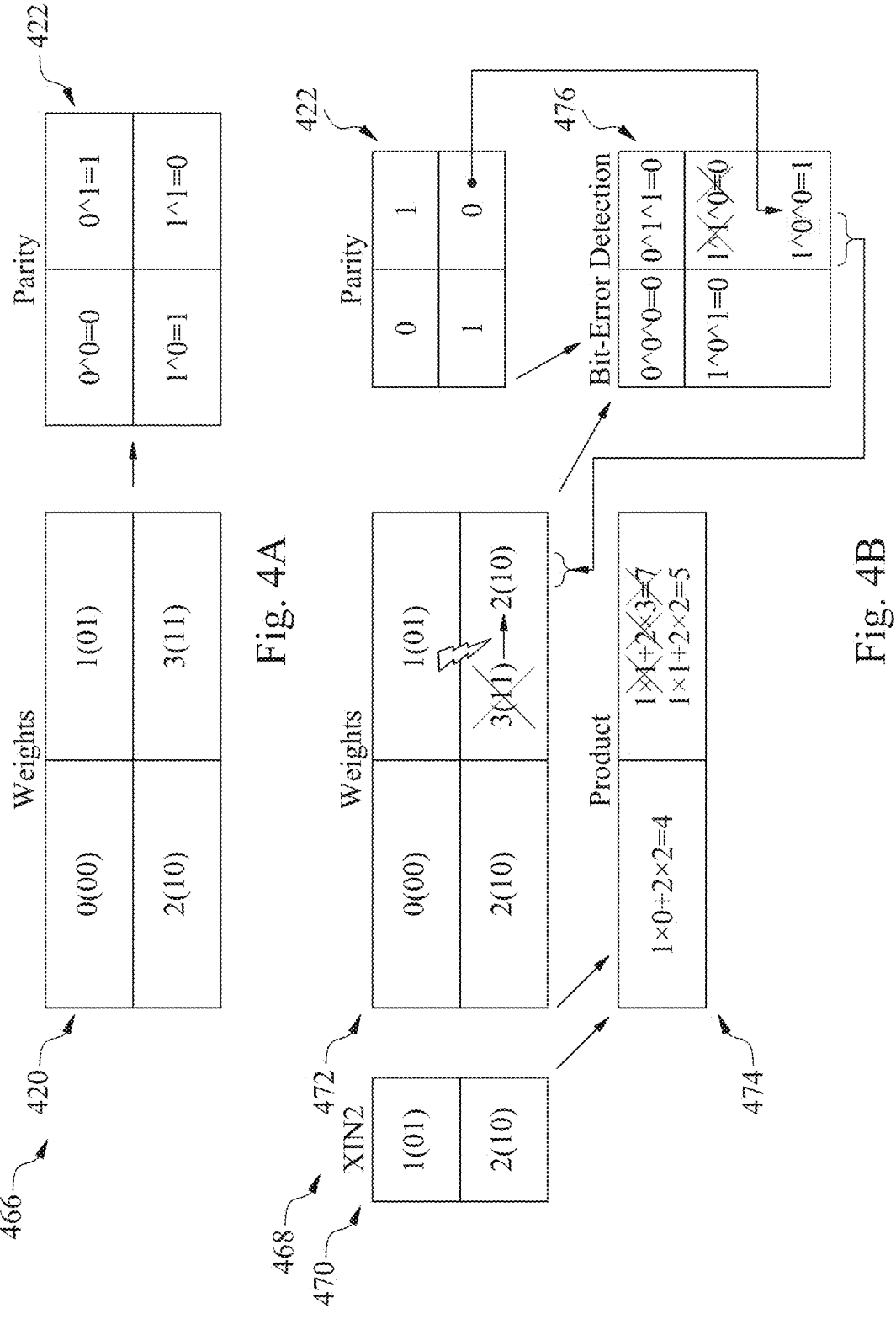

484(4), Localization:

Determine Intersection of:
Row having error
and
Column having error

484(5), Correction:

$\Delta = 15 - (4 + 10)$
$C2'[1][1] = C2[1][1] + \Delta$

484(3)D
Col. of Row_Sum
?=?
Col. of R_ChkSum_2
?

$\longrightarrow$ Row-Error

1. $4+10 \neq 15$
2. $11+24=35$
3. $16+34=50$

484(3)E
Row of Col_Sum
?=?
Row of C_ChkSum_2
?

$\longrightarrow$ Col-Error

1. $4+11 \neq 16$
2. $10+24=34$
3. $15+35=50$

500

502
Generate layout diagram

504
Manufacture semiconductor device
based on layout diagram

Figure 5C:
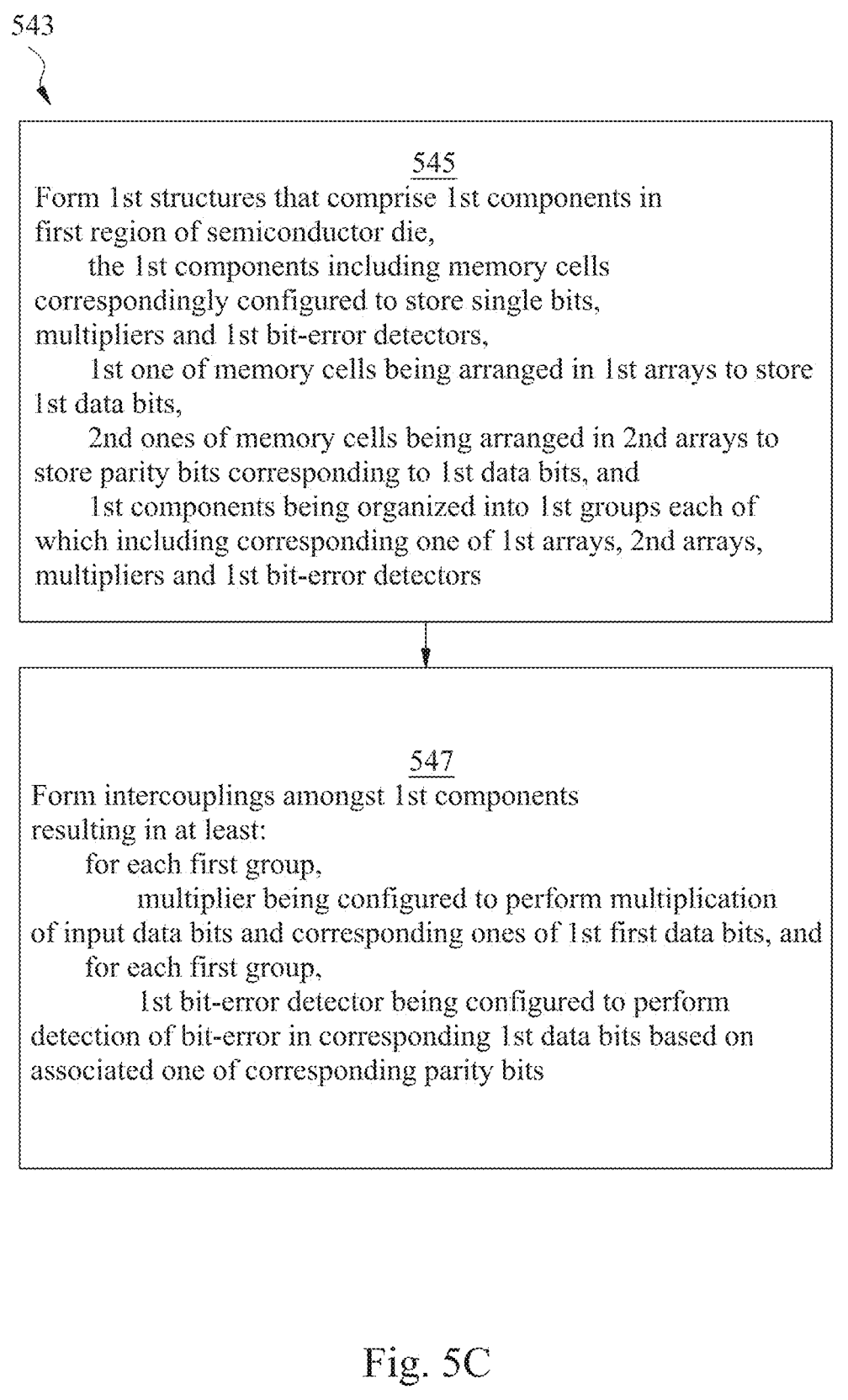

543

545
Form 1st structures that comprise 1st components in
first region of semiconductor die, the 1st components including memory cells
correspondingly configured to store single bits,
multipliers and 1st bit-error detectors, 1st one of memory cells being arranged in 1st arrays to store
1st data bits, 2nd ones of memory cells being arranged in 2nd arrays to
store parity bits corresponding to 1st data bits, and 1st components being organized into 1st groups each of
which including corresponding one of 1st arrays, 2nd arrays,
multipliers and 1st bit-error detectors

547
Form intercouplings amongst 1st components
resulting in at least:

for each first group, multiplier being configured to perform multiplication
of input data bits and corresponding ones of 1st first data bits, and for each first group, 1st bit-error detector being configured to perform
detection of bit-error in corresponding 1st data bits based on
associated one of corresponding parity bits

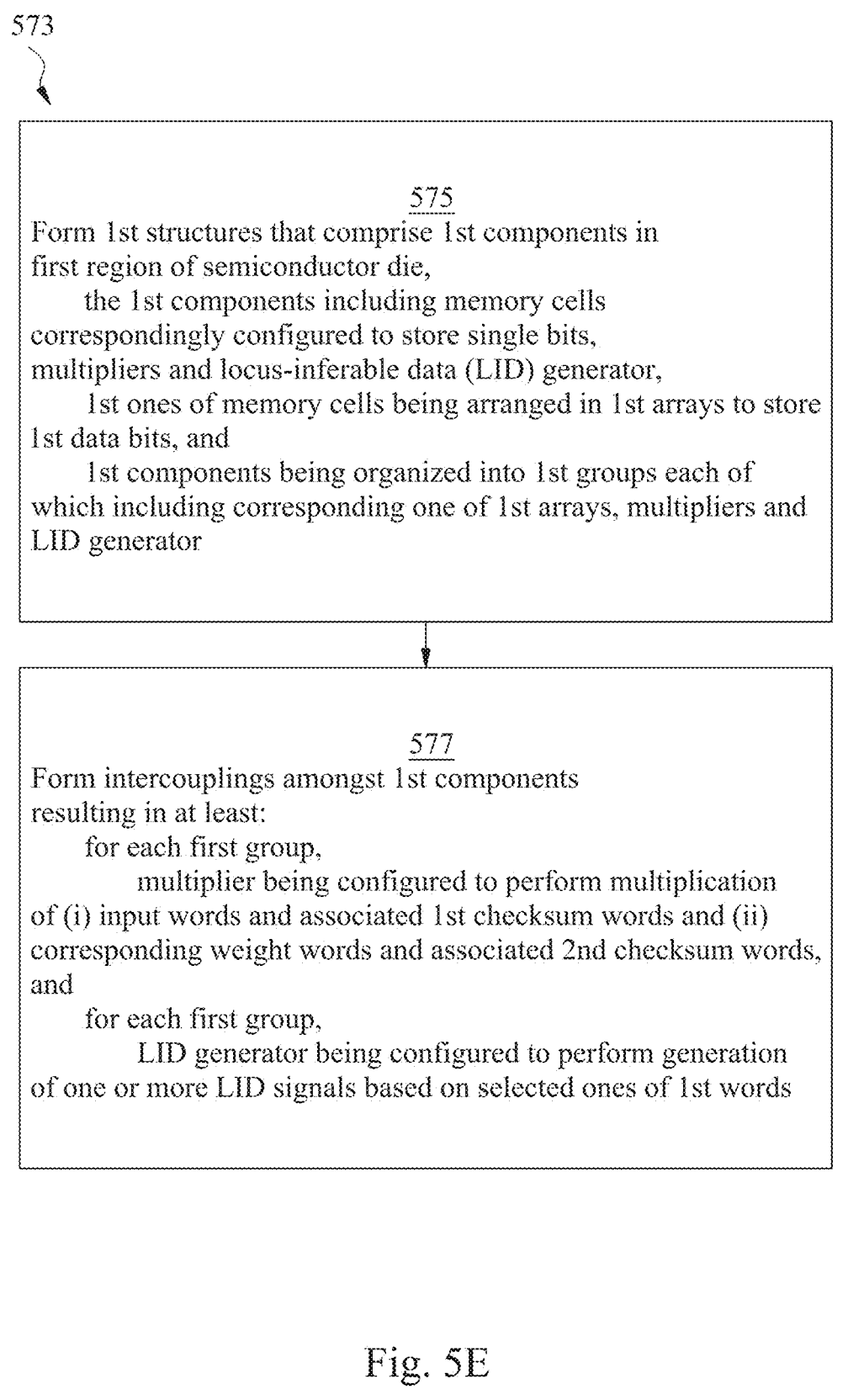

575
Form 1st structures that comprise 1st components in
first region of semiconductor die,
    the 1st components including memory cells
correspondingly configured to store single bits,
multipliers and locus-inferable data (LID) generator,
    1st ones of memory cells being arranged in 1st arrays to store
1st data bits, and
    1st components being organized into 1st groups each of
which including corresponding one of 1st arrays, multipliers and
LID generator

577
Form intercouplings amongst 1st components
resulting in at least:
    for each first group,
        multiplier being configured to perform multiplication
of (i) input words and associated 1st checksum words and (ii)
corresponding weight words and associated 2nd checksum words,
and
    for each first group,
        LID generator being configured to perform generation
of one or more LID signals based on selected ones of 1st words

Fig. 5E

BIT ERROR DETECTION IN A COMPUTE-IN-MEMORY SYSTEM, METHOD OF OPERATING SAME, AND METHOD OF MANUFACTURING SAME

PRIORITY

The present application claims the priority of U.S. Provisional Application No. 63/613,201, filed Dec. 21, 2023, which is incorporated herein by reference in its entirety.

BACKGROUND

The semiconductor integrated circuit (IC) industry produces a wide variety of analog and digital devices to address issues in a number of different areas. Developments in semiconductor process technology nodes have progressively reduced component sizes and tightened spacing resulting in progressively increased transistor density. ICs have become smaller.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIGS. 4A-4G are block diagrams, in accordance with some embodiments.

FIGS. 5A-5E are flowcharts of corresponding methods, in accordance with some embodiments.

DETAILED DESCRIPTION

Figure 1A:
FIGS. 1A and 1C-1E are functional block diagrams of systems, in accordance with some embodiments.
Figure 1A:
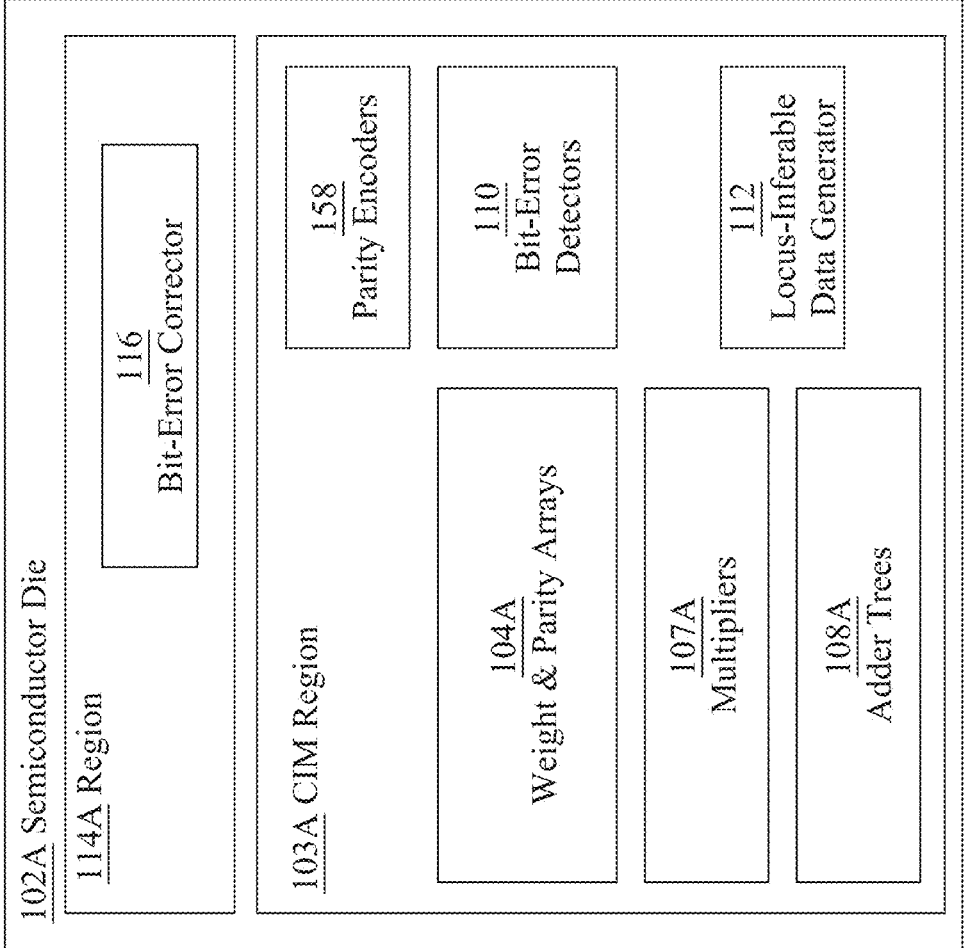

The following disclosure discloses many different embodiments, or examples, for implementing different features of the subject matter. Examples of components, materials, values, steps, operations, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are in indirect contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein are likewise interpreted accordingly. In some embodiments, the term standard cell structure refers to a standardized building block included in a library of various standard cell structures. In some embodiments, various standard cell structures are selected from a library thereof and are used as components in a layout diagram representing a circuit.

In some embodiments, a first compute-in-memory memory (CIM) system includes, in a first region of a first semiconductor die, first components including memory cells correspondingly configured to store single bits, and arrays including multipliers and first bit-error detectors. First ones of the memory cells are arranged in corresponding first arrays and are configured to store first bits. Second ones of the memory cells are arranged in corresponding second arrays and are configured to store parity bits corresponding to the first bits. For first groups each of which including a corresponding one of the first arrays, the second arrays, the multipliers and the first bit-error detectors: the multiplier is configured to perform a multiplication of input bits and corresponding ones of the first bits; and the first bit-error detector is configured to perform a detection of a bit-error in the corresponding first bits based on the corresponding parity bits. In some embodiments, an instance of the bit-error detector is configured to detect the existence of a bit-error and generate a signal indicative of the same. e.g., generate a Flag FLG1 of FIG. 2A, or the like, where flag FLG1 is assertable to indicate that a bit-error is present. In some embodiments, the first CIM system is included as a part of an artificial intelligence (AI) system. According to another approach which is a counterpart to the first CIM system, bit-error detection of a bit-error in a memory counterpart to the first array is performed before multiplication is performed (pre-multiplication detection). Performing bit-error detection before multiplication according to the other approach uses two operation cycles. By contrast, the inclusion of the first bit-error detector $210(Q-1)$ to perform bit-error detection in parallel with the multiplication performed by the multiplier according to at least some embodiments of the first CIM system uses one operation cycle, which is one operation cycle faster as compared to the other approach.

In some embodiments, a second CIM system includes, in a second region of a second semiconductor die, first components including memory cells correspondingly configured to store words, multipliers and a locus-inferable data generator. First ones of the memory cells are arranged in first arrays and are configured to store first words. For first groups each of which include a corresponding one of each of the first array and the multipliers, and the locus-inferable data generator, and each of the first groups operating in relation to corresponding ones of the first words: the multiplier is configured to generate the first words of the first array by performing one or more multiplications of (A) input words and associated first checksum words and (B) corresponding weight words and associated second checksum words, and the locus-inferable data generator is configured to perform generation of one or more bit-error locus-inferable signals based on selected ones of the first words, where bit-error locus-inferable signals are used to infer a location of a bit-error, e.g., a memory cell at the intersection of an identified row and an identified column in an array. Examples of bit-error locus-inferable signals according to the second CIM system include a row sum vector (e.g., Row_Sum 304J FIG. 3J), a column sum vector (e.g., Col_ Sum 304L FIG. 3L), or the like. In some embodiments, the second CIM system is included as a part of an AI system. According to another approach which is a counterpart to the second CIM system, (1) a weight array is stored in a first region of a first die, and (2) bit-error detection, localization and correction (DLC) is performed entirely by a processor and associated random access memory (RAM) which correspondingly are on at least a second die. To perform the bit-error DLC according to the other approach, substantial amounts of data are transferred from the weight array on the first die to the processor on the second die (off-die transfer) which incurs substantial transfer delays and thus substantially reduces the speed to bit-error DLC according to the other approach. By contrast, at least some embodiments of the second CIM system substantially reduce the amount of off-die transfer associated with bit-error detection, localization and correction (DLC) as compared to the other approach and thus achieve substantially faster bit-error DLC as compared to the other approach.

FIG. 1A is a functional block diagram of a digital compute-in-memory (CIM) system 100A, in accordance with some embodiments.

In FIG. 1A, CIM system 100A includes a semiconductor die 102A, the latter including at least a CIM region 103A and a second region 114A. Components (see FIGS. 2A-2C, 4A-4B, or the like) of CIM region 103A include: Weight & Parity (W&P) array 104A; multipliers 107A; adder trees 108A; bit-error detectors 110; locus-inferable data generator 112; and parity encoders 158. Region 114A includes a bit-error corrector 116 (see FIG. 2D). In some embodiments, region 114A is a processor and bit-error corrector 116 represents a function performed by the processor. In some embodiments, an instance of bit-error detector 110 is configured to detect the existence of a bit-error and generate a signal indicative of the same. e.g., generate Flag FLG1 of FIG. 2A, or the like, where flag FLG1 is assertable to indicate that a bit-error is present. Locus-inferable data generator 112 is configured to generate one or more bit-error locus-inferable signals which are used to infer a location of a bit-error, e.g., a memory cell at the intersection of an identified row and an identified column in an array. In some embodiments, examples of bit-error locus-inferable signals include a pointer signal (pointer) EPT of FIG. 2C and a flag signal (flag) FLG2 of FIG. 2C, or the like. In some embodiments, CIM system 100A is included as a part of an AI system.

Because bit-error detectors 110 and locus-inferable data generator 112 are in the same region, i.e., CIM region 103A of the same die as the other components of CIM region 103A, the components of CIM region 103A are more physically proximal to each other than if bit-error detectors 110 and locus-inferable data generator 112 were on a different die than the other components of CIM region 103A. The increased proximity of the components of CIM region 103A with respect to each other facilitates advantages including increased speeds of operation, e.g., faster bit-error detection by detectors 110 and faster generation of locus-inferable data by generator 112.

Figure 1B:
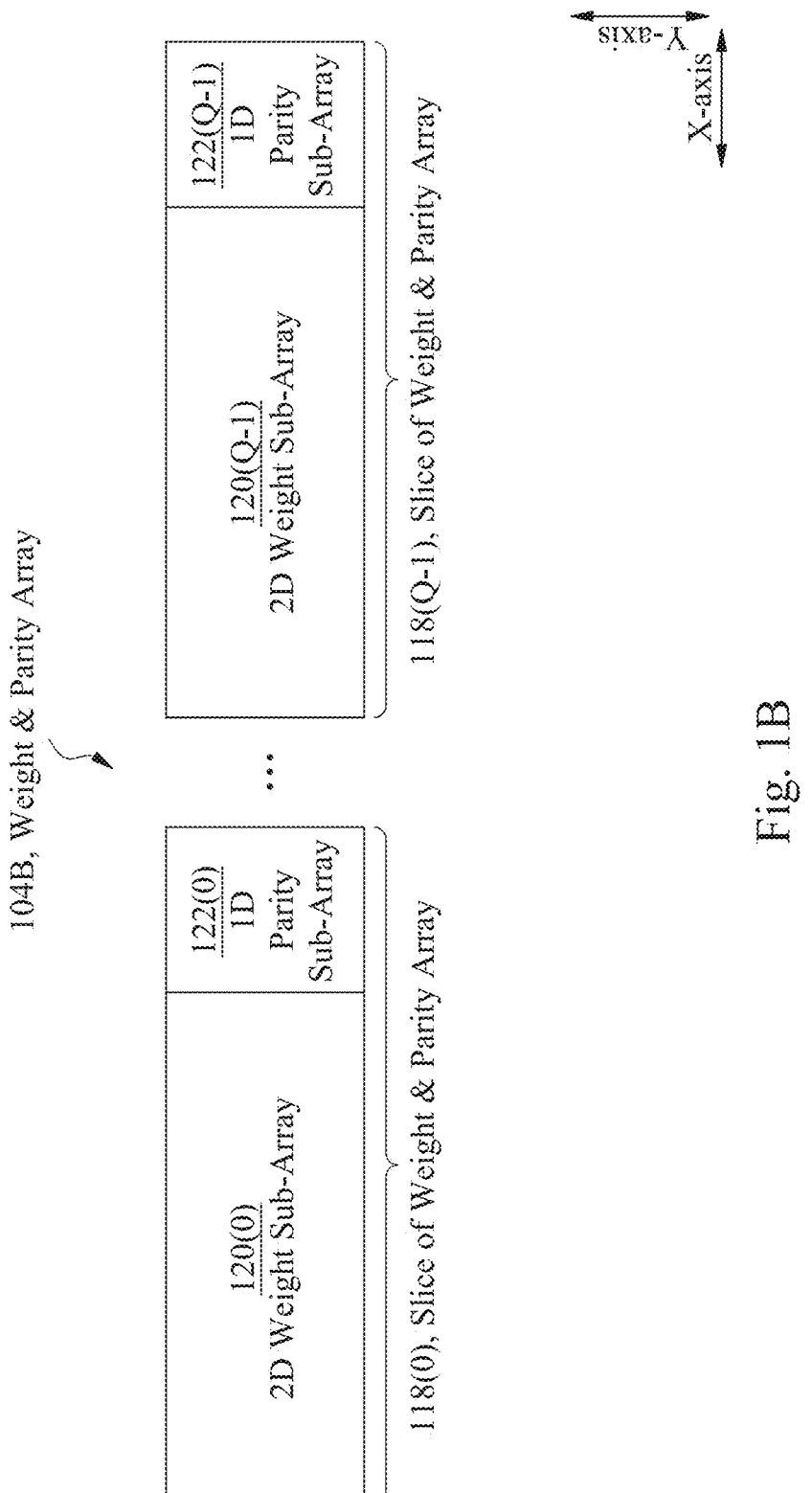
FIG. 1B is a functional block diagram of a memory arrangement, in accordance with some embodiments.

FIG. 1B is a functional block diagram of a W&P array 104B, in accordance with some embodiments.

In some embodiments, W&P array 104B is an example of W&P array 104A of FIG. 1A, or the like. W&P array 104B is organized into N rows (see FIG. 2A) and Q slices 118(0)-118(Q-1), where N and Q are corresponding positive integers. Each row in W&P array 104B has corresponding segments in slices 118(0)-118(Q-1). Each of slices 118(0)- 118(Q-1) includes corresponding first and second sub-arrays. Regarding slice 118(0), the first sub-array is a two-dimensional (2D) weight bits array 120(0) and a one-dimensional (1D) parity bits array 122(0). Regarding slice 118(Q-1), the first sub-array is a 2D weight bits array 120(Q-1) (see FIG. 2A) and a 1D parity bits array 122(Q-1) (see FIG. 2A). In some embodiments, each of parity bits 122(0)-122(Q-1) is a 2D array.

Figure 1C:
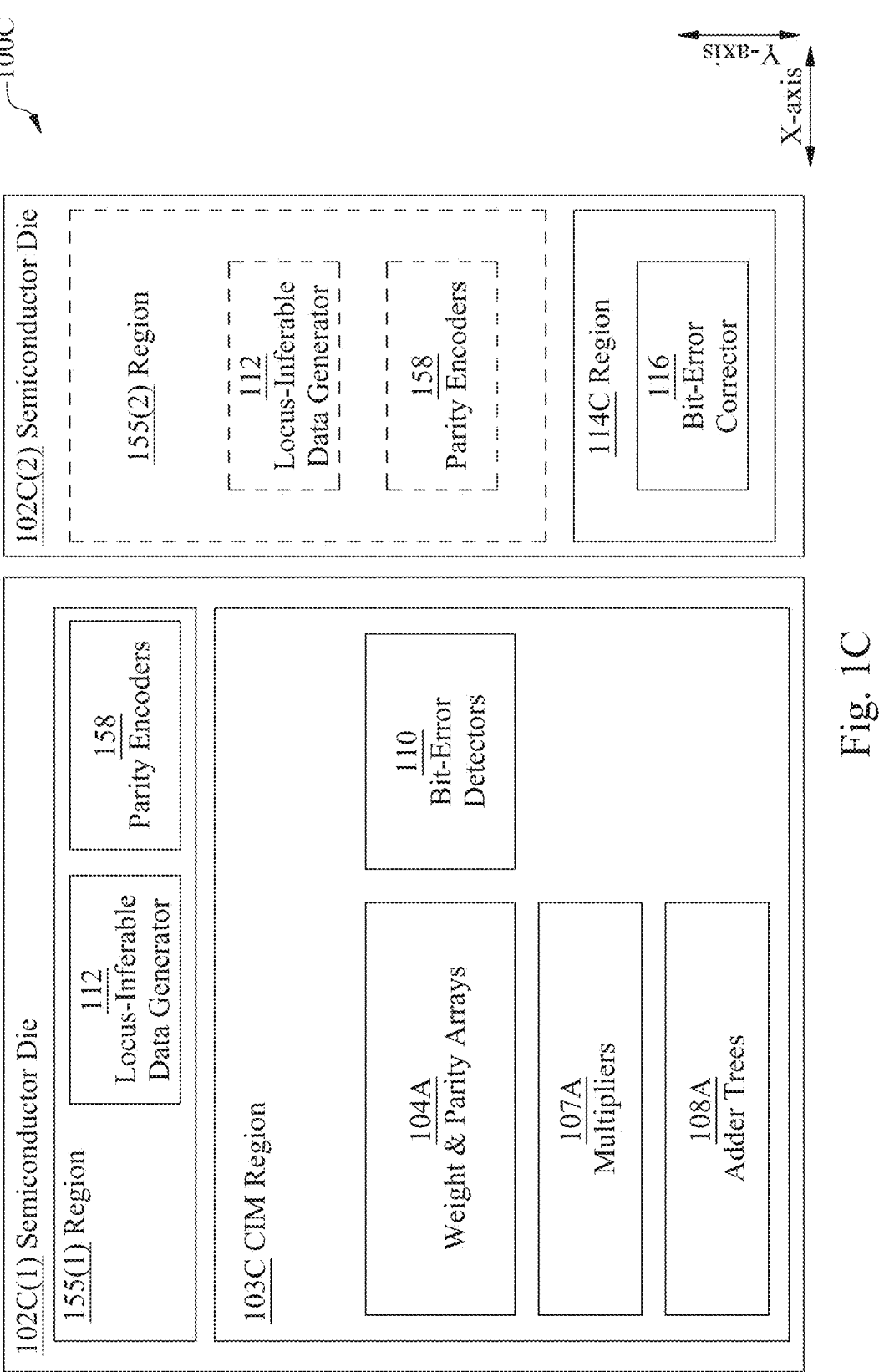

FIG. 1C is a functional block diagram of a digital CIM system 100C, in accordance with some embodiments.

CIM system 100C is similar to CIM system 100A of FIG. 1A. For brevity, the discussion will focus on differences of CIM system 100C as compared to CIM system 100A rather than on similarities.

In FIG. 1C, CIM system 100C includes two semiconductor dies, namely a first semiconductor die 102C(1) and a second semiconductor die 102C(2), whereas CIM system 100A includes one die 102A. Die 102C(1) includes at least a CIM region 103C and a region 155(1). Die 102C(2) includes regions 155(2) and 114C. In some embodiments, CIM system 100C is included as a part of an AI system.

CIM region 103C and die 102C(1) of FIG. 1C are corresponding counterparts to CIM region 103A and die 102A of FIG. 1A. However, parity encoders 158 and locus-inferable data generators 112 are included in region 155(1) of CIM system 100C rather than in CIM region 103A, which is a difference relative to CIM system 100A. In some embodiments, as indicated by phantom lines (dashed lines), one or more of parity encoders 158 or locus-inferable data generator 112 are/is included in a region 155(2) of die 102C(2) rather than in CIM region 103C of die 102C(1), which is another difference relative to CIM system 100A.

Region 114C of FIG. 1C is a counterpart to region 114A of FIG. 1A. However, region 114C is a region of die 102C(2) rather than being a region of die 102C(1). Accordingly, bit-error corrector 116 is included as a part of die 102C(2) rather than being included as a part of die 102C(1), which is another difference relative to CIM system 100A. In some embodiments, region 114C is a processor and bit-error corrector 116 represents a function performed by the processor.

Because bit-error detectors 110 and locus-inferable data generator 112 are on the same die as CIM region 103C, bit-error detectors 110 and locus-inferable data generator 112 are more physically proximal to the components of CIM region 103C than if bit-error detectors 110 and locus-inferable data generator 112 were on a different die than CIM region 103C. The increased proximity of bit-error detectors 110 and locus-inferable data generator 112 with respect to the components of CIM region 103C facilitates advantages including increased speeds of operation, e.g., faster bit-error detection by detectors 110 and faster generation of locus-inferable data by generator 112.

Figure 1D:
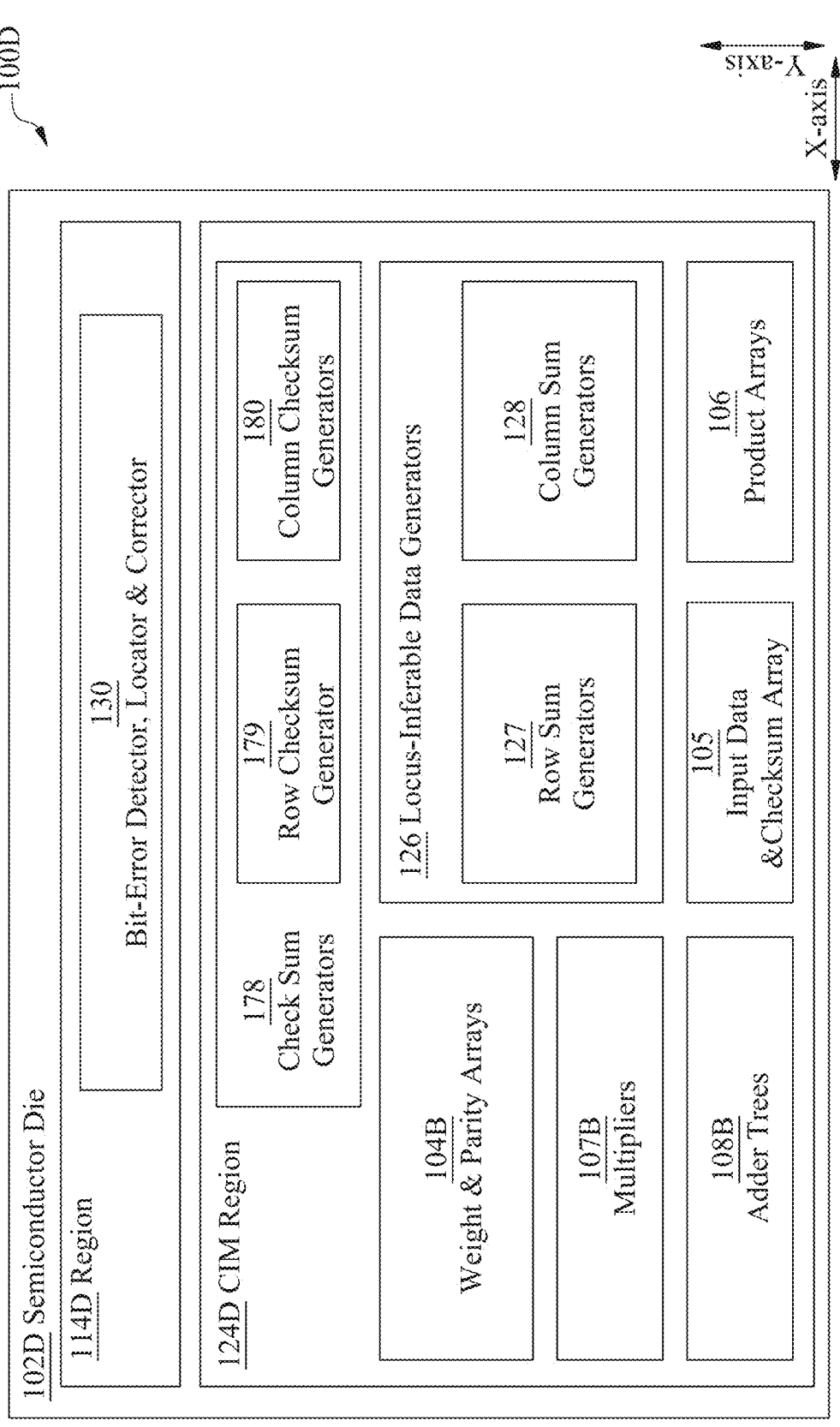

FIG. 1D is a functional block diagram of a digital CIM system 100D, in accordance with some embodiments.

CIM system 100D is similar to CIM system 100A of FIG. 1A. For brevity, the discussion will focus on differences of CIM system 100D as compared to CIM system 100A rather than on similarities.

CIM system 100D includes a semiconductor die 102D, the latter including a CIM region 124D and a region 114D. CIM region 124D and die 102D of FIG. 1D are corresponding counterparts to CIM region 103C and die 102A of FIG. 1A. W&P array 104B, multipliers 107B and adder trees 108B of FIG. 1D (see also FIGS. 3A-3L) are corresponding counterparts to W&P array 104A, multipliers 107A and adder trees 108A of FIG. 1A. Locus-inferable data generators 126 (see FIGS. 3G-3L) are counterparts to locus-inferable data generator 112. However, locus-inferable data generators 126 further include row sum generators 127 (see FIG. 3I) and column sum generators 128 (see FIG. 3K). Locus-inferable data generators 126 are configured to generate bit-error locus-inferable signals which are used to infer a location of a bit-error, e.g., a memory cell at the intersection of an identified row and an identified column in an array. Examples of bit-error locus-inferable signals include a row sum vector (e.g., Row_Sum 304J FIG. 3J), a column sum vector (e.g., Col_Sum 304L FIG. 3L), or the like. In some embodiments, CIM system 100D is included as a part of an AI system.

CIM region 124D further includes in input data bits & checksum bits array 105 (see FIGS. 3A-3C), product arrays 106 (see FIGS. 3G-3H) and checksum generators 178 (see FIGS. 3H-3L). Checksum generators 178 further include row checksum generators 127 (see FIGS. 3A-3C) and column checksum generators 128 (see FIGS. 3D-F).

CIM region 124D does not include counterparts to parity encoders 158 nor bit-error detectors 110. However, region 114D of die 102D includes a bit-error detector, locator & corrector 130 (see FIG. 3M), which is a counterpart to bit-error detectors 110. In some embodiments, region 114D is a processor and bit-error detector, locator & corrector 130 is represented corresponding functions performed by the processor.

Because checksum generators 178 and locus-inferable data generators 126 are in the same region of the same die as the other components of CIM region 124D, the components of CIM region 124D are more physically proximal to each other than if checksum generators 178 and locus-inferable data generators 126 were on a different die than the other components of CIM region 124D. The increased proximity of the components of CIM region 124D with respect to each other facilitates advantages including increased speeds of operation, e.g., faster generation of checksums by generators 178, faster generation of locus-inferable data by generators 126, or the like.

Figure 1E:
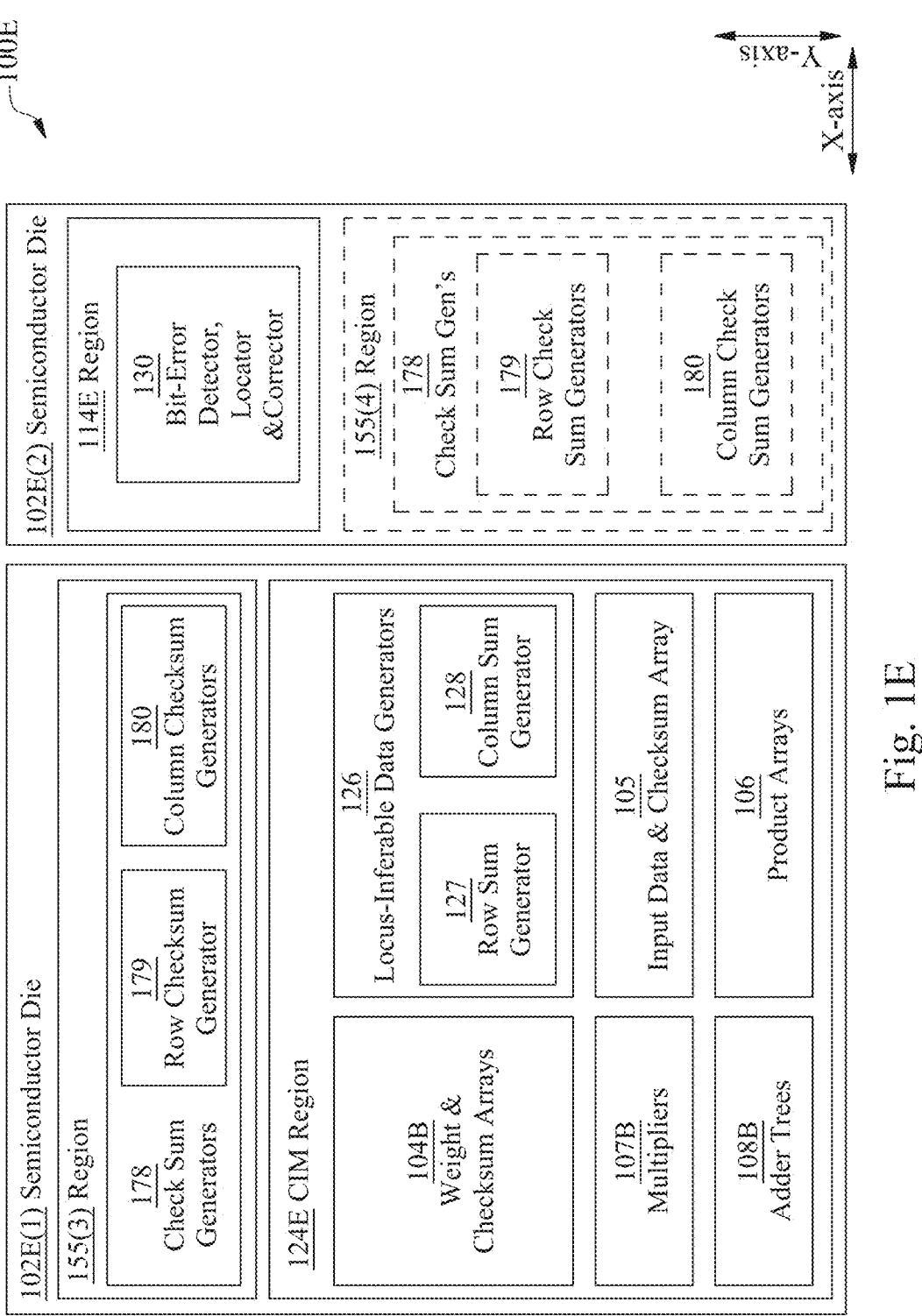

FIG. 1E is a functional block diagram of a digital CIM system 100E, in accordance with some embodiments.

CIM system 100E is similar to CIM system 100D of FIG. 1D. For brevity, the discussion will focus on differences of CIM system 100E as compared to CIM system 100D rather than on similarities.

In FIG. 1E, CIM system 100E includes two semiconductor dies, namely a first semiconductor die 102E(1) and a second semiconductor die 102E(2), whereas CIM system 100D includes one die 102D. Die 102E(1) includes at least a CIM region 124E and a region 155(3). Die 102E(2) includes a region 114E and, in some embodiments, a region 155(4). In some embodiments, CIM system 100E is included as a part of an AI system.

CIM region 124E and die 102E(1) of FIG. 1E are corresponding counterparts to CIM region 124D and die 102D of FIG. 1D. However, checksum generators 178, including row checksum generators 179 and column checksum generators 180, are included in region 114D of CIM system 100E rather than in CIM region 124D, which is a difference relative to CIM system 100D. In some embodiments, as indicated by phantom lines (dashed lines), one or more of checksum generators 178, including row checksum generators 179 and column checksum generators 180, are included in region 155(4) of dies 102E(2) rather than in CIM region 124E of die 102E(1), which is another difference relative to CIM system 100D.

Region 114E of FIG. 1E is a counterpart to region 114D of FIG. 1D. However, region 114E is a region of die 102E(2) rather than being a region of die 102E(1). Accordingly, bit-error detector, corrector & locator 130 is included as a part of die 102E(2) rather than being included as a part of die 102E(1), which is another difference relative to CIM system 100E 100D. In some embodiments, region 114E is a processor and bit-error detector, locator & corrector 130 is represented as corresponding functions performed by the processor.

Because checksum generators 178 are in region 155(3) and thus on the same die as CIM region 124E, checksum generators 178 are more physically proximal to the components of CIM region 124E than if checksum generators 178 were on a different die than CIM region 124E. The increased proximity of checksum generators 178 with respect to the components of CIM region 124E facilitates advantages including increased speeds of operation, e.g., faster generation of checksums by generators 178.

Figure 2A:
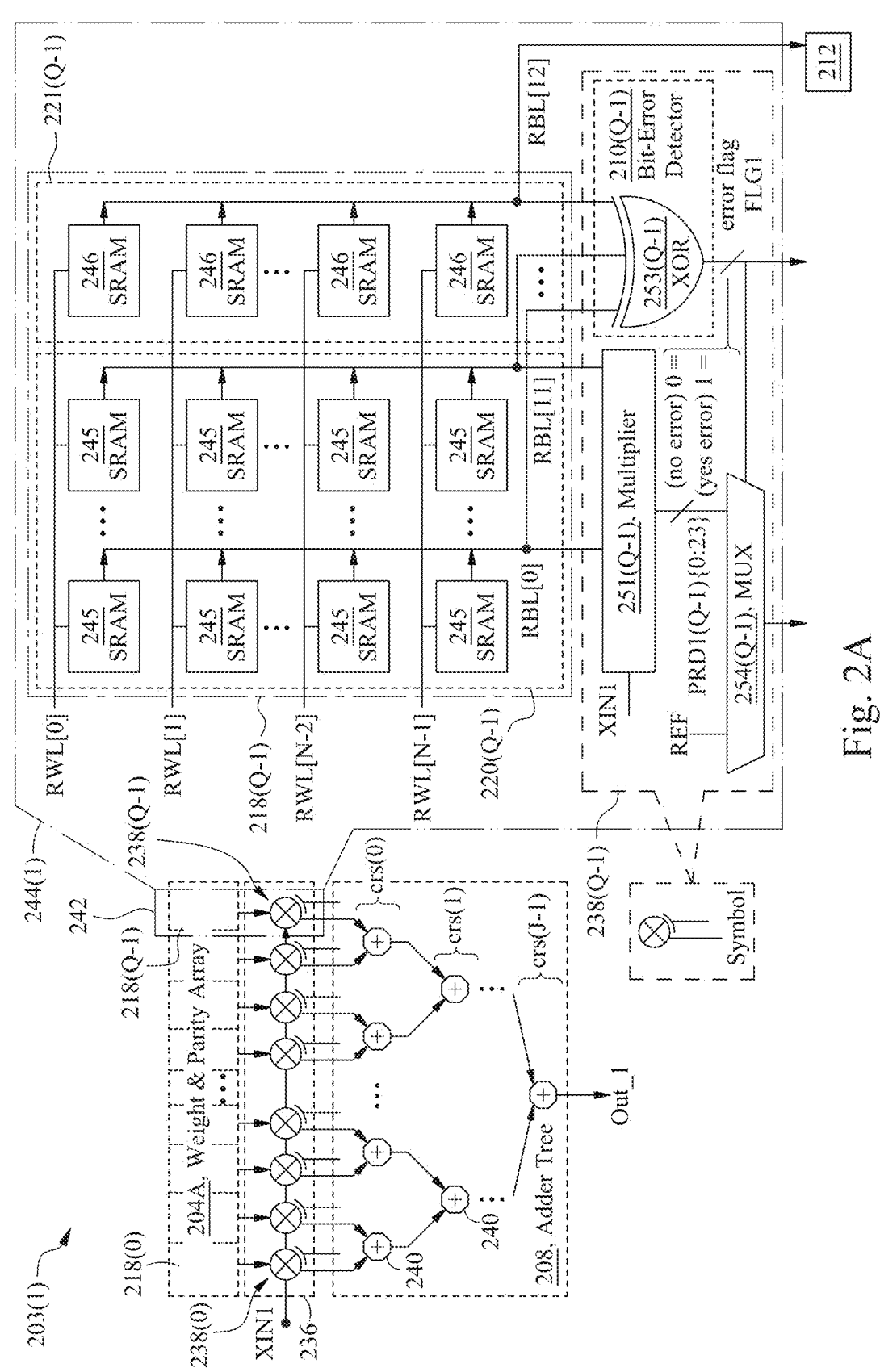
FIGS. 2A-2D are schematic diagrams, in accordance with some embodiments.

FIG. 2A is a schematic diagram of a CIM region 203(1) of a digital CIM system, in accordance with some embodiments.

CIM region 203(1) is an example of a part of CIM region 103A of FIG. 1A, a part of CIM region 103C of FIG. 1C, or the like. Multiple instances of CIM region 203(1) comprise CIM region 103A, CIM region 103C, or the like.

CIM region 203(1) includes: weight bits & parity bits (W&P) array 204A that includes slices 218(0)-218(Q–1); an enhanced multiplier (EM) array 236 of EM blocks 238(0)-238(Q–1) each including a multiplier, e.g., 251(Q–1), and a bit-error detector, e.g., 210(Q–1); and an adder tree 208; and where Q is a positive integer. In some embodiments, Q is a power of two. In some embodiments, Q=64. In some embodiments, Q equals a positive integer power of two other than 64.

On a row-by-row basis, EM array 236 is configured to receive a given row of data bit from W&P array 204A. As such, EM blocks 238(0)-238(Q–1) are configured to receive corresponding segments of the given row. EM array 236 of FIG. 2A is further configured to receive a given column of input bits from input array XIN1 corresponding to the given row of data bits from W&P array 204A and multiply the same together resulting in Q products PRD1(0)-PRD1(Q–1). Adder tree 208 adds the Q products PRD1(0)-PRD1(Q–1) to generate an output signal Out_1. Output signal Out_1 is operated upon, e.g., by bit-error corrector 216 (see FIG. 2D).

Taking EM block 238(Q–1) as an example of each of EM blocks 238(0)-238(Q–1), EM block 238(Q–1) includes a multiplier 251(Q–1), and a bit-error detector, e.g., 210(Q–1) and a multiplexer (MUX) 254(Q–1). A portion 242 of W&P array 204A and EM array 236 includes slice 218(Q–1) of W&P array 204A and EM block 238(Q–1) of EM array 236. A part 244(1) of portion 242 is shown in more detail in FIG. 2A using an exploded view.

In part 244(1), i.e., in the exploded view, slice 218(Q–1) includes a 2D weight array 220(Q–1) of one-bit memory cells 245 and a 1D parity array 221(Q–1) of one-bit memory cells 246. In FIG. 2A, memory cells 245 and 246 are assumed to be static random access memory (SRAM) cells. In some embodiments, memory cells 245 and 246 are a type of memory cell other than SRAM.

Memory cells 245 and 246 of slice 218(Q–1) are organized into rows and columns. For simplicity of illustration, some but not all of the signal lines involved in reading from, or writing, to slice 218(Q–1) are shown. Slice 218(Q–1) is configured for data bits to be read a single row thereof at any given time. Selection of a given row in slice 218(Q–1) is controlled by corresponding read word lines RWL [0]-RWL [N–1], where N is a positive integer. Not only is the given row selected in slice 218(Q–1), the same row is concurrently selected in each of slices 218(0)-218(Q–2). The columns in slice 218(Q–1) have corresponding read bit lines RBL[0]-RBL[12].

Weight array 220(Q–1) is arranged with respect to lines RBL[0]-RBL[11]. Hence, weight array 220(Q–1) is an Nx12 array, where N is a positive integer. Parity array 221(Q–1) is arranged with respect to line RBL[12]. Hence, parity array 221(Q–1) is an Nx1 array. Accordingly, slice 218(Q–1) is an Nx(K+1) array.

For simplicity of illustration, FIG. 2A assumes that each of the rows in weight array 220(Q–1) stores a 12 bit word. More generally, weight array 220(Q–1) stores a K bit word, where K is a positive integer that is assumed to be K=12 in FIG. 2A. As such, weight array 220(Q–1) is an NxK array. In some embodiments, K is a power of 2 such as K=8, K=16, K=32, or the like. In some embodiments, K is a positive integer other than 8, 12, 16, or 32. It is noted that input XIN1 is an KxL array, where L is a positive integer.

Iteratively, on a row-by-row basis, EM block 238(Q–1) is configured to generate an output signal PRD1(Q–1) representing the product of multiplying a row of NxK array 220(Q–1) by a corresponding column of KxL array XIN1. More particularly, iteratively, multiplier 251(Q–1) is configured to receive a row of data bits from weight array 220(Q–1) as a multiplicand and a column of input bits of input data XIN1 as a multiplier and multiply the multiplicand by the multiplier resulting in product PRD1(Q–1). As such, multiplier 251(Q–1) is configured to receive a row of K data bits on lines RBL[0]-RBL[11] and a column of K input bits of input data XIN1 and multiply the same together resulting in product PRD1(Q–1). Product PRD1(Q–1) is a single word having K+K=2K bits. In the example of FIG. 2A, product PRD1(Q–1) has K+K=12+12=24 bits. The operation of multiplier 251(Q–1) is also discussed in the context of FIG. 4B.

Taking slice 218(Q–1) as representative of slices 218(0)-218(Q–1) of W&P array 204A, a single bit-error circumstance in slice 218(Q–1) occurs when the value stored in one of the memory cells 245 in the selected row of slice 218(Q–1), i.e., the value on one of lines RBL[0]-RBL[11], represents a bit error. A double bit-error circumstance in slice 218(Q–1) occurs when the values correspondingly stored in two of the memory cells 245 in the selected row of slice 218(Q–1), i.e., the values correspondingly on two of lines RBL[0]-RBL[11], represents bit errors. The probability of a single bit-error circumstance occurring in slice 218(Q–1) is low. The probability of a double bit-error circumstance occurring in slice 218(Q–1) is substantially lower than the probability of a single bit-error circumstance occurring in slice 218(Q–1). As a practical matter, FIG. 2A assumes that the double bit-error circumstance will not occur in slice

218(Q–1). Accordingly, FIG. 2A is configured to detect and correct the single bit-error circumstance in slice 218(Q–1) but is not configured to detect nor correct the double bit-error circumstance in slice 218(Q–1). At least some other embodiments disclosed herein are configured to detect and correct for a single bit-error circumstance, but not the double bit-error circumstance, in a slice that is a counterpart to slice 218(Q–1).

On a row-by-row basis, bit-error detector 210(Q–1) is configured to receive the K data bits on lines RBL[0]-RBL [11] and the parity bit on line RBL[12]. Based on the bit values of lines RBL[0]-RBL[12], bit-error detector 210(Q–1) determines whether there is a bit error on one of lines RBL[0]-RBL[11] and generates an output signal based thereon which represents a flag signal (flag) FLG1. Flag FLG1 represents an output signal of EM block 238(Q–1) and is also provided internally to MUX 254(Q-1). It is noted that line RBL[12] is also provided to locus-inferable data generator 212 (see FIG. 2C).

Flag FLG1 is assertable to indicate that a bit-error is present, i.e., that detector 210(Q–1) has detected a bit-error in the corresponding row of data bits from weight array 220(Q–1). FIG. 2A assumes the following assertion states for flag FLG1: when flag FLG1 is not asserted, i.e., when FLG1=0, then no error is present on lines RBL[0]-RBL[11]; and when flag FLG1 is asserted, i.e., when FLG1=1, then an error is present on one of lines RBL[0]-RBL[11].

Bit-error detector 210(Q–1) includes an exclusive OR (XOR) gate 253(Q–1) configured to receive K+1 inputs. In general, for any multi-input XOR gate, the output is true (or a logical one) when an odd number of the inputs is true. In some embodiments, the converse of the noted assertion states of flag FLG1 are assumed. The operation of XOR gate 253(Q–1) is also discussed in the context of FIG. 4B.

According to another approach which is a counterpart to the CIM system of which CIM region 203(1) forms a part, bit-error detection of a bit-error in a memory counterpart to weight array 220(Q–1) is performed before multiplication is performed (pre-multiplication detection). Performing bit-error detection before multiplication according to the other approach uses two operation cycles. By contrast, the inclusion of bit-error detector 210(Q–1) in CIM region 203(1) to perform bit-error detection in parallel with the multiplication performed by multiplier 251(Q–1) according to at least some embodiments uses one operation cycle, which is one operation cycle faster as compared to the other approach.

The other approach uses a Q bit weight array which is a counterpart to weight array 220(Q–1). Furthermore, where Q=12, for each row in the weight array, the other approach uses 5 checkbits to implement the pre-multiplication detection, which imposes a significant penalty in terms of area on the die which is consumed (increased footprint), power consumption, routability of signal segments (see block 547 FIG. 5C) and/or PG segments (see block 547), or the like. By contrast, the inclusion of bit-error detector 210(Q–1) and the use by the same of single parity bits stored in parity array 221(Q–1) reduces the number of bit-error detection bits by four as compared to the other approach, which substantially reduces values of parameters including footprint, power consumption, routability, or the like, as compared to the other approach.

MUX 254(Q–1) is configured to output a selection on a row-by-row basis. As selection inputs, MUX 254(Q–1) is configured to receive product PRD1(Q–1) from multiplier 251(Q–1) and a predetermined 2K bits word representing a reference REF. In FIG. 2A, reference REF is assumed to have a value of zero. In some embodiments, reference REF has values other than zero. As a control input, MUX 254 (Q–1) receives flag FLG1 from XOR gate 253(Q–1). According to flag FLG1, MUX 254(Q–1) is configured to select product PRD1(Q–1) when no bit-error is present, and select the reference word when a bit-error is present.

On a row-by-row basis, EM array 236 of FIG. 2A is configured to receive a column of bits from input array XIN1, multiply the same together with a corresponding row of data bits from W&P array 204A as a whole resulting in Q products PRD1(0)-PRD1(Q–1). Adder tree 208 adds the Q products PRD1(0)-PRD1(Q–1) to generate an output signal Out_1. Output signal Out_1 is operated upon, e.g., by bit-error corrector 216 (see FIG. 2D).

Adder tree 208 is configured to receive the Q products PRD1(0)-PRD1(Q–1) from EM array 236 and to add the same together. Adder tree 208 has J courses, crs(0), . . . , crs(J–1), of adders 240, where J is a positive integer and J<Q. In some embodiments, the number J of courses in adder tree 208 relates to the Q number of slices, 218(0)-218(Q–1), as follows: Q equals 2 raised to the J power, i.e., Q=2^J. In such embodiments, where W&P array 204A has Q slices that supply Q words to EM array 236, EM array 236 generates Q product words. Correspondingly, adder tree includes J courses, crs(0), . . . , crs(J–1), of adders 240, and generates a single word as output signal Out_1. Each of adders 240 is configured to receive two single-word-inputs. For example, where Q=64, enhanced multiplier array 236 has J=6 courses.

In some embodiments, each one of the Q words is represented by 2K bits such that single word Out_1 is represented by Q*2K=(2^J)*2K bits. In some of such embodiments, 2K=24 such that single word Out_1 is represented by a 1536=(2^6)*24 bits word.

Figure 2B:
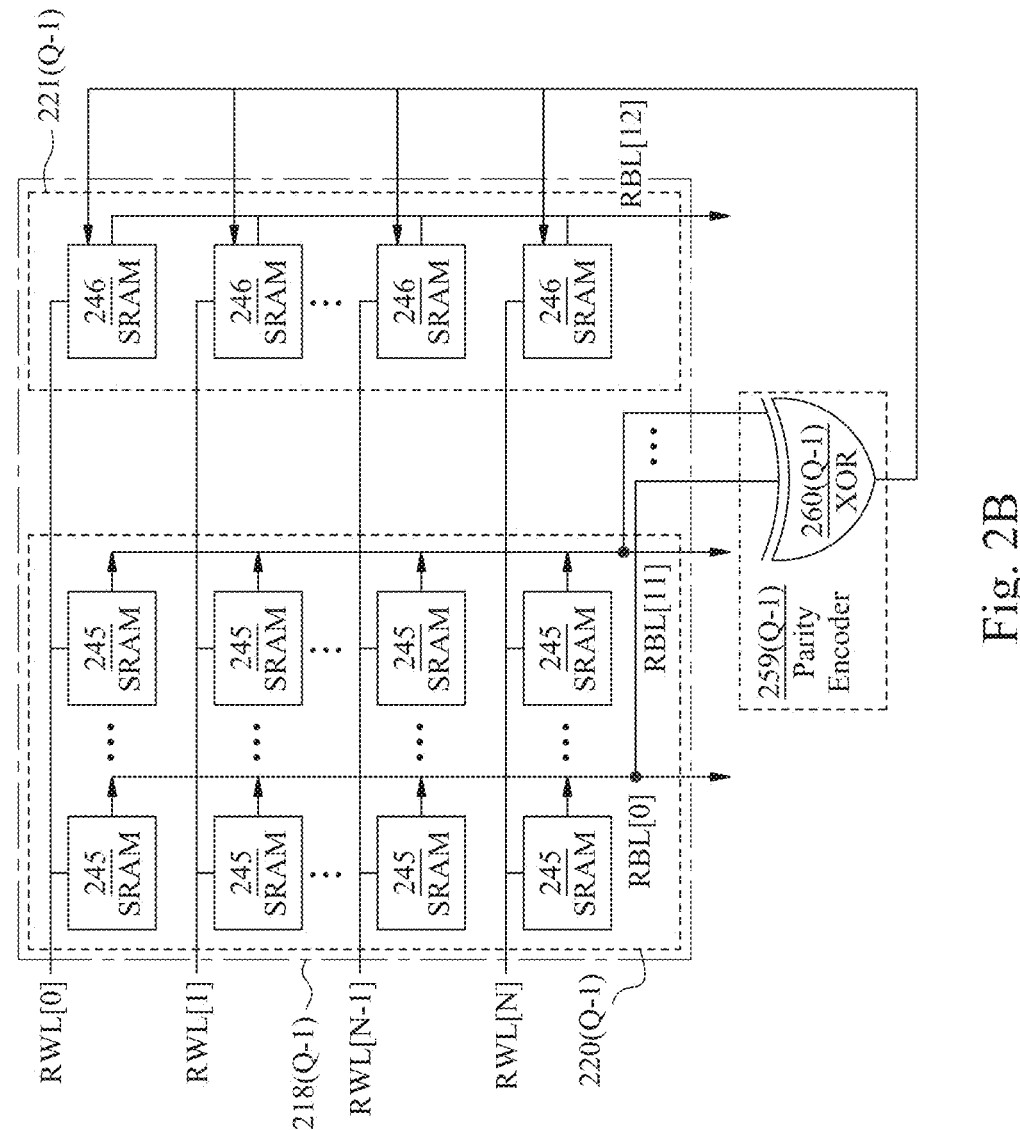
Figure 2B:

FIG. 2B is a schematic diagram of a part 244(2) of portion 242 of CIM region 203(1) of a digital CIM system, in accordance with some embodiments.

Part 244(2) includes slice 218(Q–1) of W&P array 204A and a parity encoder 259(Q–1). FIG. 2B expands the example of FIG. 2A in which K=12. In some embodiments, parity encoder 259(Q–1) is an example of one amongst parity encoders 158 of FIG. 1A, or the like.

On a single row basis, parity encoder 259(Q–1) is configured to generate a value of a parity bit (parity value) corresponding to the bit values of the row and write the same into a corresponding one of memory cells 246. Each of memory cells 246 is further configured to be written selectively with the parity value from parity encoder 259(Q–1).

A given row of slice 218(Q–1) includes K=12 instances of memory cell 245 in weight array 220(Q–1) corresponding to read bit lines RBL[0]-RBL[11] and one instance of memory cell 246 in parity array 221(Q–1). As such, for the given row of slice 218(Q–1), parity encoder 259(Q–1) is further configured to receive K data bits from weight array 220(Q–1) of slice 218(Q–1) on lines RBL[0]-RBL[11]. Based on the bit values of lines RBL[0]-RBL[11], parity encoder 259(Q–1) generates a parity value corresponding to the given row. The parity value for the given row is then written into the instance of memory cell 246 that is included in the given row.

Parity encoder 259(Q–1) includes an XOR gate 260(Q–1) configured to receive K inputs corresponding to bit values on lines RBL[0]-RBL[11] and generate an output signal representing a corresponding parity bit. The operation of XOR gate 260(Q–1) of parity encoder 259(Q–1) is also discussed in the context of FIG. 4A.

Figure 2C:
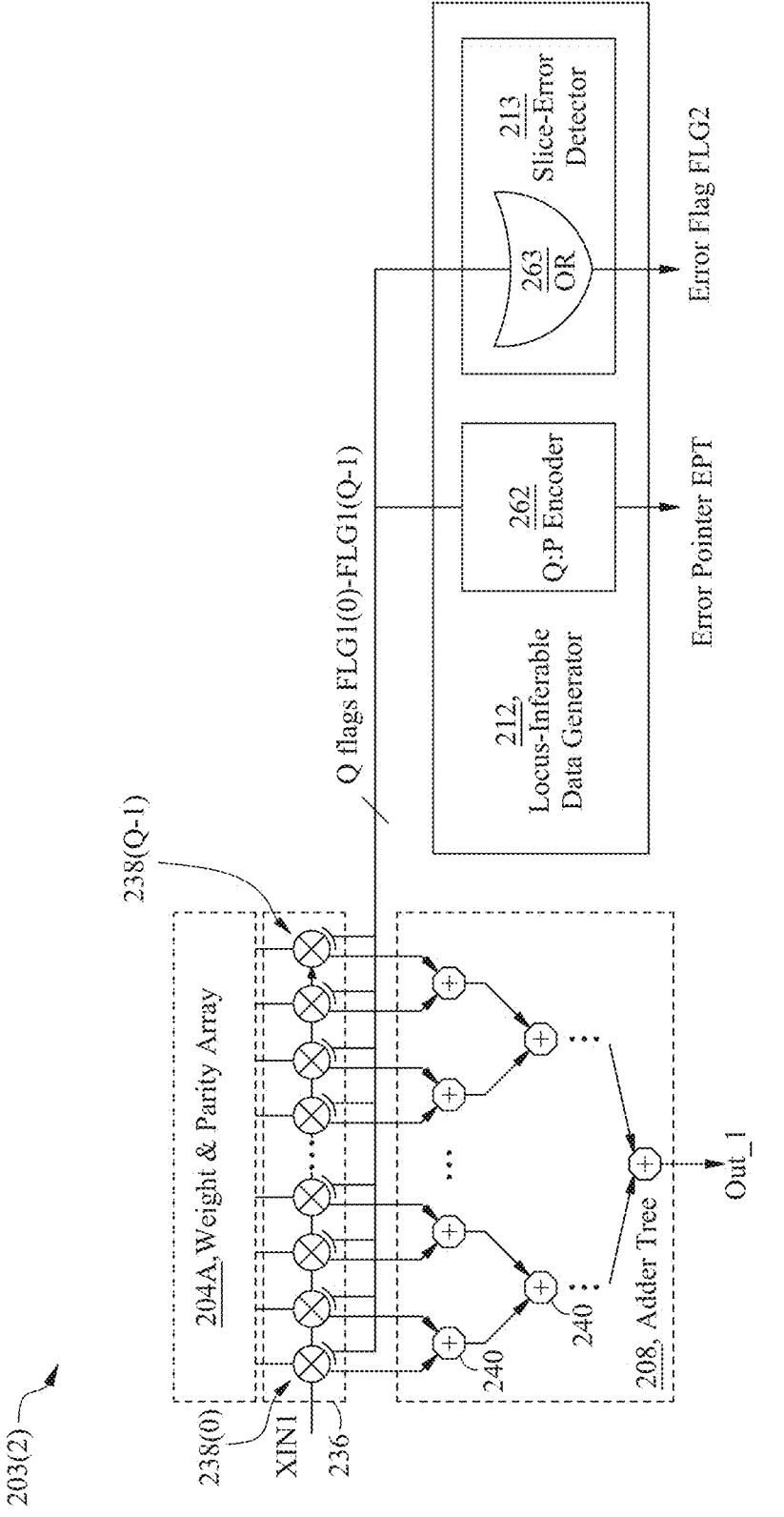

FIG. 2C is a schematic diagram of a CIM region 203(2) of a digital CIM system, in accordance with some embodiments.

CIM region 203(2) is an example of a part of CIM region 103A of FIG. 1A, a part of CIM region 103C of FIG. 1C, or the like. Multiple instances of CIM region 203(2) comprise CIM region 103A, CIM region 103C, or the like. Locus-inferable data generator 212 is an example of locus-inferable data generator 112 of FIG. 1A, FIG. 1C, or the like. FIG. 2C expands the example of FIG. 2A in which K=12.

Locus-inferable data generator 212 is configured to receive Q instances of flag FLG1 (Q flags FLG1) from EM array 236 and Q parity bits from W&P array 204A and generate bit-error locus-inferable signals based thereon. The bit-error locus-inferable signals generated by generator 212 include pointer signal (pointer) EPT and a flag signal (flag) FLG2. Pointer EPT and flag FLG2 are operated upon, e.g., by bit-error corrector 216 (see FIG. 2D). It is to be recalled that the Q number of flags FLG1 correspond to the Q number of slices 218(0)-218(Q–1) of W&P array 204A.

In FIG. 2C, locus-inferable data generator 212 includes a Q: P encoder 262 and a slice-error detector 213.

Encoder 262 is configured to receive the Q instances of flag FLG1 from EM array 236 and to generate pointer EPT, where pointer EPT is a P bit word, P is a positive integer, P<Q and Q=2^P. In some embodiments, encoder 262 receives the Q instances of flag FLG1 as a concatenation of the Q instances of flag FLG1. The operation of encoder 262 is also discussed in the context of FIG. 4B.

In some embodiments, the Q flags FLG1 are provided to encoder 262 as a word having Q bits such that Q={f(0), f (1), . . . , f(Q–2), f(Q–1)}. Extending the example of assertion states of flag FLG1 discussed in the context of FIG. 2A, where none of the Q slices of array W&P array 204A has a bit-error, then each of bits f(0)-f(Q–1) is set to a value of logical zero. However, where a given slice 218 (i) has a bit-error, then bit f (i) of the word having Q bits is set/asserted to a logical value of one, i.e., f (i)=1; and the remaining bits f(0), f (1), . . . , f (i–1), f (i+1), . . . , f(Q–2), f(Q–1) are not asserted, i.e., the remaining bits are set to a logical value of zero.

Slice-error detector 213 of FIG. 2C is configured to receive the Q instances of flag FLG1 from EM array 236 and to generate a flag signal (flag) FLG2. Flag FLG2 is assertable to indicate that a slice-error is present, i.e., that detector 213 has detected a slice-error. An OR gate 263 is included in slice-error detector 213. OR gate 263 is configured to receive the Q flags FLG1 from EM array 236 and to generate flag FLG2.

Regarding flag FLG2, the example of assertion states of flag FLG1 discussed in the context of FIG. 2A is extended as follows: when flag FLG2 is not asserted, i.e., when FLG1-0, then no slice-error is present amongst slices 218 (0)-218(Q–1); and when flag FLG2 is asserted, i.e., when FLG2=1, then a slice-error is present amongst one of slices 218(0)-218(Q–1).

Figure 2D:
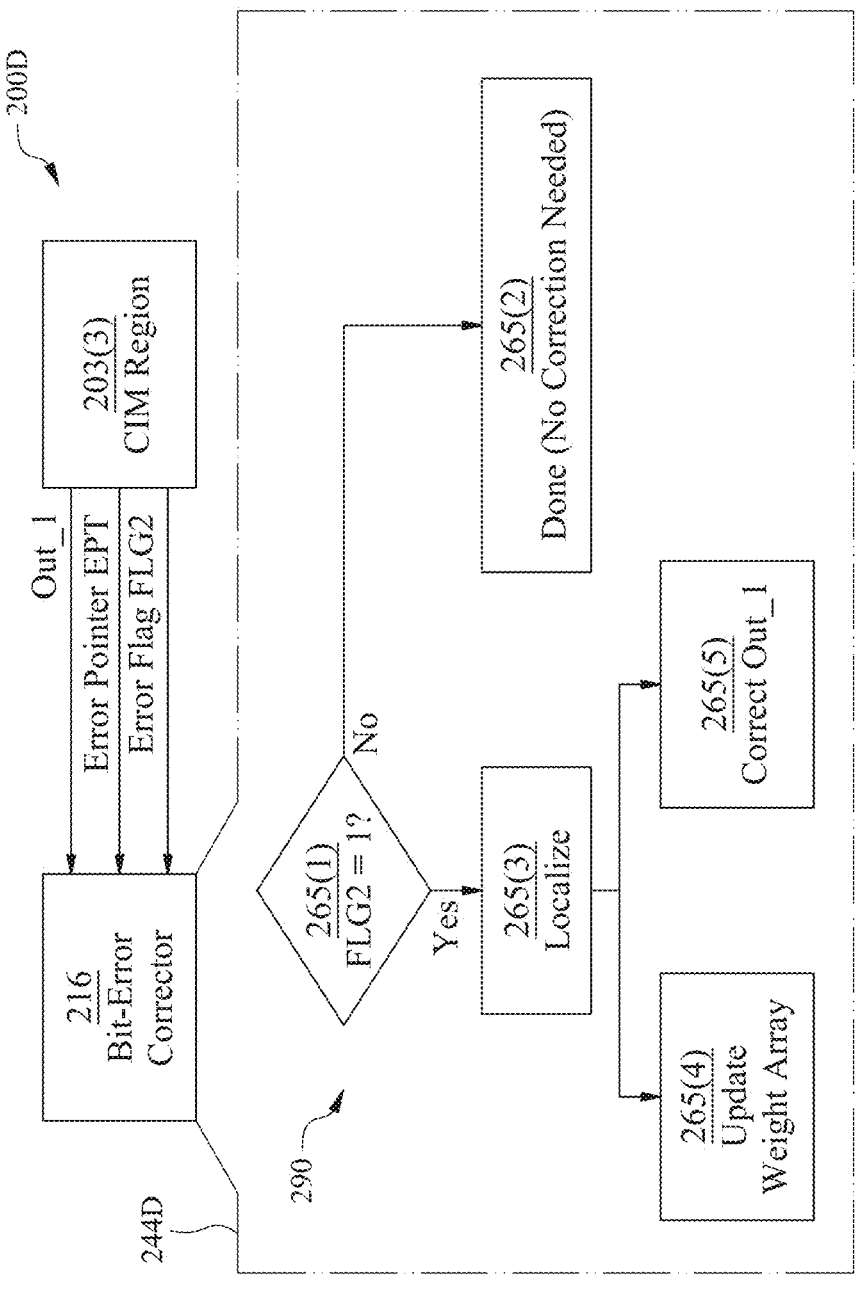

FIG. 2D is a schematic diagram of a digital CIM system 200D, in accordance with some embodiments.

CIM system 200D is an example of CIM system 100A of FIG. 1A, 100C of FIG. 1C, or the like. CIM system 200D includes a CIM region 203(3) and a bit-error corrector 216.

CIM region 203(3) is an example of CIM region 103A of FIG. 1A, a combination of CIM region 103C and region 155(1) of FIG. 1C, or the like. Bit-error corrector 216 is an example of bit-error corrector 116 of FIGS. 1A, 1C, or the like.

Bit-error corrector 216 is configured to receive output signal Out_1, pointer EPT and flag FLG2 from CIM region 203(3) and operate on the same according to a flowchart 290. In FIG. 2D, flowchart 290 is shown as an exploded view 244D of bit-error corrector 216. The operation of bit-error corrector 216 is also discussed in the context of FIG. 4B.

Flowchart 290 includes blocks 265(1)-265(5). At block 265(1), a decision is made whether flag FLG2 is asserted, i.e., whether FLG2=1. If the outcome of block 265(1) is no, i.e., FLG2-0, then flow proceeds to block 265(2).

At block 265(2), flow stops because there is no slice-error, hence no bit-error correction needs to be made to output signal Out_1. If the outcome of block 265(1) is yes, i.e., FLG2=1, then there is a slice-error such that bit-error correction is needed and accordingly flow proceeds to block 265(3).

At block 265(3), localization of the slice-error is performed. It is to be recalled: output signal Out_1, pointer EPT and flag FLG2 are generated on iteratively on a row-by-row basis; and each iteration of output signal Out_1, pointer EPT and flag FLG2 is based on the current multiplicand, i.e., the corresponding one of the input columns of XIN1, and the current multiplier, i.e., the corresponding one of the data rows in W&P array 204A. As soon as flag FLG1 is asserted, the corrupted row in slice 218(Q-1) is identified as the current multiplier. Then it remains for the slice having the slice-error to be identified by block 265(3). Accordingly, at block 265(3), pointer EPT is examined to determine which of one amongst bits f(0)-f(Q-1) is asserted, i.e., is set to a value of one. The slice-error exists in the one amongst slices 218(0)-218(Q-1) for which the corresponding one amongst bits f(0)-f(Q-1) is set to a value of 1. From block 265(3), flow proceeds to blocks 265(4) and 265(5).

A single-corrupted-slice scenario occurs when a single one of slices 218(0)-218(Q-1) experiences a single bit-error circumstance. A double-corrupted-slice scenario occurs when two of slices 218(0)-218(Q-1) experience corresponding single bit-error circumstances. The probability of single-corrupted-slice scenario occurring amongst slices 218(0)-218(Q-1) is low. The probability of double-corrupted-slice scenario occurring amongst slices 218(0)-218(Q-1) is substantially lower than the probability of single-corrupted-slice scenario. As such, typically, the bit sequence of the concatenated Q flags FLG1 will have only one bit whose value is set to logical one. At block 265(3), regardless of the total number of bits in the bit sequence of the concatenated Q flags FLG1 that are set to logical one, each bit that is set to logical one also identifies the corresponding slice as experiencing a bit error.

At block 265(4), each of slices 218(0)-218(Q-1) in W&P array 204A identified by block 265(3) is updated. In some embodiments, bit-error corrector 216 is configured to update each corrupted slice by writing uncorrupted data bit values into memory cells 245 in the row identified in block 265(3), e.g., by copying corresponding uncorrupted data bit values from a source copy or archival copy of W&P array 204A. For example, the source copy or archival copy is stored outside of the CIM region containing W&P array 204A.

At block 265(5), the value of output signal Out_1 is corrected. In some embodiments, output signal Out_1 is stored in a first register. In some embodiments, bit-error corrector 216 is configured to multiply the current multiplicand, i.e., the corresponding one of the input columns of XIN1, and the current multiplier, i.e., the corresponding one of the data rows in W&P array 204A, to form a corrected product and write the corrected product into the first register.

In some embodiments, block 265(4) and 265(5) are executed substantially concurrently. In some embodiments, block 265(4) is executed before block 265(5). In some embodiments, block 265(5) is executed before block 265(4).

Figure 3A:
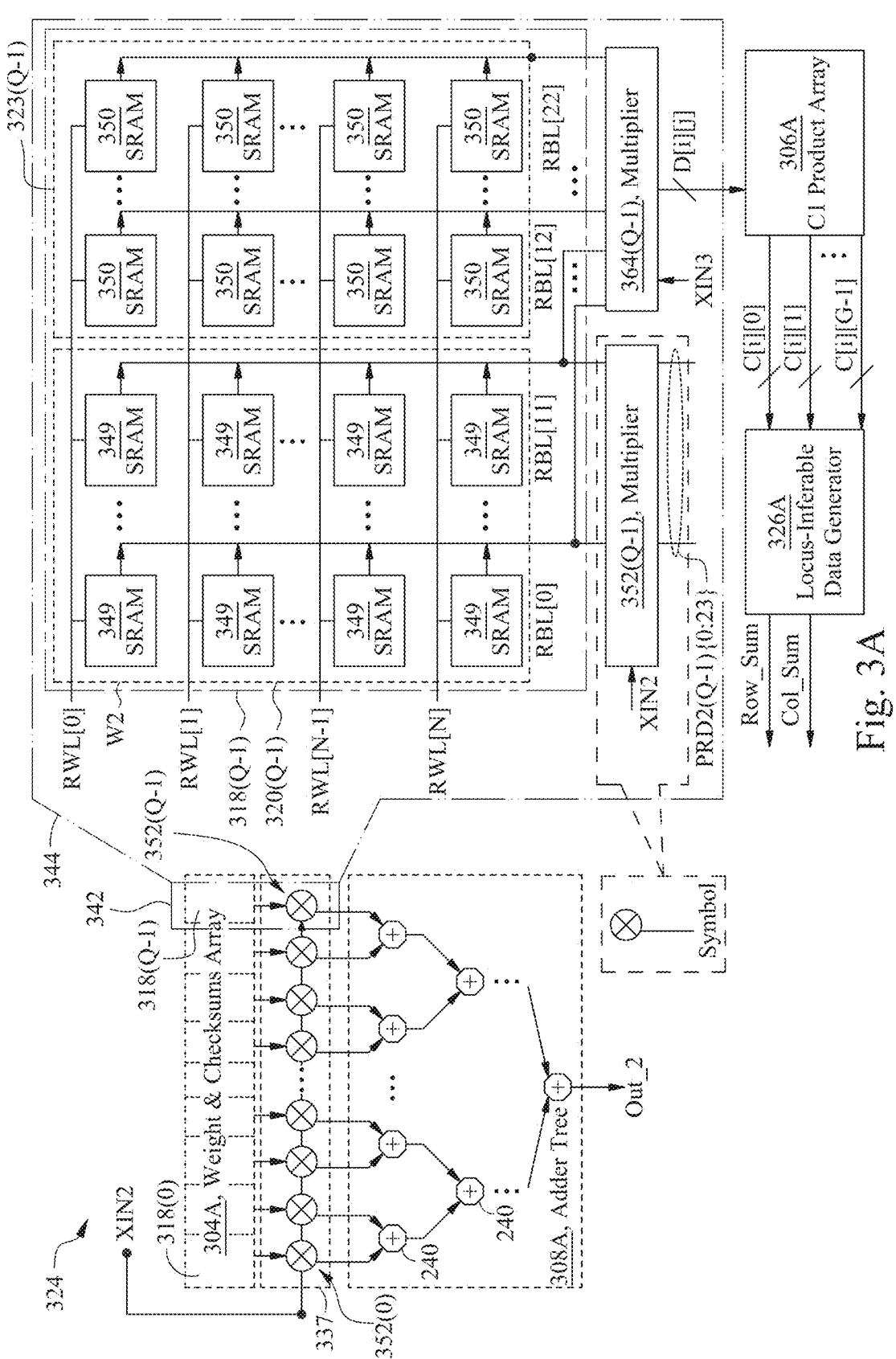
FIGS. 3A-3M are schematic diagrams, in accordance with some embodiments.

FIG. 3A is a schematic diagram of a CIM region 324 of a digital CIM system, in accordance with some embodiments.

CIM region 324 is an example of a part of CIM region 124D of FIG. 1D, a part of CIM region 124E of FIG. 1E, or the like. Multiple instances of CIM region 324 comprise CIM region 124D, CIM region 124E, or the like. CIM region 324 is similar to CIM region 203(1) of FIG. 2A. For brevity, the discussion will focus on differences of CIM region 324 as compared to CIM region 203(1) rather than on similarities.

CIM region 324 includes: weight bits & checksum bits (W&C) array 304A that includes slices 318(0)-318(Q-1); multiplier (MX) array 337 of multipliers 352(0)-352(Q-1); an adder tree 308; a C1 product array 306A; and locus-inferable data (LID) generator 326A; and where Q is a positive integer. In some embodiments, Q is a power of two. In some embodiments, Q=64. In some embodiments, Q equals a positive integer power of two other than 64.

A portion 342 of W&C array 304A and MX array 337 includes slice 318(Q-1) of W&C array 204A and multiplier 352(Q-1) of MX array 337. A part of portion 342 is shown in more detail in FIG. 3A using an exploded view 344A. As shown in exploded view, the part of portion 342 includes slice 318(Q-1), multiplier 352(Q-1) and multiplier 364(Q-1). Though multiplier 364(Q-1) is shown in FIG. 3A, it is noted that multipliers 364(0)-364(Q-2) are not shown in FIG. 3A for simplicity of illustration.

Slice 318(Q-1) includes a 2D weight array 320(Q-1) and a 2D checksum (CHK) array 323(Q-1). Weight array 320(Q-1) includes one-bit memory cells 349 and a CHK array 323(Q-1) of one-bit memory cells 350. In FIG. 3A, memory cells 349 and 350 are assumed to be SRAM cells. In some embodiments, memory cells 349 and 350 are a type of memory cell other than SRAM.

On a row-by-row basis, MX array 337 is configured to receive segments of a given row of weight bits from W&C array 304A. As such, each of multipliers 352(0)-352(Q-1) of MX array 337 is configured to receive a corresponding segment of weight bits of the given row. MX array 337 is further configured to receive a given column of input bits from input array XIN2 (see FIG. 3B) corresponding to the given row of bits from W&C array 304A and multiply the same together resulting in Q first products PRD2(0)-PRD2(Q-1). First products PRD2(0)-PRD2(Q-1) are also provided to adder tree 308A.

Adder tree 308A adds the Q first products PRD2(0)-PRD2(Q-1) to generate an output signal Out_2. Output signal Out_2 is operated upon, e.g., by bit-error detector, locator & corrector unit 316 (see FIG. 3M). Adder tree 308A is similar to adder tree 208 of FIG. 2A. The operation of multiplier 352(Q-1) is also discussed in the context of FIGS. 3E-3G and 4C.

In CIM region 324 of FIG. 3A, multipliers 352(0)-352(Q-1); correspond to multipliers 251(0)-251(Q-1) correspondingly of EM blocks 238(0)-238(Q-1) of FIG. 2A. However, CIM region 324 does not include bit-error detectors 210(0)-210(Q-1) nor MUXes 254(0)-254(Q-1) of EM blocks 238(0)-238(Q-1) of FIG. 2A. Rather, CIM region 324 includes multipliers 364(0)-364(Q-1), C1 product array 306A and LID generator 326A, whereas FIG. 2A does not.

On a row-by-row basis, multiplier 364(Q-1) is configured to receive a corresponding row of weight and checksum bits from slice 318(Q-1). Multiplier 364(Q-1) is further configured to receive a given column of input bits from input array XIN3 (see FIG. 3D) corresponding to the given row of bits from slice 318(Q-1) and multiply the same together resulting in second product D[i][j], where D[j][j] represents a word in C1 array 306A, and i and j are non-negative integers.

Figures 3B, 3C, 3D:
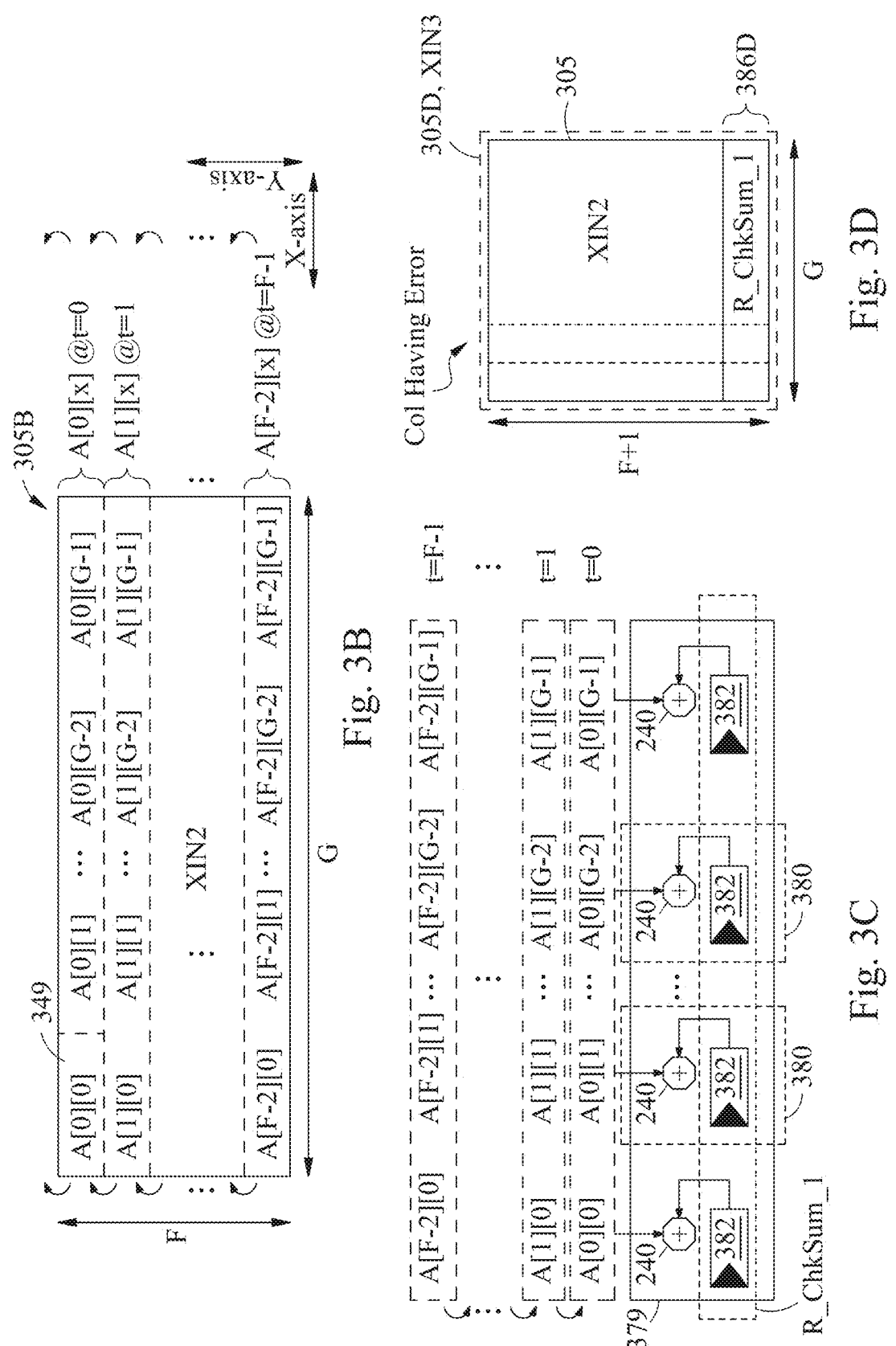
Figures 3E, 3F, 3G:
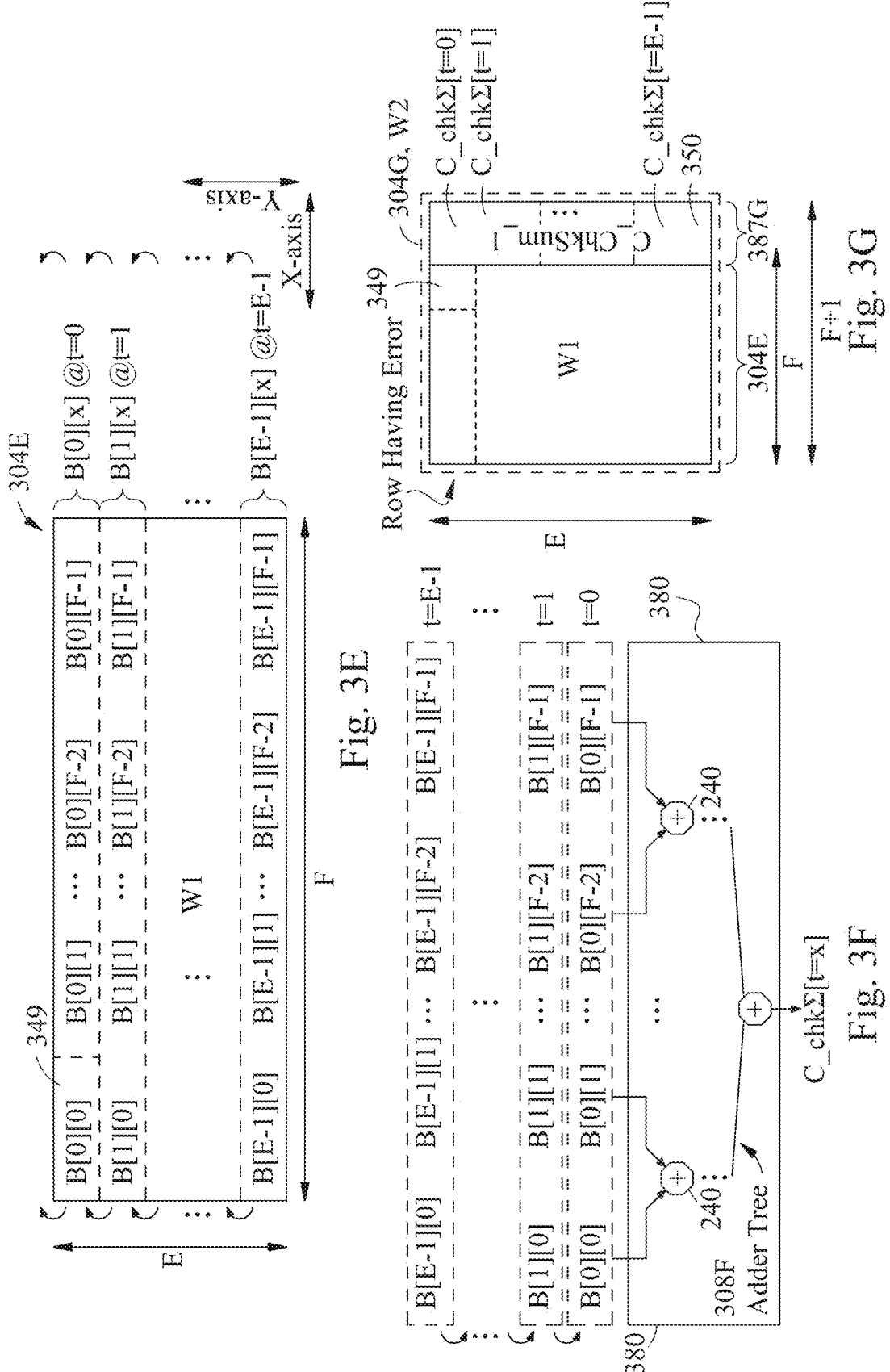
Figures 3H, 3I:
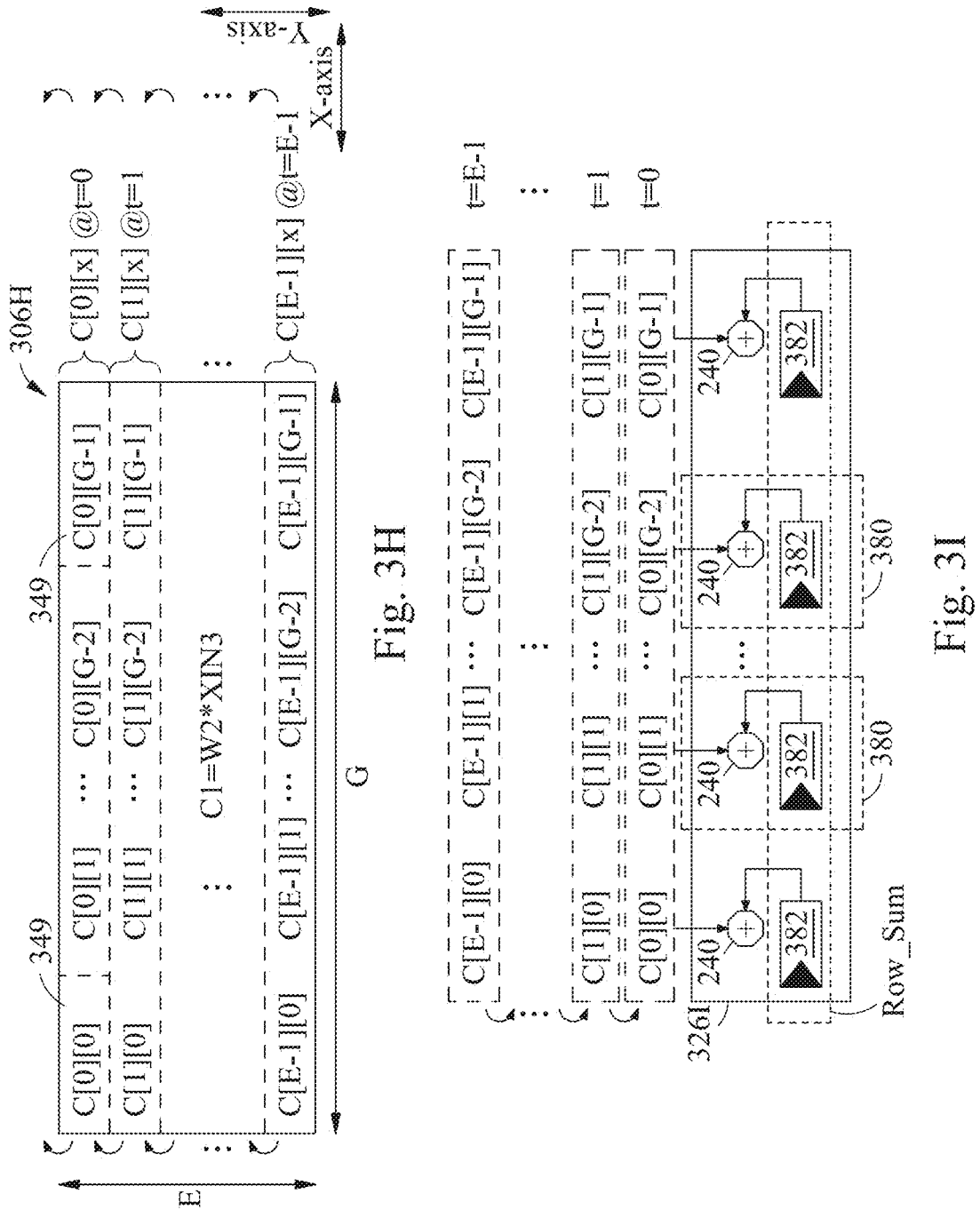

On the row-by-row basis, second products D[i][1] are cumulatively stored by multiplier 364(Q-1) and other multipliers 364(0)-364(Q-2) in C1 array 306A (see C1 306H in FIG. 3H). The operation of multiplier 364 is also discussed in the context of FIGS. 3H and 4C.

LID generator 326A is configured to operate on C1 array 306A and generate bit-error locus-inferable (BELI) signals including a row sum signal Row_Sum and a column sum signal Col_Sum. The operation of LID generator 326A is also discussed in the context of FIGS. 3I-3M and 4D-4E. In FIG. 3A, LID generator 326A is configured to receive row (i) of C1 from C1 array 306A.

For simplicity of illustration, FIG. 3A assumes the following: there are N rows in slice 318(Q-1), and thus in each of weight array 320(Q-1) and CHK array 323(Q-1); each of the rows in weight array 320(Q-1) stores a K=12 bit word. Such assumptions in FIG. 3A are similar to assumptions in FIG. 2A.

FIG. 3A also assumes that that there are N rows in CHK array 323(Q-1) and that each of the rows in CHK array 323(Q-1) stores an 11 bit word corresponding to read bit lines RBL[12]-RBL[22] such that CHK array 323(Q-1) is an Nx11 array. For a given row having segments in each of slices 318(0)-318(Q-1), and thus having a segment in each of weight array 320(Q-1) and CHK array 323(Q-1) of slice 318(Q-1), the 11 bit word/segment in CHK array 323(Q-1) represents a checksum of the 12 bit segment/word in weight array 320(Q-1).

CHK array 323(Q-1) stores an S bit word, where S is a positive integer that is assumed to be S=11 in FIG. 3A. To further generalize, CHK array 323(Q-1) is a NxS array. As such, slice 318(Q-1) is a Nx(K+S) array. It is noted that input XIN3 (see 305D FIG. 3D) is(K+S)xZ array, where S and Z are corresponding positive integers. In some embodiments, S is a positive integer other than 11. For simplicity of illustration of locations in XIN3 of FIG. 3D and locations in XIN2 of FIGS. 3B-3C, K+S is referred to as V, i.e., V=K+S, where V is a positive integer.

Regarding multiplier 352(Q-1), iteratively (i.e., on a row-by-row basis), multiplier 352(Q-1)_is configured to generate an output signal PRD2(Q-1) representing the product of multiplying a row of NxK weight array 320(Q-1) by a corresponding column of KxZ array XIN2. More particularly, iteratively, multiplier 352(Q-1) is configured to receive a row of weight bits from weight array 320(Q-1) as a multiplicand and a column of input bits of input data XIN2 as a multiplier and multiply the multiplicand by the multiplier resulting in product PRD2(Q-1). Multiplier 352(Q-1) is configured to receive a row of K data bits on lines RBL[0]-RBL[11] and a column of K input bits of input data XIN2 and multiply the same together resulting in product PRD2(Q-1). Product PRD2(Q-1) is a single word having K+K=2K bits. In the example of FIG. 3A, product PRD2 (Q-1) has 2K=12+12=24 bits.

Regarding multiplier 364(Q-1), iteratively (i.e., on a row-by-row basis), multiplier 364(Q-1)_is configured to generate an output signal PRD2(Q-1) representing second product D[i][j] resulting from multiplying a row of Nx(K+S) slice 318(Q-1) by a corresponding column of (K+S)xZ array XIN3. More particularly, iteratively, multiplier 364 (Q-1) is configured to receive a row of bits from slice 318(Q-1) as a multiplicand and a column of input bits of input data XIN3 as a multiplier and multiply the multiplicand by the multiplier resulting second product D[i][j], where the latter is shown as being provided to C2 array 306A. Multiplier 364(Q-1) is configured to receive a row of K+S data bits on lines RBL[0]-RBL[22] and a column of K+S input bits of input data XIN3 and multiply the same together resulting in the second product D[i][j].

Similar to FIG. 2A, as a practical matter, FIG. 3A assumes that the double bit-error circumstance will not occur in slice 318(Q-1). Accordingly, FIG. 3A is configured to detect and correct the single bit-error circumstance in slice 318(Q-1) but is not configured to detect nor correct the double bit-error circumstance in slice 318(Q-1). At least some other embodiments disclosed herein are configured to detect and correct for a single bit-error circumstance, but not the double bit-error circumstance, in a slice that is a counterpart to slice 318(Q-1).

Whereas the discussion FIG. 3A is couched in terms of bit lines and the number of bits in row segments and in columns, FIGS. 3B-3M is couched in terms of words.

FIG. 3B is a schematic diagram of input XIN2 array 305B, in accordance with some embodiments.

Input XIN2 array 305B is operated on by a row checksum generator 379 to generate a row vector 386D, where the latter is appended to XIN2 array 305B to form XIN3 array 305D of FIG. 3D. Row checksum generator 379 is an example of row checksum generator 179 of FIG. 1D.

XIN2 array 305B is an FxG array, where F and G are corresponding positive integers. Each location (i,j) in XIN2 array 305B represents a corresponding word A[i][j], where i and j are corresponding non-negative integers. As such, XIN2 array 305B includes locations A[0][0], . . . , A[F-1] [G-1].

FIG. 3C is a schematic diagram of row checksum generator 379, in accordance with some embodiments.

Row checksum generator 379 is a row checksum generator configured to generate a row checksum R_ChkSum_1. Row checksum generator 379 is an example of row checksum generator 179 of FIG. 1D, or the like. Row checksum generator 379 is an array of G recursive adders 377 corresponding to the G columns of input XIN2 array 305B. Each recursive adder 377 is configured to generate a sum corresponding to words in the corresponding column of XIN2 array 305B by column-wise adding the words A[i][j] in the corresponding column on a row-by-row basis.

Each of recursive adders 377 includes an adder 240 and a register 382. For each of recursive adders 377, adder 240 is configured to receive a word from the corresponding column and the word in register 382. Each instance of register 382 is initialized to store zero. At time t=0, adders 240 add the corresponding words in row 0 of XIN2 array 305B and the words in corresponding registers 382 (all of which were initialized previously to zero), and stores/overwrites the t=0 sums in corresponding registers 382. At time t=1, adders 240 add the corresponding words in row 1 of XIN2 array 305B and the t=0 words in corresponding registers 382, and stores/overwrites the t=1 sums in corresponding registers 382 . . . . At time t=F-1, adders 240 add the corresponding words in row V-2 of XIN2 array 305B and the t=F-2 words in corresponding registers 382, and stores/overwrites the t=F-1 sums in corresponding registers 382. The t=F-1 words in the G instances of register 382 represent a vector R_ChkSum_1, which is appended to XIN2 array 305B of FIG. 3B to form input XIN3 array 305D of FIG. 3D.

FIG. 3D is a schematic diagram of input XIN3 array 305D, in accordance with some embodiments.

XIN2 array 305B is the result of having appended R_ChkSum_1 vector 386D to input XIN2 array 305B. As such, XIN3 array 305D is an (F+1) xG array.

FIG. 3E is a schematic diagram of a weight W1 array 304E, in accordance with some embodiments.

Weight W1 array 304E is an example a weight array comprised in part by weight array 320(Q-1) of FIG. 3A, or the like. Weight W1 array 305E is operated on by a column checksum generator 380 to generate weight W2 array 304G of FIG. 3G. Column checksum generator 380 is an example of column checksum generators 180 of FIG. 1D, or the like.

Weight W1 array 304E is an ExF array, where E is a positive integer. Each location (i,j) in Weight W1 array 304E represents a corresponding word B [i][j]. As such, weight W1 array 304E includes locations B [0][0], . . . , B [E-1][F-1].

FIG. 3F is a schematic diagram of column checksum generator 380, in accordance with some embodiments.

Column checksum generator 380 is a column checksum generator configured to generate a column vector 387G representing a checksum C_ChkSum_1, where the latter is appended to W1 array 304E to form a weight W2 array 304G of FIG. 3G. Column checksum generator 380 is an example of column checksum generator 180 of FIG. 1D, or the like. Column checksum generator 380 includes an adder tree 308F. On a row-by-row basis, column checksum generator 380 is configured to generate a sum corresponding to words in a given row of W1 array 304E and store the sum in a corresponding row of column C_ChkSum_1 vector 387G of FIG. 3G.

The output of column checksum generator 380 is C_chkΣ (T=x), where x is a non-negative integer variable. At time t=0, generator 380 adds the corresponding words in row 0 of W1 array 304E and stores the resulting sum as a word C_chkΣ (T=0) in row 0 of checksum column vector 387G. At time t=1, generator 380 adds the corresponding words in row 1 of W1 array 304E and stores the resulting sum as a word C_chkΣ (T=1) in row 1 of checksum column vector 387G. . . . At time t=E-1, generator 380 adds the corresponding words in row E-1 of W1 array 304E and stores the resulting sum as a word C_chkΣ(T=E-1) in row E-1 of checksum column vector 387G. Together, words C_chkΣ (T=0), . . . , C_chkΣ(T=E-1) represent checksum column vector 387G, which is appended to weight W1 array 304E of FIG. 3E to form weight W2 array 304G of FIG. 3G.

FIG. 3G is a schematic diagram of weight W2 array 304G, in accordance with some embodiments.

W2 array 306G is the result of having appended a column vector, i.e., C_ChkSum_1 vector 387G, to W1 array 304E. As such, weight W2 array 306G is an Ex (F+1) array.

FIG. 3H is a schematic diagram of a product C1 array 306H, in accordance with some embodiments.

C1 array 306H is an example of C1 array 306A of FIG. 3A. C1 array 306H is an ExG array. Each location (i,j) in C1 array 306H represents a corresponding word C[i][j]. As such, C1 array 306H includes locations C[0][0], . . . , C[E-1][G-1].

C1 array 306H is the product of W2 array 304G and XIN3 array 305D, i.e., C1=W2*XIN3. C1 array 306H is an example of an array whose rows have been generated on a row-by-row basis by multiplier 352 of FIG. 3A, or the like. A bottom row 388 of C1 array 306H (see FIG. 3J) represents a row vector R_ChkSum_2 that is a counterpart to row R_ChkSum_1 vector 386D of FIG. 3D. A rightmost column 389 of C1 array 306H (see FIG. 3J) represents a column vector C_ChkSum_2 that is a counterpart to column C_ChkSum_1 vector 387G of FIG. 3G.

Figure 3J:
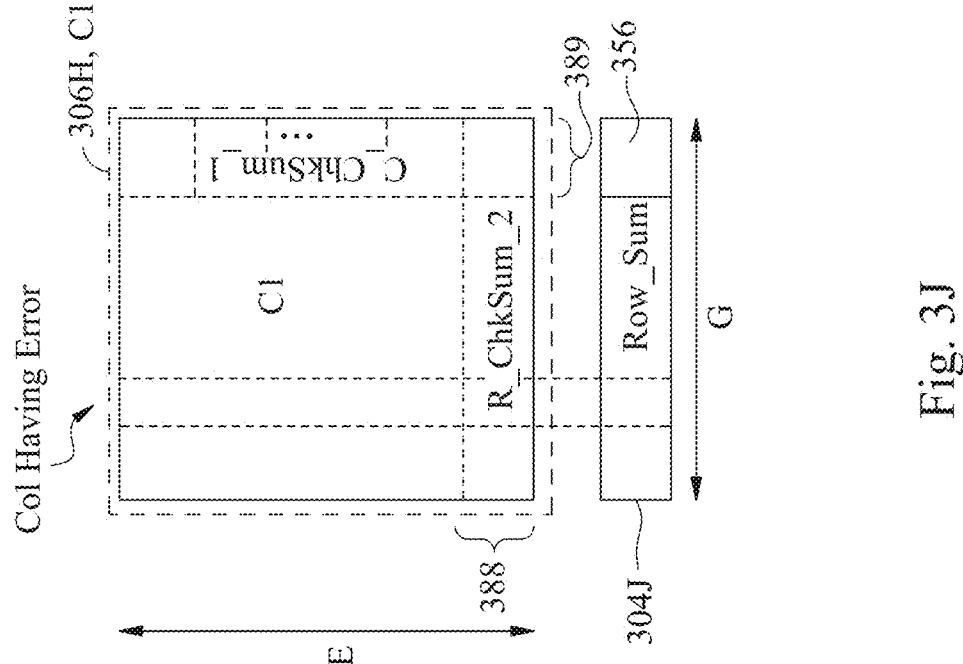
Figures 3K, 3L:
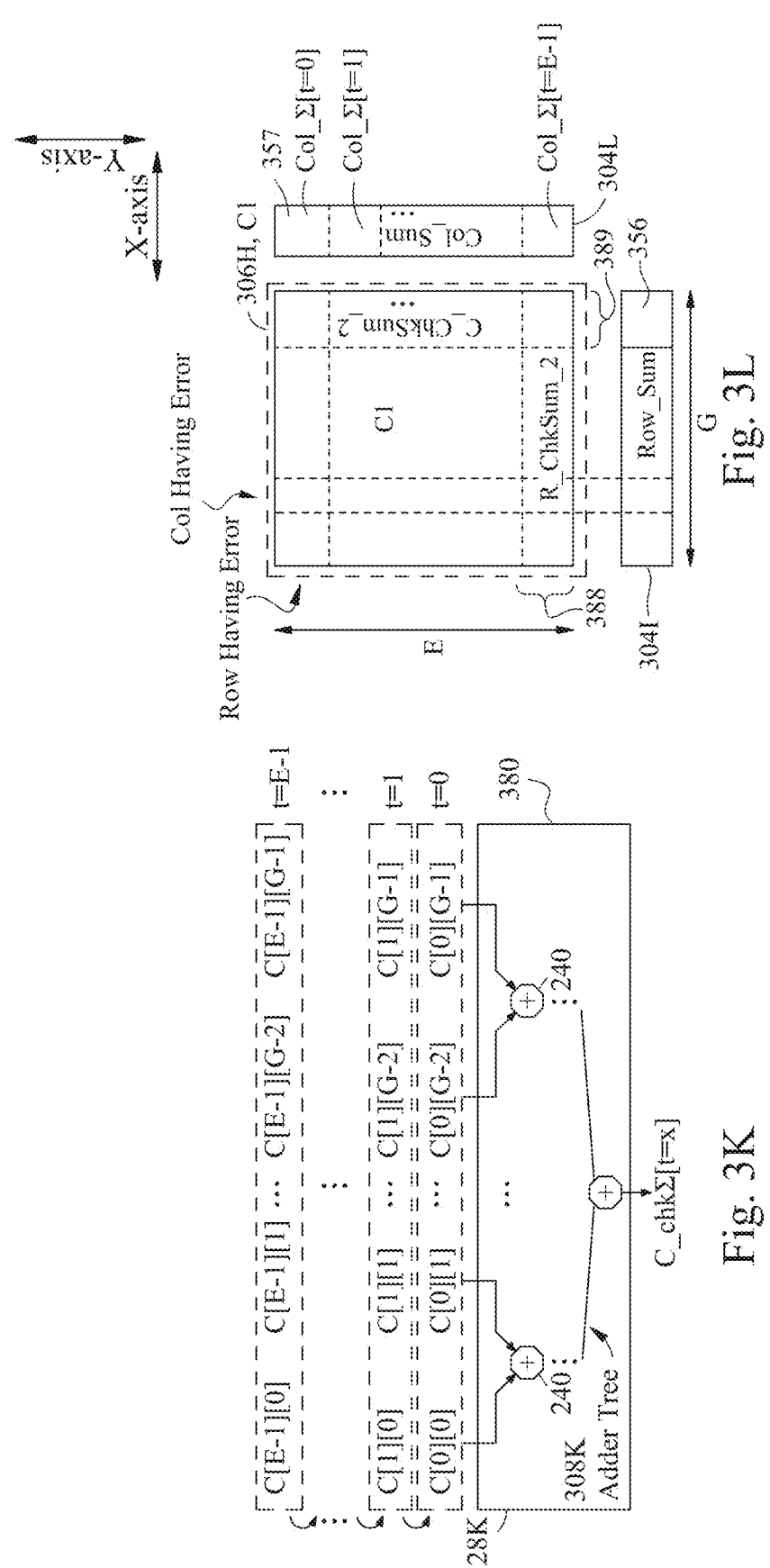
Figure 3M:
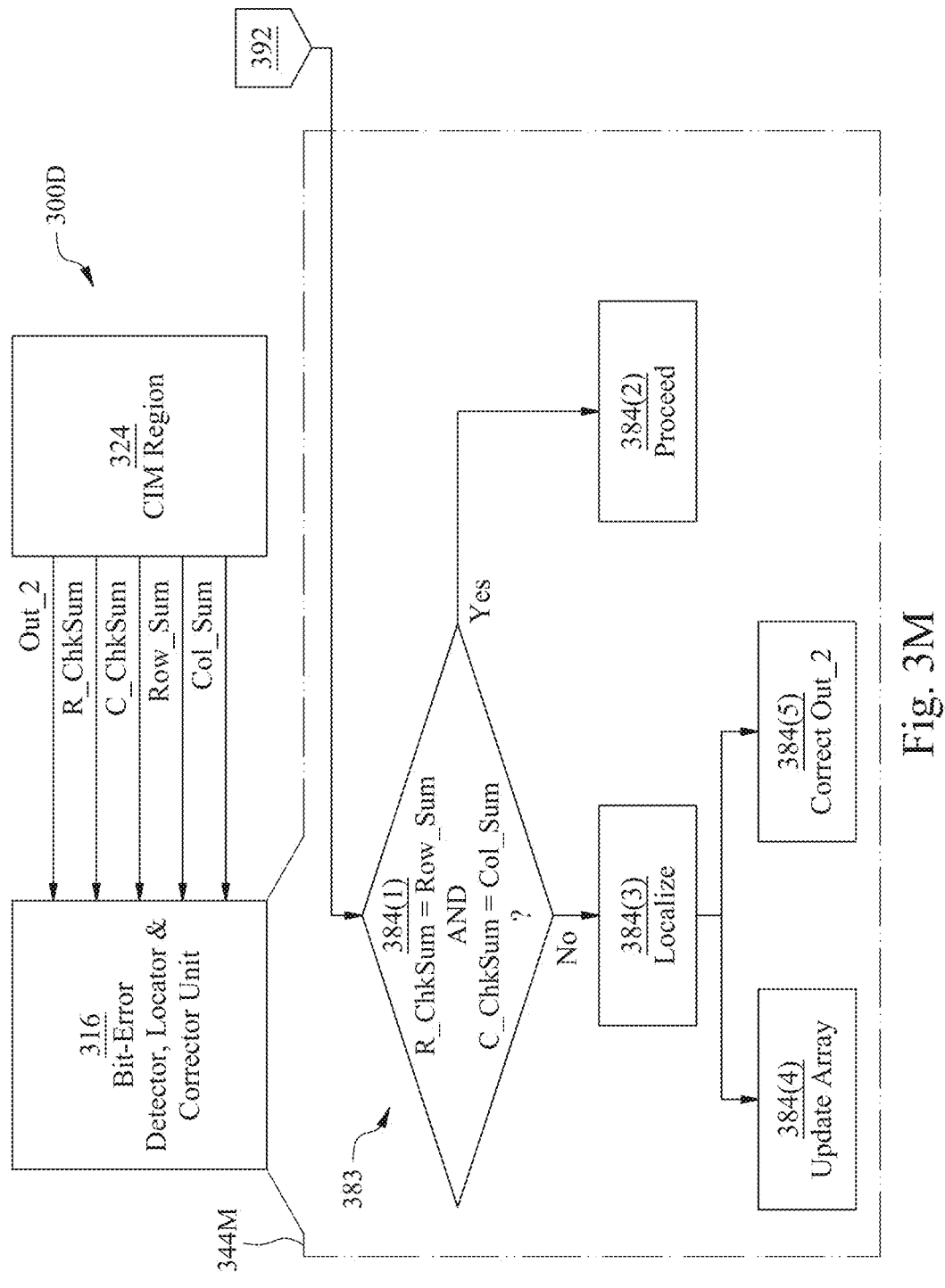

C1 array 306H is operated on by at least the following: a row sum generator (see FIGS. 3I-3J) to generate a row vector Row_Sum that is used by a bit-error detector, locator & corrector (see FIG. 3M); and a column sum generator (see FIGS. 3K-3L) to generate a column vector Col_Sum that also is used by the bit-error detector, locator & corrector (see FIG. 3M).

FIG. 3I is a schematic diagram of a row sum generator 326I, in accordance with some embodiments.

Row sum generator 326I is a row checksum generator configured to generate a row sum 304J of FIG. 3J. Row sum generator 326I is an example of row sum generators 127 of FIG. 1D, or the like. Row sum generator 326I is an array of G recursive adders 377 corresponding to the G columns of C1 array 306H. Each recursive adder 377 is configured to generate a sum corresponding to words in the corresponding column of C1 array 306H by column-wise adding the words C[i][j] in the corresponding column on a row-by-row basis. At time t=0, adders 240 add the corresponding words in row 0 of C1 array 306H and the words in corresponding registers 382 (all of which were initialized previously to zero), and stores/overwrites the t-0 sums in corresponding registers 382. At time t=1, adders 240 add the corresponding words in row 1 of C1 array 306H and the t-0 words in corresponding registers 382, and stores/overwrites the t=1 sums in corresponding registers 382 . . . . At time t=N-1, adders 240 add the corresponding words in row N-1 of C1 array 326I and the t=N-2 words in corresponding registers 382, and stores/overwrites the t=N-1 sums in corresponding registers 382. The t=N-1 words in the G instances of register 382 represent a row vector Row_Sum, which is shown as 304J in FIG. 3J.

FIG. 3J is a schematic diagram of Row_Sum vector 304J, in accordance with some embodiments.

In FIG. 3J, Row_Sum vector 304J is shown proximal to, and aligned below, C1 array 306H. In some embodiments, Row_Sum vector 304J is a 1D array of one-bit memory cells 356.

FIG. 3K is a schematic diagram of a column sum generator 328K, in accordance with some embodiments.

Column sum generator 328K is a column checksum generator configured to generate a column vector sum Col_Sum of FIG. 3L. Column sum generator 328K is an example of column sum generators 128 of FIG. 1D, or the like. Column sum generator 328K includes an adder tree 308K(Q-1.) On a row-by-row basis, column sum generator 328K is configured to generate a sum corresponding to words in a given row of C1 array 306H and store the sum in a corresponding row of column vector Col_Sum 304L of FIG. 3L. At time t=0, generator 328K adds the corresponding words in row 0 of C1 array 306H and stores the resulting sum as a word ColΣ(T=0) in row 0 of column vector Col_Sum 304L. At time t=1, generator 328K adds the corresponding words in row 1 of C1 array 306H and stores the resulting sum as a word ColΣ(T=1) in row 1 of column vector Col_Sum 304L. . . . At time t=E-1, generator 328K adds the corresponding words in row N-1 of C1 array 306H and stores the resulting sum as a word ColΣ(T=E-1) in row E-1 of column vector Col_Sum 304L.Together, words ColΣ (T=0), . . . , ColΣ(T=E-1) represent column vector Col_Sum 304L, which is shown as Col_Sum 304L in FIG. 3L.

FIG. 3L is a schematic diagram of Row_Sum vector 304J and Col_Sum vector 304L, in accordance with some embodiments.

In FIG. 3J, Col_Sum vector 304L is shown proximal to, and aligned to the right of, C1 array 306H. Also in FIG. 3J, Row_Sum vector 304J is shown proximal to, and aligned below, C1 array 306H. In some embodiments, Col_Sum vector 304L is a 1D array of one-bit memory cells 357.

FIG. 3M is a schematic diagram of a digital CIM system 300D, in accordance with some embodiments.

CIM system 300D is an example of CIM system 100D of FIG. 1D, 100E of FIG. 1E, or the like. CIM system 300D includes a CIM region 324 and a bit-error detector, locator & corrector (DLC) unit 316.

CIM region 324 is an example of CIM region 124D of FIG. 1D, a combination of CIM region 124E and region 114E of FIG. 1E, or the like. DLC unit 316 is an example of bit-error detector, locator & corrector 130 of FIGS. 1D, 1E, or the like.

DLC unit 316 is configured to receive output signal Out_2, R_ChkSum, C_ChkSum, Row_Sum and Col_Sum from CIM region 304M and operate on the same according to a flowchart 383. In FIG. 3M, flowchart 383 is shown as an exploded view 344M of DLC unit 316. The operation of DLC unit 316 is also discussed in the context of FIGS. 4C-4G.

Flowchart 383 includes blocks 384(1)-384(5). In some embodiments, flow proceeds to block 384(1) from block 560 of FIG. 5D, as indicated by off-page connector 392.

At block 384(1), a decision is made whether (1) R_ChkSum=Row_Sum and (2) C_ChkSum=Col_Sum. If the outcome of block 384(1) is yes, then flow proceeds to block 384(2).

At block 384(2), flow stops because there is no bit-error, hence no bit-error correction needs to be made to output signal Out_2. However, if the outcome of block 384(1) is no, then there is a bit-error such that bit-error correction is needed and accordingly flow proceeds to block 384(3).

At block 384(3), localization of the bit-error is performed. An example of how localization is performed is provided by FIGS. 4C-4F. From block 384(3), flow proceeds to blocks 384(4) and 384(5).

At block 384(4), the bit-error in W&C array 304A identified by block 384(3) is updated. In some embodiments, DLC unit 316 is configured to update the word having the bit-error by writing an uncorrupted word into memory cells 349 in the word identified in block 384(3) as having the bit-error, e.g., by copying data bits representing an uncorrupted version of the word from a source copy or archival copy of W&C array 304A. For example, the source copy or archival copy is stored outside of the CIM region containing W&C array 304A.

At block 384(5), the value of output signal Out_2 is corrected. In some embodiments, output signal Out_2 is stored in a first register. In some embodiments, DLC unit 316 is configured to multiply the current multiplicand, i.e., the corresponding one of the input columns of XIN1, and the current multiplier, i.e., the corresponding one of the data rows in W&C array 304A, to form a corrected product and write the corrected product into the first register.

In some embodiments, block 384(4) and 384(5) are executed substantially concurrently. In some embodiments, block 384(4) is executed before block 384(5). In some embodiments, block 384(5) is executed before block 384(4).

According to another approach which is a counterpart to the CIM system of which CIM region 324 or the like and DLC unit 316 forms a part, (1) a weight array is stored in a first region of a first die, and (2) bit-error detection, localization and correction (DLC) is done entirely by a processor and associated RAM which correspondingly are on at least a second die. To perform the bit-error DLC according to the other approach, substantial amounts of data are transferred from the weight array on the first die to processor on the second die (off-die transfer) which incurs substantial transfer delays and thus substantially reduces the speed to bit-error DLC according to the other approach. By contrast, at least some embodiments substantially reduce the amount of off-die transfer associated with bit-error detection, localization and correction (DLC) as compared to the other approach and thus achieve substantially faster bit-error DLC as compared to the other approach.

That is, according to at least some embodiments, row checksum generator 379, XIN3 array 305D, column checksum generator 380, W2 array 304G, C1 array 306H, row sum generator 326I, row vector Row_Sum 304J, column sum generator 328K, and column vector Col_Sum 304L are included in the same CIM region, e.g., CIM region 324, as W&C array 304A, MX array 337 and adder tree 308A, which increases arithmetic-operator-to-storage (AOS) proximity as compared to the other approach. According to at least some embodiments, the same-CIM-region proximity of (1) storage locations to (2) arithmetic units which access/manipulate the same leverages AOS proximity to substantially reduce the amount of off-die transfer included as part of the bit-error DLC according to at least some embodiments as compared to the other approach and thus achieves substantially faster DLC as compared to the other approach.

In more detail, according to at least some embodiments, the same-CIM-region proximity of (1) storage locations, represented by XIN3 array 305D, W2 array 304G, C1 array 306H, row vector Row_Sum 304J and column vector Col_Sum 304L, or the like, to (2) arithmetic units which access/manipulate the storage locations, the arithmetic units being represented correspondingly row checksum generator 379, column checksum generator 380, row sum generator 326I and column sum generator 328K, leverages AOS proximity to substantially reduce the amount of off-die transfer included as part of the bit-error DLC according to at least some embodiments as compared to the other approach and thus achieves substantially faster DLC as compared to the other approach.

FIG. 4A is a block diagram of a simple example of parity bit generation 466, in accordance with some embodiments.

Parity bit generation 466 is a simplistic example of how XOR gate 260(Q-1) of parity encoder 259(Q-1), or the like, generates the parity bits stored in parity array 221(Q-1) of FIG. 2B.

In FIG. 4A, a parity array 422 stores parity bits corresponding to data bits in a weights array 420. Weight values stored in weights array 420 are shown in base 10 notation with the equivalent base 2 notation being shown parenthetically. For example, at a location where row 2 and column 2 intersect (location (2,2)) in weights array 420, a weight of 3 is shown in base 10 notation, with the equivalent base 2 notation being shown parenthetically as 11, i.e., location (1,1) in parity array 422 corresponds to location (1,1) in weights array 420. Furthering the example, the value stored in location (1,1) of parity array 422 is 0, which represents having applied an XOR operation to the base 2 notation (1,1) for the value of 3 stored in location (1,1) of weights array 420, i.e., $1\string^1=0$.

The parity value stored in each location of parity array 422 represents the results of having applied an XOR operation to the base 2 notation shown in the corresponding location of weights array 420. For example, location (1,1) in parity array 422 corresponds to location (1,1) in weights array 420. Furthering the example, the value stored in location (1,1) of parity array 422 is 0, which represents having applied an XOR operation to the base 2 notation (1,1) for the value of 3 stored in location (1,1) of weights array 420, i.e., 1^1=0.

FIG. 4B is a block diagram of a simple example of bit-error detection 468, in accordance with some embodiments.

Bit-error detection 468 is a simplistic example of how bit-error detector 210(Q–1), or the like, detects a bit error in a corresponding row of weight array 220(Q–1).

FIG. 4B includes a weights array 472 which corresponds to weights array 420 of FIG. 4A except that weights array 472 is assumed to be experiencing a bit-error. In more detail, the weight value in location (1,1) of weights array 472 is corrupted and incorrectly shows 2 (10) rather than 3 (11).

FIG. 4B further includes: parity array 422 of FIG. 4A; an input array XIN1 470; a product array 474; and a bit-error detection array 476. Product array 474 represents the results of having multiplied input array XIN1 470 and weights array 472. Bit-error detection array 476 represents the results of having applied an XOR operation to the base 2 notation shown in the corresponding location in weights array 472 and value of the parity bit in the corresponding location of parity array 422.

A value of 0 in a given location of bit-error detection array 476 indicates that no bit-error exists in the corresponding location in weight array 472. By contrast, a value of 1 in the given location of bit-error detection array 476 indicates that a bit-error does exist in the corresponding location in weight array 472.

Regarding bit-error detection array 476, for example, location (1,1) in bit-error detection array 476 stores the result of having applied an XOR operation to the value in location (1,1) of weights array 472 and the value in location (1,1) of parity array 422. More particularly, the value stored in location (1,1) of bit-error detection array 476 is 1, which represents having applied an XOR operation to the base 2 notation (10) for the corrupted value of 2 stored in location (1,1) of weights array 420 and the parity value of 1 in location (1,1) of parity array 422, i.e., 1^0^0=1, where the caret (circumflex) character (^) is used to indicate an XOR operation applied to the bits in a bit string 100. By contrast, if location (1,1) in weights array 420 was not corrupted, i.e., if location (1,1) stored 3 (11) rather than 2 (1,0), then location (1,1) of parity array 422 would show a parity value of 0, i.e., 1^1^0=0, which indicates that no bit-error exists.

Figure 4C:
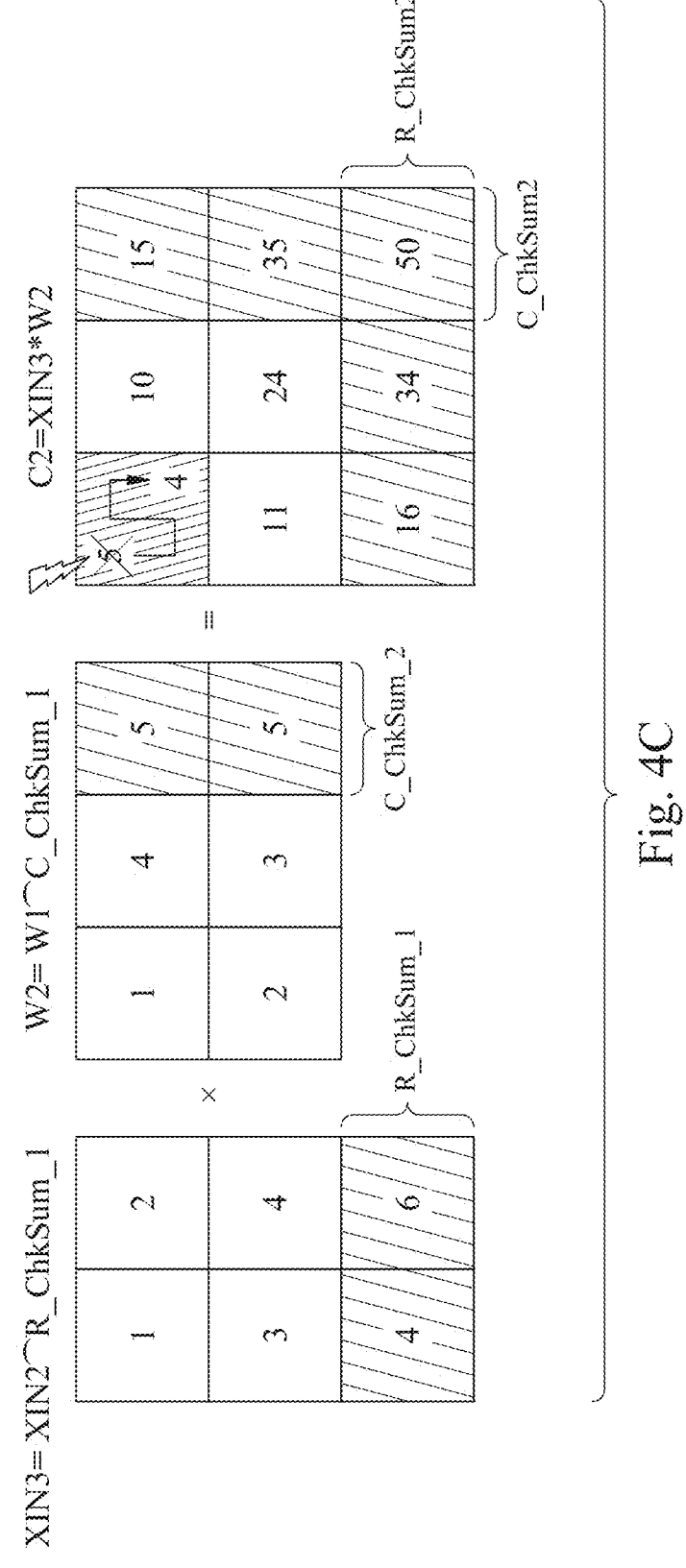

FIG. 4C is a block diagram of a simple example of checksum generation and array multiplication, in accordance with some embodiments.

In FIG. 4C, an array C2 is the product of an input array XIN3 and a weight array W2, where C2=XIN3*W2. C2 is shown has having a bit error, as discussed below.

Input array XIN3 is shown as being the result of appending row vector R_ChkSum_1 to input array XIN2 such that XIN3=XIN2⌒R_ChkSum_, where the symbol "⌒" is used to represent the appendation operator and the text string format "A⌒B" is used herein to denote B has been appended to A. For example, in XIN3, xin3_location (3,1)= 4, which is the sum of xin3_location (1,1)=1 plus xin_location(2,1)=3. The third/bottom row of XIN3 represents a row checksum R_ChkSum_1.

Weight array W2 is shown as being the result of appending column vector C_ChkSum_1 to weight array W1 such that W2=W1⌒C_ChkSum_1. For example, in W2, w2_location (3,1)=3, which is the sum of w2_location (1,1)=1 plus w2_location (1,2)=4. The third/rightmost column of W2 represents a column checksum C_ChkSum_1.

Regarding the multiplication C2=XIN3*W2, for example, consider c2_location (2,1)=11 in C2. The word c2_location (2,1)=11 is the sum of (i) the product of xin3_location (2,1)=3 and w2_location (1,1)=1 added to (ii) the product of xin3_location (2,2)=4 and w2_location (1,2)=2.

The third/bottom row of C2 represents a row checksum R_ChkSum_2 that is a counterpart to row checksum R_ChkSum_1 in the bottom row of XIN3. The third/rightmost column of C1 array 306H(Q–1) (see FIG. 3J) represents a column vector C_ChkSum_2 that is a counterpart to column C_ChkSum_1 vector 387G of FIG. 3G.

For purposes of bit-error identification, localization and correction (see FIGS. 4D-4G), c2_location (1,1) is shown in FIG. 4C as having suffered a latent bit error, i.e., a bit-error that arose after C2 was initially stored in memory. Absent the bit-error, c2_location (1,1) would have been c2_location (1,1)=5. However, the example assumes that the latent bit-error has caused c2_location (1,1) to have become c2_location (1,1)=4.

Figures 4D, 4E, 4F, 4G:
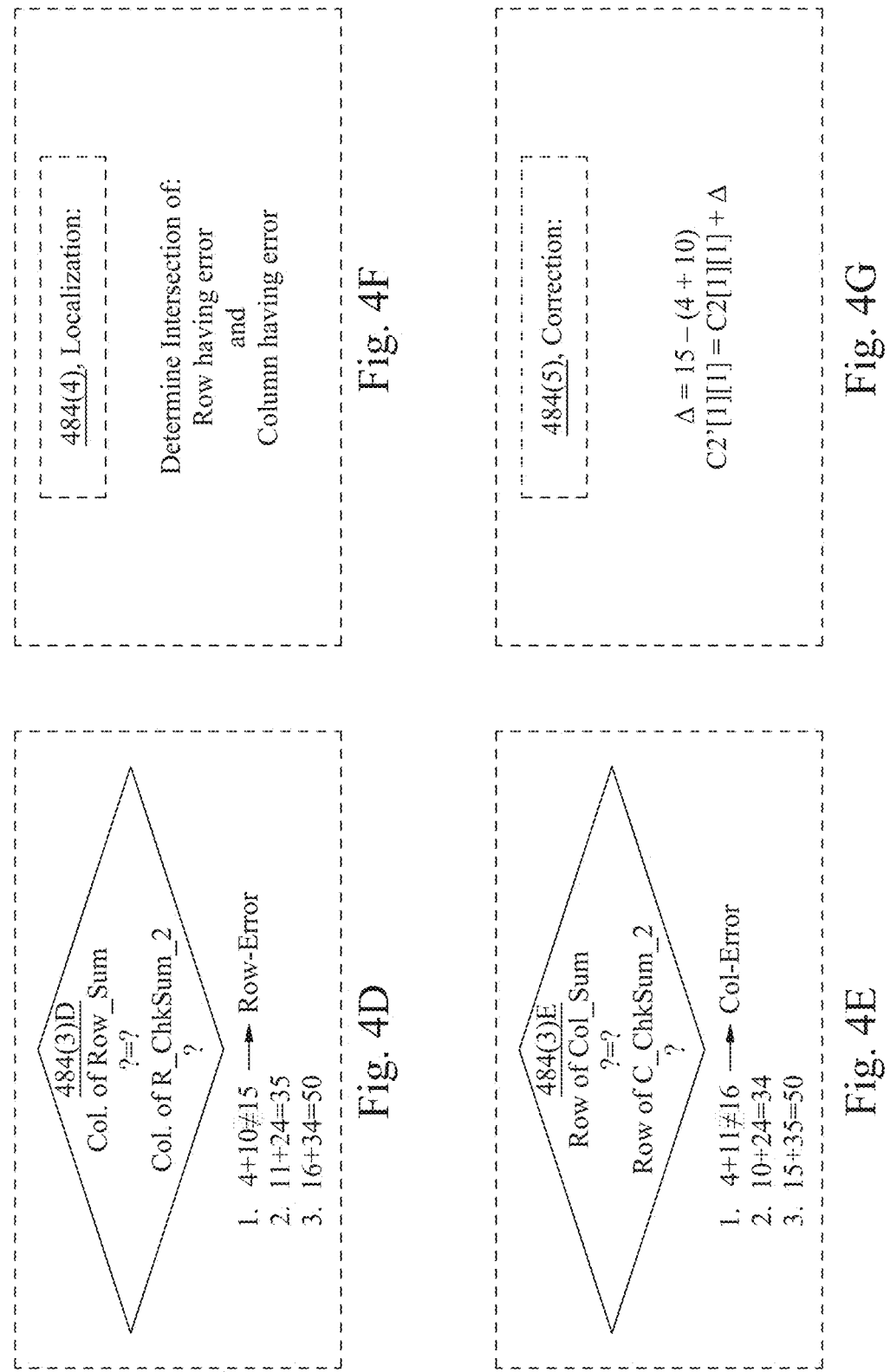

A column-error in c2_location (1,1) or c2_location (2,1) is detectable based on the checksum word in location (3,1); see FIG. 4D. Identification of a column-error implies that a bit-error has occurred in one of the non-checksum words stored in the corresponding column. Similarly, a column-error in c2_location (1,2) or c2_location (2,2) is detectable based on the checksum word in location (3,2).

A row-error in c2_location (1,1) or c2_location (2,1) is detectable based on the checksum word in location (3,1); see FIG. 4E. Similarly, a row-error in c2_location (1,2) or c2_location (2,2) is detectable based on the checksum word in location (3,2). Identification of a row-error implies that a bit-error has occurred in one of the non-checksum words stored in the corresponding row.

A bit-error in C2 is localizable as being the intersection of the column identified as having the column-error and the row identified as having the row-error; see FIG. 4F. Once localized, the bit-error is correctable; see FIG. 4G.

FIG. 4D is a block diagram of a simple example of row-error localization, in accordance with some embodiments.

In FIG. 4D (which extends the example of FIG. 4C), a decision block 484(3) D is shown which corresponds in part to block 384(3) of FIG. 3M, or the like. At block 484(3) D, on word-by-word basis, it is determined if sum (3,j) matches location (3,j) in R_ChkSum of C2.

To generate sum (3,1), a current column-wise summation is made of the non-checksum words in column 1 of C2, i.e., of errant c2_location (1,1)=4 and c2_location (2,1)=11, which yields a sum (3,1)=15. Here, the adjective current is used to connote that the summation is based on the current version of C2. Similarly, to generate sum (3,2), a column-wise summation is made of the non-checksum words in column 2 of C2. And to generate sum (3,3), a column-wise summation is made of the checksum words in rows 1 and 2 of column 3 of C2.

Sum (3,2) is determined to match, i.e., is determined as being equal to, the row checksum word in c2_location (3,2) which indicates that no column-error exists in row 2 of C2. Sum (3,3) is determined to match the row checksum word in c2_location (3,3) which indicates that no column-error exists in row 3 of C2. However, sum (3,1) is determined to not match, i.e., is determined as not being equal to, the row checksum word in c2_location (3,1) which indicates that a row-error exists in row 1 of C2.

In FIG. 4E, sum (3,1)=15 represents a first mismatch as sum (3,1)=15 does not match the row checksum word in c2_location (3,1)=16. The underlying reason for the first mismatch is that the word in c2_location (1,1) represents a latent bit-error. The first mismatch is used to localize and correct the bit-error in c2_location (1,1) (see FIGS. 4D and 4F–4G).

FIG. 4E is a block diagram of a simple example of column-error localization, in accordance with some embodiments.

In FIG. 4E (which extends the example of FIG. 4C), a decision block 484(3) E is shown which corresponds in part to block 384(3) of FIG. 3M, or the like. At block 484(3) E, on word-by-word basis, it is determined if sum (i,3) matches location (i,3) in C_ChkSum of C2.

To generate sum (1,3), a current row-wise summation is made of the non-checksum words in row 1 of C2, i.e., of errant c2_location (1,1)=4 and c2_location (1,2)=10, which yields a sum (1,3)=14. Similarly, a row-wise summation is made of the non-checksum words in row 2 of C2 which yields sum (2,3). And a row-wise summation is made of the checksum words in columns 1 and 2 of row 3 of C2 which yields sum (3,3).

At block 484(3), sum (2,3) is determined to match the column checksum word in c2_location (2,3) which indicates that no row-error exists in column 2 of C2. Sum (3,3) determined to match the column checksum word in c2_location (3,3) which indicates that no row-error exists in column 3 of C2. However, sum (1,3) is determined to not match the row checksum word in c2_location (1,3) which indicates that a column-error exists in column 1 of C2.

In FIG. 4E, sum (1,3) represents a second mismatch as sum (1,3)=14 does not match column checksum word in c2_location (1,3)=15. The underlying reason for the second mismatch is that the word in c2_location (1,1) represents a latent bit-error. The second mismatch is used to localize and correct the bit-error in c2_location (1,1) (see FIGS. 4E–4G).

FIG. 4F is a block diagram of a simple example of bit-error localization, in accordance with some embodiments.

In FIG. 4F (which extends the examples of FIGS. 4D-4E), a block 484(4) of localization is shown which corresponds to block 384(4) of FIG. 3M, or the like. At block 484(4), the intersection is determined between the following: the row identified as having a row-error in the context of FIG. 4D, i.e., namely row 1 of C2; and the column identified as having a column-error in the context of FIG. 4E, i.e., column 1 of C2. The intersection of row 1 and column 1 of C2 is c2_location (1,1). Hence, the intersection of row 1 and column 1 of C2 localizes the bit-error as being in c2_location (1,1).

FIG. 4G is a block diagram of a simple example of bit-error correction, in accordance with some embodiments.

In FIG. 4G (which extends the examples of FIGS. 4D-4F), a block 484(5) of correction is shown which corresponds to block 384(5) of FIG. 3M, or the like. At block 484(5), for the non-checksum location (i,j) in C2 determined at block 484(4) of FIG. 4D, a difference, Δ, is determined between sum (3,1) and c2_location (3,1) such that Δ=sum (3,1)-c3_location (3,1). Alternatively, difference A is determined between sum (1,3) and c2_location (1,3) such that Δ=sum (1,3)-c2_location (1,3). Next, a corrected value C' [1][1] to be stored/overwritten into c2_location is determined by adding Δ to the errant value C[1][1] in c2_location (1,1) such that C' [1][1]=C[1][1]+4.

Figure 5A:
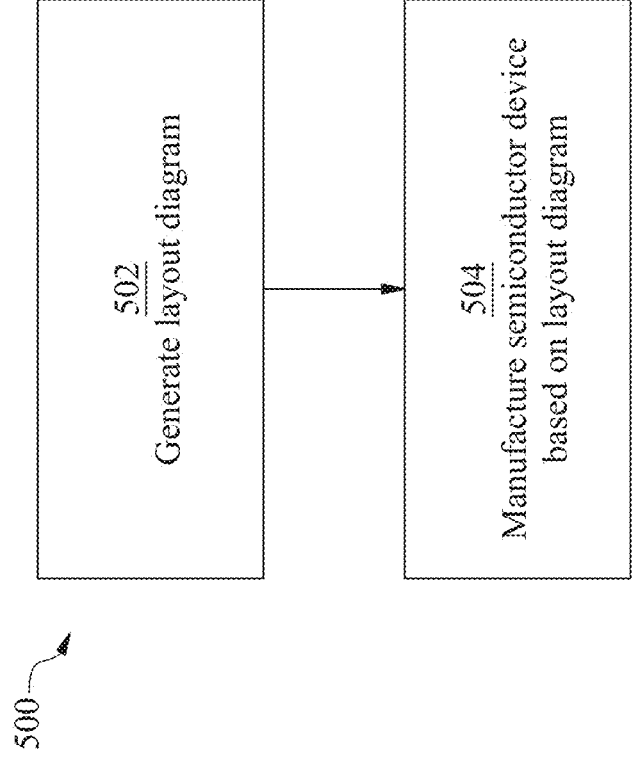

FIG. 5A is a flowchart 500 of a method of manufacturing a memory device, in accordance with some embodiments.

The method of flowchart (flow diagram) 500 is implementable, for example, using EDA system 600 (see FIG. 6, discussed below) and an IC manufacturing system 700 (see FIG. 7, discussed below), in accordance with some embodiments. Examples of a device which can be manufactured according to the method of flowchart 500 include devices based on the diagrams disclosed herein, or the like.

In FIG. 5A, the method of flowchart 500 includes blocks 502-504. At block 502, a layout diagram is generated which, among other things, includes one or more layout diagrams corresponding to CIM systems and/or regions of dies disclosed herein, or the like. Block 502 is implementable, for example, using EDA system 600 (see FIG. 6, discussed below), in accordance with some embodiments. From block 502, flow proceeds to block 504.

At block 504, based on the layout diagram, at least one of (A) one or more photolithographic exposures are made or (b) one or more photolithography masks are fabricated or (C) one or more components in a layer of a device, e.g., a semiconductor device is fabricated. See discussion below of IC manufacturing system 700 in FIG. 7 below.

Figure 5B:
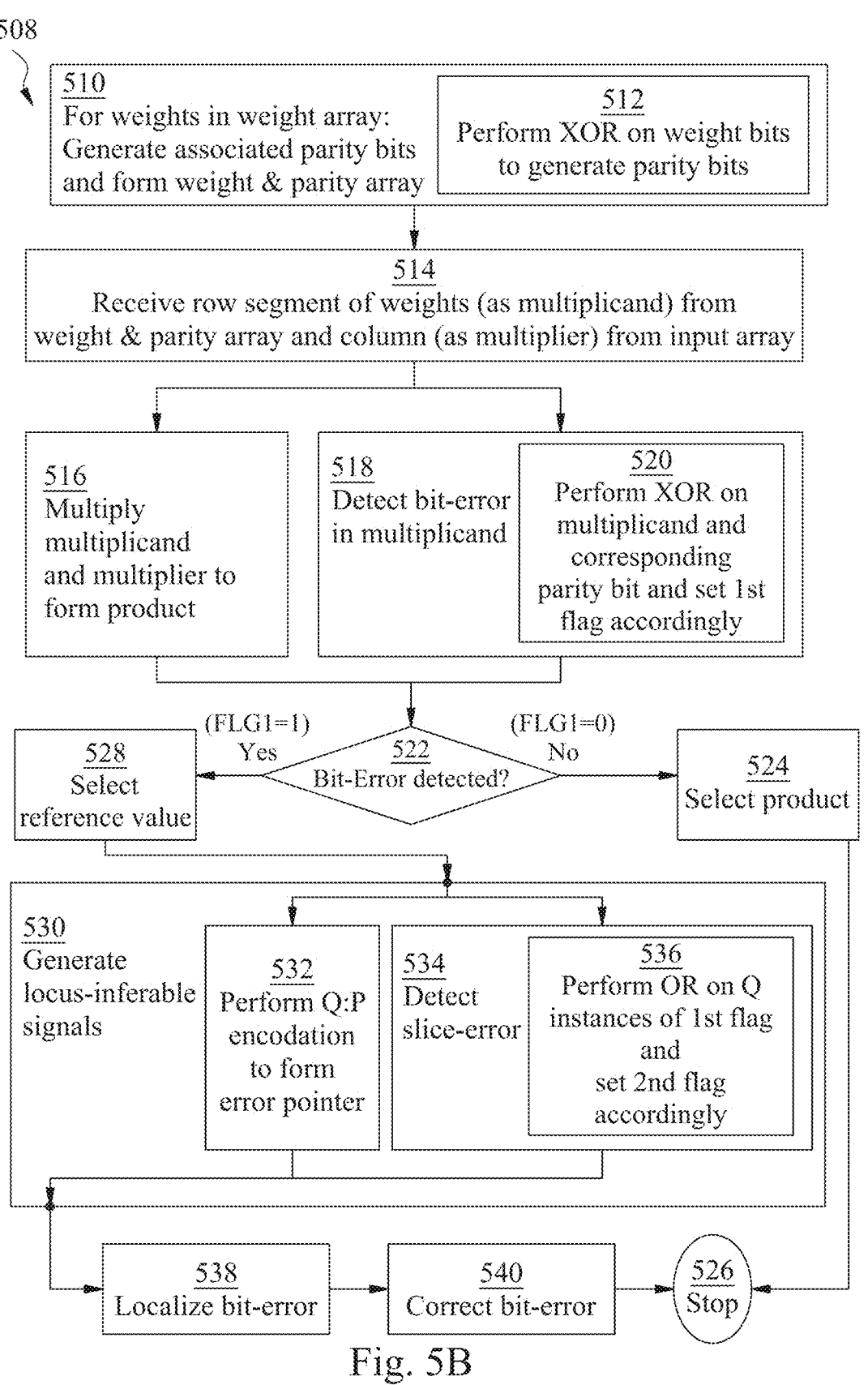

FIG. 5B is a flowchart 508 of a method of operating a CIM system, in accordance with some embodiments.

Examples of CIM systems that are operable according to the method of flowchart 508 include CIM systems 100A of FIG. 1A, 100C of FIG. 1C, or the like. Flowchart 508 includes blocks 510-540.

At block 520, for weight bits in a weight array, corresponding parity bits are encoded by a parity encoder and stored in a parity array. An example of the weight array is weight array 220(Q–1) of FIG. 2B, or the like. An example of the parity array is parity array 221(Q–1) of FIG. 2B, or the like. An example of the parity encoder is parity encoder 259(Q–1) of FIG. 2B, or the like. Block 510 includes block 512. Flow proceeds within block 510 to block 512.

At block 512, the parity encoder encodes the parity bits by performing an XOR operation on the weight bits by an XOR gate. An example of the XOR gate is XOR gate 260(Q–1), or the like. From block 512, flow exits block and proceeds to block 514.

In some embodiments, execution of block 514 occurs in temporal proximity to the execution of block 510. In some embodiments, execution of block 514 does not occur in temporal proximity to the execution of block 510.

At block 514, a segment of a row of weights from a weight & parity array and a column of inputs from an input array are received by a multiplier, the row segment and the column correspondingly representing a multiplicand and a multiplier. An example of the weight & parity array is slice 218(Q–1) of W&P array 204A of FIG. 2A, or the like. An example of a segment of the row of the weight & parity array is a data bits portion of any one of the N row segments in slice 218(Q–1) that is selected by a corresponding one of read word lines RWL [0]-RWL [N–1], or the like. An example of the input array is input array XIN1 of FIG. 2A, or the like. Examples of the multiplier include multipliers 251(0)-251(Q–1) correspondingly on EM blocks 238(0)-238(Q–1) of EM array 236 of FIG. 2A, or the like. From block 514, flow proceeds to each of blocks 516 and 518.

At block 516, the multiplicand and the multiplier are multiplied together by the multiplier to form a product. Examples of the product include the Q products PRD1(0)-PRD1(Q–1) generated by EM array 236, or the like. From block 516, flow proceeds to block 522 (discussed after the discussion of blocks 518-520).

At block 518, a bit-error in the multiplicand is detected by a bit-error detector which indicates the results of the bit-error detection by generating a first flag. Examples of the bit-error detector include bit-error detectors 210(0)-210(Q–1) correspondingly of EM blocks 238(0)-238(Q–1) of FIG.

2A, or the like, where each of bit-error detectors 210(0)-210(Q–1) generates a corresponding instance of a first error flag. Examples of the first error flag include the Q instances of flag FLG1 generated correspondingly by bit-error detectors 212(0)-212(Q–1), or the like. Within block 518, flow proceeds to block 520.

At 520, an XOR operation is performed by an XOR gate on the multiplicand to generate the first error flag. Examples of the XOR gate include XOR gates 253(0)-253(Q–1) correspondingly of EM blocks 238(0)-238(Q–1) of FIG. 2A, or the like. An example of the result of the XOR operation is a status of flag FLG1 generated by XOR gate 253(Q–1), i.e., whether flag FLG1 is asserted (FLG1=1) to indicate a bit-error or not asserted (FLG1-0) to indicate no bit-error, or the like. From block 520, flow exits block 518 and proceeds to block 522.

Block 518 is performed (or executed) in parallel with block 516. According to another approach which is a counterpart to block 518, i.e., performing bit-error detection of a bit-error in a memory counterpart to weight array 220(Q–1) is performed before multiplication is performed. Performing bit-error detection before multiplication according to the other approach uses two operation cycles. By contrast, performing blocks 516 and 518 in parallel according to at least some embodiments uses one operation cycle, which is one operation cycle faster as compared to the other approach.

At block 522, a decision is made whether a bit-error has been detected. An example of deciding whether a bit-error has been detected is determining if flag FLG1 has been asserted, i.e., if flag FLG1 has been set to 1, by XOR gate 253(Q–1), or the like. Depending upon the decision at block 522, flow proceeds either to block 524 or block 528.

If the decision at block 522 is no, i.e., if a bit-error has not been detected, then flow proceeds to block 524. At block 524, the product PRD1 is selected by a selector rather than a reference value. An example of the reference value is reference REF of FIG. 2A, or the like. An example of the selector is MUX 251(Q–1) of FIG. 2A, or the like, where MUX 251(Q–1) is configured to receive product PRD1(Q–1) and reference REF as inputs and flag FLG1 as a control signal, and is further configured to select product PRD(Q–1) when FLG=0. From block 524, flow proceeds to block 526, where flow stops.

If the decision at block 522 is yes, i.e., if a bit-error has been detected, then flow proceeds to block 528. At block 528, the reference value is selected by the selector rather than product PRD1. Extending the example of block 524, MUX 251(Q–1) is further configured to select reference REF when FLG=1. From block 528, flow proceeds to block 530.

At block 530, locus-inferable signals are generated by a locus-inferable data generator. An example of the locus-inferable data generator is locus-inferable data generator 212 of FIG. 2A, or the like, where generator 212 is configured to generate an error pointer and second error flag. An example of the error pointer is pointer PRD1(Q–1) of FIG. 2C, or the like. An example of the second error flag is flag FLG2, or the like. Within block 530, flow proceeds to blocks 532 and 534.

At block 532, a Q:P encodation of Q instances of the first flag is performed by an encoder resulting in the error pointer. Examples of the Q instances of the first flag are the Q instances of flag FLG1 generated correspondingly by bit-error detectors 212(0)-212(Q–1) correspondingly of EM blocks 238(0)-238(Q–1). An example of the encoder is Q:P encoder 262 of FIG. 2C, or the like, where encoder 262 generates an example of the error pointer, namely point EPT.

From block 532, flow proceeds to block 538 (which is discussed after blocks 534-536).

At block 534, a slice-error is detected by a slice-error detector which generates the second error flag based on the Q instances of the first flag. An example of the slice-error detector is slice-error detector 213 of FIG. 2C, or the like, which generates an example of the second error flag, namely flag FLG2. Within block 534, flow proceeds to block 536.

At 536, an OR operation is performed by an OR gate on the Q instances of the first flag to generate the second error flag. An example of the OR gate is OR gate 263 of locus-inferable data-generator 212, or the like, which generates an example of the second flag, namely flag FLG2. An example of the result of the OR operation is a status of flag FLG2 generated by OR gate 263, i.e., whether flag FLG2 is asserted (FLG2=1) to indicate a slice-error or not asserted (FLG2=0) to indicate no slice-error, or the like. From block 536, flow exits block 534 and proceeds to block 538.

At block 538, responsive to the second flag indicating a slice-error, e.g., to flag FLG2 being asserted (FLG1=1) to indicate a slice-error, the slice-error is localized by a bit-error-corrector. An example of the bit-error corrector is bit-error corrector 216 of FIG. 2D, or the like. An example of bit-error localization is block 265(3) of flowchart 290 of FIG. 2D, or the like. From block 538, flow proceeds to block 540.

At block 540, the bit-error is corrected by the bit-error corrector. An example of bit-error correction is one or more of blocks 265(4)-265(5) of flowchart 290 of FIG. 2D, or the like. From block 540, flow proceeds to block 526, where flow stops.

FIG. 5C is a flowchart 543 of a method of manufacturing a CIM system, in accordance with some embodiments.

Flowchart 543 is an example of block 504 of FIG. 5A. The method of flowchart 543 is implementable, for example, using IC manufacturing system 700 (see FIG. 7, discussed below), in accordance with some embodiments. Examples of a digital CIM system which can be manufactured according to the method of flowchart 543 include CIM systems based on the CIM systems disclosed herein, or the like.

Flowchart 543 includes blocks 545-547. At block 545, in a first region of a first semiconductor die, first structures are formed that comprise first components, the first components including memory cells correspondingly configured to store single bits, multipliers and first bit-error detector. Also, first ones of the memory cells are arranged in corresponding first arrays and being configured to store first data bits. Second ones of the memory cells are arranged in corresponding second arrays and being configured to store parity bits corresponding to the first data bits. The first components are organized into first groups each of which include a corresponding one of the first arrays, the second arrays, the multipliers and the first bit-error detectors.

Regarding block 545, examples of the first structures include structures that comprise semiconductor devices, e.g., transistors, structures that facilitate coupling to transistors, or the like. In some embodiments, the structures that comprise transistors and the structures that facilitate coupling to transistors are formed in one or more first layers that are referred to collectively as a transistor layer. Examples of the transistors include field-effect transistors (FETs) such as positive-channel metal oxide semiconductor (PMOS) FETs (PFETs), negative-channel metal oxide semiconductor (NMOS) FETs (NFETs), or the like.

Examples of structures that comprise transistors include: active regions in a semiconductor layer; well regions around selected ones of the active regions; source/drain (S/D)

regions in active regions; channel regions in active regions between corresponding pairs of S/D regions; gate structures over corresponding ones of the active regions and (optionally) buried gate (BG) structures under corresponding ones of the active regions; or the like.

Examples of structures that facilitate coupling to transistors include: metal-to-source/drain (MD) contacts that are over and couple to S/D regions and (optionally) counterpart buried MD (BMD) contacts that are under and couple to S/D regions; metal-to-gate (MG) contacts that couple to gate structures and (optionally) counterpart buried MG (BMG) contacts that couple to BG structures; via-to-MD (VD) contacts that couple to MD contacts and counterpart buried VD (BVD) contacts that couple to BMD contacts; via-to-MG (VG) contacts that couple to MG contacts and counterpart buried VG (BVG) contacts that couple to BMG contacts; local interconnect (LI) structures that couple, e.g., MD contacts and/or gate structures together and (optionally) buried LI (BLI) structures that couple, e.g., BMD contacts and/or BG gate structures together; or the like.

Regarding block 545, examples of the first ones of the memory cells include memory cells 245 of FIG. 2A, or the like. Examples of the second ones of the memory cells include memory cells 246 of FIG. 2A, or the like. An example of the first array is weight array 220(Q−1) of FIG. 2A, or the like. An example of the second array is parity array 221(Q−1) of FIG. 2A, or the like. An example of the multipliers is multiplier 251(Q−1) of FIG. 2A, or the like. An example of the first bit-error detector is bit-error detector 212(Q−1) of FIG. 2A, or the like. An example of the first group is a group including slice 218(Q−1) and EM block 238(Q−1) of FIG. 2A, or the like. From block 545, flow proceeds to block 547.

At block 547, intercouplings are formed amongst the first components resulting in at least: for each first group, the multiplier being configured to perform a multiplication of input data bits and corresponding ones of the first data bits, and for each first group, the first bit-error detector being configured to perform a detection of a bit-error in the corresponding first data bits based on an associated one of the corresponding parity bits.

Regarding block 547, examples of forming intercouplings include forming signal segments and/or PG segments in metallization layers which are correspondingly over and (optionally) under the transistor layer. In some embodiments, signal segments are conductive and that are configured to carry signals including input/output (I/O) signals, control signals, or the like. In such embodiments, signal segments are coupled correspondingly to VD contacts, MG contacts, (optionally) BVD contacts, (optionally) BVG contacts, or the like. In some embodiments, PG segments that are conductive and that are configured to be energized with corresponding ones of reference voltages of a power grid (PG). In such embodiments, PG segments are coupled correspondingly to VD contacts, MG contacts, (optionally) BVD contacts, (optionally) BVG contacts, or the like. For example, first ones of such PG segments are configured for energization with a first reference voltage, e.g., VDD, and second ones of such PG segments are configured for energization with a second reference voltage, e.g., VSS.

In some embodiments, regarding block 547, the forming intercouplings amongst the first components further results in at least, for each first group (e.g., 244(1)), the first bit-error detector (e.g., (210(Q−1)) being configured to perform the detection of the bit-error in the corresponding first data bits based on the corresponding first data bits and the parity bits.

In some embodiments, regarding block 547, the forming intercouplings amongst the first components (e.g., block 547) further results in at least, for each first group (e.g., 244(1)), the first bit-error detector (e.g., 210(Q−1)) being further configured to perform the detection in parallel with the multiplication performed by the multiplier (e.g., 251 (N−1)).

In some embodiments, regarding block 547, the forming intercouplings amongst the first components (e.g., block 547) further results in at least, for each first group (e.g., 244(1)), the CIM system being configured to perform localization of the bit-error after the detection is performed.

In some embodiments, the forming intercouplings amongst the first components (e.g., block 547) further results in at least, for each first group (e.g., 244(1)), the CIM system being configured to perform correction of the bit-error after the localization is performed.

In some embodiments, flowchart 543 further includes a first block in which, in the first region (e.g., 103) of the first semiconductor die (e.g., (102A/C(1)), second structures are formed that comprise second components, the second components including multiplexers (e.g., 254A). In such embodiments, each first group (e.g., 244(1)) further includes a corresponding one of the multiplexers (e.g., 254A). In such embodiments, flowchart 543 further includes a second block in which intercouplings are formed amongst at least the second components or the first components resulting in at least, for each first group (e.g., 244(1)), the multiplexer (e.g., 254A) being configured to select (e.g., i) a product produced by the multiplier (e.g., 251 (N−1)) or (e.g., ii) a predefined value based on an output signal generated by the first bit-error detector (e.g., 210(Q−1)).

In some embodiments, flowchart 543 further includes a first block in which, in the first region (e.g., 103) or a second region (e.g., 155(1)) of the first semiconductor die (e.g., (102A/C(1)) or in a first region (e.g., 155(2)) of a second semiconductor die (e.g., (102C(2)), second structures are formed that comprise second components, the second components including parity encoders (e.g., 158). In such embodiments, each first group (e.g., 244(1)) further includes a corresponding one of the parity encoders (e.g., 158). In such embodiments, flowchart 543 further includes a second block in which intercouplings are formed amongst at least the second components or the first components resulting in at least, for each first group (e.g., 244(1)), the parity encoder (e.g., 158) being configured to encode corresponding ones of the parity bits based on the corresponding first data bits.

In some embodiments, flowchart 543 further includes a first block in which, in the first region (e.g., 103) of the first semiconductor die (e.g., (102A/C(1)), third structures are formed that comprise third components, the third components including exclusive OR (e.g., XOR) gates (e.g., 260 (x)), the XOR gates (e.g., 260(x)) being included as parts correspondingly of the parity encoders (e.g., 158). In such embodiments, each first group (e.g., 244(1)) further including a corresponding one of the XOR gates (e.g., 260(x)). In such embodiments, flowchart 543 further includes a second block in which intercouplings are formed amongst at least the third components, the first components or the second components resulting in at least, for each first group (e.g., 244(1)), the XOR gate (e.g., 253(x)) being configured to operate on a row-by-row basis including receiving a row of the first data bits as inputs, correspondingly generating a parity bit, and storing the parity bit in a corresponding row of the second array (e.g., 221 (N−1)).

In some embodiments, flowchart 543 further includes a first block in which, in the first region (e.g., 103) of the first semiconductor die (e.g., (102A/C(1))), second structures are formed that comprise second components, the second components including exclusive OR (e.g., XOR) gates (e.g., 253($x$)), the XOR gates (e.g., 253($x$)) being included as parts correspondingly of the first bit-error detectors (e.g., 210(Q–1)). In such embodiments, each first group (e.g., 244(1)) further includes a corresponding one of the XOR gates (e.g., 253($x$)). In such embodiments, flowchart 543 further includes a second block in which intercouplings are formed amongst at least the second components or the first components resulting in at least, for each first group (e.g., 244(1)), the XOR gate (e.g., 253($x$)) being configured to receive the first data bits and the parity bits as inputs and generate an output signal based thereon which represents a first flag signal (e.g., FLG1) that is assertable to indicate that a bit-error is present.

In some embodiments, flowchart 543 further includes a first block in which, in the first region (e.g., 103) or a second region (e.g., 155(1)) of the first semiconductor die (e.g., (102A/C(1))) or in a first region (e.g., 155(2)) of a second semiconductor die (e.g., (102C(2))), second structures are formed that comprise second components, the second components including a locus-inferable data generator (e.g., 112). In such embodiments, flowchart 543 further includes a second block in which intercouplings are formed amongst at least the second components or the first components resulting in at least the locus-inferable data generator (e.g., 112) being configured to generate one or more bit-error locus-inferable signals (e.g., EPT & FLG2 FIG. 2C) based on the parity bits.

In some embodiments, flowchart 543 further includes a first block in which, in the first region (e.g., 103) or the second region (e.g., 155(1)) of the first semiconductor die (e.g., (102A/C(1))), third structures are formed that comprise third components, the third components including a Q: P encoder (e.g., 262) and a second bit-error detector (e.g., 213), the Q: P encoder (e.g., 262) and the second bit-error detector (e.g., 213) being included in the locus-inferable data generator (e.g., 112). In such embodiments, flowchart 543 further includes a second block in which intercouplings are formed amongst at least the third components, the first components or the second components resulting in at least: for each first group (e.g., 244(1)), the first bit-error detector (e.g., 210(Q–1)) being further configured to generate an output signal which represents a first flag signal (e.g., FLG1) that is assertable to indicate that a bit-error exists; for each first group (e.g., 244(1)), the first array (e.g., 220 (N–1)) being arranged in rows and Q columns, where Q is a positive integer; for each first group (e.g., 244(1)), there being Q first groups (e.g., 244(1)) and corresponding Q instances of the first flag signal (e.g., FLG1); for each first group (e.g., 244(1)), the locus-inferable data generator (e.g., 212) being configured to receive the Q instances of the first flag signal (e.g., FLG1); for each first group (e.g., 244(1)), the Q: P encoder (e.g., 262) being configured to encode the Q instances of the first flag signal (e.g., FLG1) into a P bit signal which represents an error pointer (e.g., EPT), the error pointer (e.g., EPT) being a first one of the one or more bit-error locus-inferable signals, and P being a positive integer, and, for each first group (e.g., 244(1)), the second bit-error detector (e.g., 213) being configured to generate a second flag signal (e.g., FLG2) based on the Q instances of the first flag signal (e.g., FLG1), the second flag signal (e.g., FLG2) being assertable to indicate that the error pointer (e.g., EPT) is pointing to the bit-error, and the second flag signal (e.g., FLG2) being a second one of the one or more bit-error locus-inferable signals.

In some embodiments, flowchart 543 further includes a first block in which, in the first region (e.g., 103) of the first semiconductor die (e.g., (102A/C(1))), fourth structures are formed that comprise fourth components, the fourth components including OR gates (e.g., 263), the OR gates (e.g., 263) being correspondingly included in the second bit-error detectors (e.g., 213).

In such embodiments, flowchart 543 further includes a second block in which intercouplings are formed amongst at least the fourth components, the first components, the second components or the third components the first components resulting in at least, for each first group (e.g., 244(1)), the OR gate (e.g., 263) being configured to receive the Q instances of the first flag signal (e.g., FLG1) and generate an output signal based thereon which represents the second flag signal (e.g., FLG2).

Figure 5D:
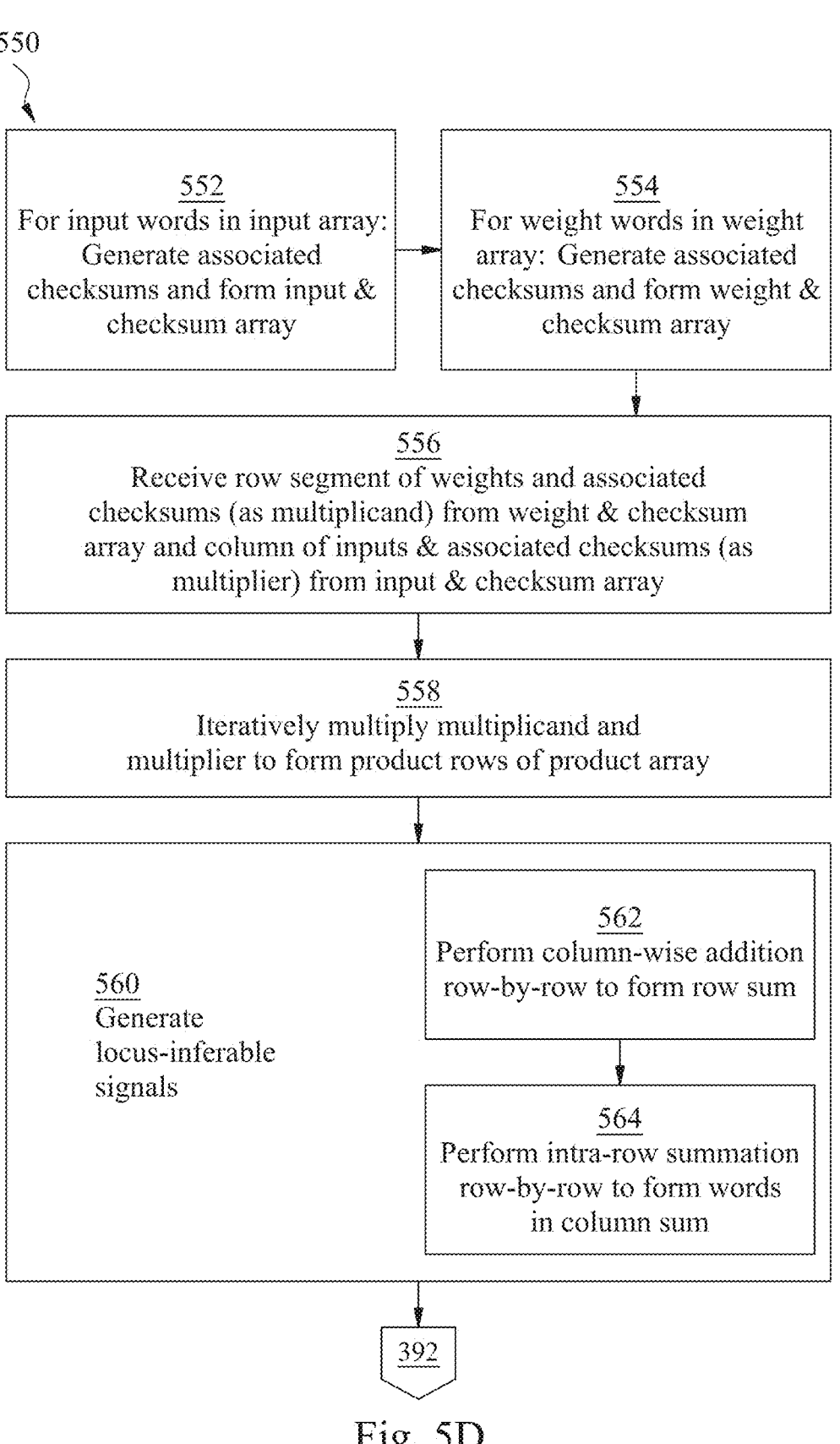

FIG. 5D is a flowchart 550 of a method of operating a CIM system, in accordance with some embodiments.

Examples of CIM systems that are operable according to the method of flowchart 550 include CIM systems 100D of FIG. 1D, 100E of FIG. 1E, or the like. Flowchart 550 includes blocks 552-564.

At block 552, for input words in an input array, corresponding checksums are generated by a row checksum generator, and the latter are appended to the input array to form an input & checksum (I&C) array. An example of the row checksum generator is row checksum generator 379 of FIG. 3C, or the like. An example of the input array is represented by XIN2 array 305B of FIG. 3B, or the like. An example of the checksums is row array R_ChkSum_1 386D of FIG. 3D, or the like. An example of the I&C array is XIN3 array 305D in FIG. 3D, or the like. From block 552, flow proceeds to block 554.

At block 554, for weight words in a weight array, corresponding checksums are generated by a column checksum generator, and the latter are appended to the weight array to form a weight & checksum (W&C) array. An example of the column checksum generator is column checksum generator 380 of FIG. 3F, or the like. An example of the weight array is represented by weight arrays 320(0)-320(Q–1) of FIG. 3A, or the like. An example of the checksums is represented by checksum arrays 323(0)-323(Q–1) of FIG. 3A, checksums C_chk≥(t=x) that comprising column checksum C_ChkSum_1 387G of FIG. 3G, or the like. An example of the W&C array is W2 array 304G in FIG. 3G, or the like. From block 554, flow proceeds to block 556.

At block 556, a row segment of weights and associated checksums (as a multiplicand) is received from the W&C array and a column of inputs & associated checksums (as a multiplier) is received from the I&C array by a multiplier. An example of the multiplier is represented by a combination of multipliers 364(0)-364(Q–1) of FIG. 3A, or the like. From block 556, flow proceeds to block 558.

At block 558, iteratively, the multiplicand is multiplied by the multiplier to form product rows of a product array. Examples of the product array and a product row therein correspondingly are W1 array 304E and a row (i) therein of FIG. 3E, or the like. From block 558, flow proceeds to block 560.

At block 560, locus-inferable signals are generated by locus-inferable signal generators.

Examples of the locus-inferable signals include row sum vector Row_Sum 304J of FIG. 3J, column sum vector Col_Sum 304L of FIG. 3L, or the like. Examples of the locus-inferable signal generators include row sum generator 326I of FIG. 3I, column sum generator 328K of FIG. 3K, or the like. Block 560 includes block 562 and block 564.

At block 562, a corresponding one of the locus-inferable signal generators performs column-wise addition row-by-row to form a row sum. An example of the row sum is row sum vector Row_Sum 304J of FIG. 3J, or the like. An example of a corresponding one of the locus-inferable signal generators is row sum generator 326I of FIG. 3I, or the like. From block 562, flow proceeds to block 564.

At block 564, a corresponding one of the locus-inferable signal generators performs intra-row addition on a row-by-row basis to form corresponding words of a column sum. An example of the column sum is column sum vector Col_Sum 304L of FIG. 3L, or the like. An example of a corresponding one of the locus-inferable signal generators is column sum generator 328K of FIG. 3K, or the like. From block 564, flow exits block 560 and proceeds to block 384(1) of FIG. 3M, as indicated by off-page connector 392.

In some embodiments, block 564 is executed before block 562. In some embodiments, block 562 and 564 are executed substantially concurrently.

FIG. 5E is a flowchart 573 of a method of fabricating a CIM system, in accordance with some embodiments.

Flowchart 573 is an example of block 504 of FIG. 5A. The method of flowchart 573 is implementable, for example, using IC manufacturing system 700 (see FIG. 7, discussed below), in accordance with some embodiments. Examples of a digital CIM system which can be manufactured according to the method of flowchart 573 include CIM systems 100D of FIG. 1D, 100E of FIG. 1E, or the like.

Flowchart 573 includes blocks 575-577.

At block 575, in a first region of a first semiconductor die, first structures are formed that comprise first components, the first components including memory cells correspondingly configured to store single bits, multipliers and locus-inferable data generators (LID) generators. Also, first ones of the memory cells are arranged in corresponding first arrays and are configured to store first words. The first components are organized into first groups each of which include a corresponding one of the first arrays, the multipliers and the LID generators. Regarding block 575, examples of the first structures include the examples of first structures discussed in the context of block 545 of FIG. 5C, or the like.

Examples of the first ones of the memory cells include memory cells 349 of FIG. 3A, or the like. An example of the first array is product array 306A of FIG. 3A, or the like. An example of the multiplier is multiplier 251(Q–1) of FIG. 2A, or the like. An example of the LID generator is LID generator 326A, or the like. An example of the first group is a group including slice 318(Q–1), multiplier 364(Q–1) and LID generator 326A of FIG. 3A, or the like. From block 575, flow proceeds to block 577.

At block 577, intercouplings are formed amongst the first components resulting in at least: for each first group, the multiplier being configured to perform one or more multiplications of (i) input words and associated first checksum words and (ii) corresponding weight words and associated second checksum words, and, for each first group, the LID generator being configured to perform generation of one or more LID signals based on selected ones of first words. Regarding block 577, examples of forming intercouplings include the examples of forming intercouplings discussed in the context of block 547 of FIG. 5C, or the like.

In some embodiments, flowchart 573 further includes a first block in which, in the first region (e.g., 124) or a second region (e.g., 155(3)) of the first semiconductor die (e.g., 102E(2)) or in a first region (e.g., 155(4)) of a second semiconductor die (e.g., 102E(2)), second structures are formed that comprise second components, the second components including a row checksum generator (e.g., 379). In such embodiments, flowchart 573 further includes a second block in which intercouplings are formed at least amongst the second components or one or more of the first components resulting in at least the row checksum generator (e.g., 379) being configured to generate the first checksum words (e.g., words in R_ChkSum_1) based on the input words (e.g., XIN2 305B).

In some embodiments, flowchart 573 further includes a first block in which, in a same region as is located the row checksum generator (e.g., 379), third structures are formed that comprise third components, the third components including recursive adders (e.g., 379), the recursive adders (e.g., 379) being included in the row checksum generator (e.g., 379). In such embodiments, second ones (e.g., 350) of the memory cells are arranged in a second array (e.g., XIN2 305B) and are configured to store the input words (e.g., XIN2 305B). In such embodiments, flowchart 573 further includes a second block in which intercouplings are formed amongst at least the first components or the second components further results in at least the second array (e.g., XIN2 305B) being arranged in first rows and one or more first columns, the input words (e.g., XIN2 305B) being correspondingly at intersections of the first rows and the one or more first columns (e.g., A[x][y]). In such embodiments: the second array (e.g., 305B) is a first part of a third array (e.g., XIN3 305D); third ones (e.g., 348) of the memory cells are arranged as a second part (e.g., 386D) of the third array (e.g., XIN3 305D) and correspondingly are configured to store second words representing the first checksum (first checksum words) (e.g., words in R_ChkSum_1); and the second part (e.g., 386D) of the third array (e.g., XIN3 305D) is arranged in second columns and a second row, the first checksum words (e.g., R_ChkSum_1) being correspondingly at intersections of the second columns and the second row. In such embodiments, flowchart 573 further includes a second block in which intercouplings are formed amongst at least the third components, the first components or the second components resulting in at least each of the recursive adders (e.g., 379) being configured to generate a corresponding one of the first checksum words (e.g., words in R_ChkSum_1) by column-wise recursively adding (e.g., 379) the input words (e.g., A[x][i]) in a corresponding one of the first columns.

In some embodiments, flowchart 573 further includes a first block in which, in the first region (e.g., 124) or a second region (e.g., 155(3)) of the first semiconductor die (e.g., 102E) or in a first region (e.g., 155(4)) of a second semiconductor die (e.g., 102E(2)), second structures are formed that comprise second components, the second components including column checksum generators (e.g., 180, 380). In such embodiments, each first group further includes a corresponding one of the column checksum generators (e.g., 380). In such embodiments, flowchart 573 further includes a second block in which intercouplings are formed amongst at least the second components or the first components resulting in at least or each of the first groups (e.g., 344+ 326A (e.g., Q–1)), the column checksum generator (e.g., 380) being configured to generate the second checksum words (e.g., C_ChkSum_1) based on the weight words (e.g., W1 304E).

In some embodiments, flowchart 573 further includes a first block in which, in a same region as are located the column checksum generators (e.g., 180, 380), third structures are formed that comprise third components, the third components including adder trees (e.g., 308F), the adder trees (e.g., 308F) being included as parts correspondingly of the column checksum generators (e.g., 180, 380). In such embodiments: second ones (e.g., 349) of the memory cells are arranged in a second array (e.g., W1 304E) and are configured to store the weight words (e.g., W1 304E); the second array (e.g., W1 304E) is arranged in first rows and first columns, the weight words (e.g., W1 304E) being correspondingly at intersections of the first rows and first columns correspondingly representing first words (e.g., B[x] [y]); the second array (e.g., W1 304E) is a first part of a third array (e.g., 304F); third ones (e.g., 350) of the memory cells are arranged as a second part (e.g., 387) of the third array (e.g., 304F) and correspondingly are configured to store the second checksum words (e.g., C_ChkSum_1); and the second part (e.g., 387) of the third array (e.g., 304F) is arranged in second rows and a second column, the second checksum words (e.g., C_ChkSum_1) being correspondingly at intersections of the second columns and the second rows.

In such embodiments, flowchart 573 further includes a second block in which intercouplings are formed amongst at least the third components, the second components or the first components resulting in at least, for each first group (e.g., 344+326A (e.g., Q–1)), the adder tree (e.g., 308F) being configured to generate the second checksum word by adding the weight words (e.g., B [i][y]) in a corresponding one of the first rows of the second array (e.g., W1 304E).

In some embodiments, flowchart 573 further includes a first block in which, in a same region as are located the locus-inferable data generators (e.g., 326I, 328K), second structures are formed that comprise second components, the second components including row sum generators (e.g., 326I), the row sum generators (e.g., 326I) being included as parts correspondingly of the locus-inferable data generators. In such embodiments: the first array (e.g., C1 306A FIG. 3H) is arranged in first rows and first columns, the first words being correspondingly at intersections of the first rows and first columns; and the first words (e.g., C1 FIG. 3H) represent product words. In such embodiments, flowchart 573 further includes a second block in which intercouplings are formed amongst at least the second components or the first components resulting in at least, for each of the first groups (e.g., 344+326A (e.g., Q–1)), the row sum generator (e.g., 326I) being configured to generate the row sum (e.g., Row_Sum FIG. 3J) based on the product words.

In some embodiments, the row sum (e.g., Row_Sum) is row vector comprised of second words. In such embodiments, flowchart 573 further includes a first block in which, third structures are formed that comprise third components, the third components including recursive adders (e.g., 379), the recursive adders (e.g., 379) being included as parts correspondingly of the row sum generators (e.g., 326I). In such embodiments, flowchart 573 further includes a second block in which intercouplings are formed amongst at least the third components, the second components or the first components resulting in at least, for each of the first groups (e.g., 344+326A(Q–1)), the recursive adder (e.g., 379) being configured to generate a corresponding one of the second words in the row sum (e.g., Row_Sum) by column-wise recursively adding the first words in a corresponding one of the first columns (e.g., C1 FIG. 3H).

In some embodiments, the first words in a selected one of the first rows (e.g., 388) represent third checksum (e.g., R_ChkSum_2 FIG. 3J). In such embodiments, flowchart 573 further includes a first block in which, in a second region (e.g., 114D) of the first semiconductor die (e.g., 102D) or in a first region (e.g., 114E) of a second semiconductor die (e.g., 102E(2)), third structures are formed that comprise third components, the third components including a processor (e.g., 114D/E, 316 FIG. 3M). In such embodiments, flowchart 573 further includes a second block in which intercouplings are formed amongst at least the third components, the second components or the first components resulting in at least the processor (e.g., 316) being configured to compare (e.g., 384(1)) the row sum (e.g., Row_Sum FIG. 3J) against corresponding ones of the third checksum (e.g., R_ChkSum_2 FIG. 3J) to identify a first row having a bit error.

In some embodiments, flowchart 573 further includes a first block in which, in a same region as are located the locus-inferable data generators (e.g., 326I, 328K), second structures are formed that comprise second components, the second components including column sum generators (e.g., 328K), the column sum generators (e.g., 328K) being included as parts correspondingly of the locus-inferable data generators. In such embodiments, the first array (e.g., C1 306A) is arranged in first rows and first columns, the first words being correspondingly at intersections of the first rows and first columns; and the first words represent product words. In such embodiments, flowchart 573 further includes a second block in which intercouplings are formed amongst at least the second components or the first components resulting in at least, for each of the first groups (e.g., 344+326A(Q–1)), generating (e.g., 328K) a column sum (e.g., Col_Sum FIG. 3L) based on the product words.

In some embodiments, the column sum (e.g., Col_Sum) is column vector comprised of second words. In such embodiments, flowchart 573 further includes a first block in which, in a same region as are located the column sum generators (e.g., 328K (e.g., Q–1)), forming third structures that comprise third components, the third components including adder trees (e.g., 308K), the adder trees (e.g., 308K) being included as parts correspondingly of the column sum generators (e.g., 328K). In such embodiments, flowchart 573 further includes a second block in which intercouplings are formed amongst at least the third components, the second components or the first components resulting in at least, for each of the first groups (e.g., 344+326A), the adder tree (e.g., 308K) being configured to generate the second words of the column sum (e.g., Col_Sum) on a row-by-row basis by adding the first words in a corresponding row of the first rows.

In some embodiments, the first words in a selected one of the first columns (e.g., 389 FIG. 3L) represent a fourth checksum (e.g., C_ChkSum_2 FIG. 3L).

In such embodiments, flowchart 573 further includes a first block in which, in a second region (e.g., 114D) of the first semiconductor die (e.g., 102D) or in a first region (e.g., 114E) of a second semiconductor die (e.g., (102E(2)), third structures are formed that comprise third components, the third components including a processor (e.g., 114D/E, 316M FIG. 3M).

In such embodiments, flowchart 573 further includes a second block in which intercouplings are formed amongst at least the third components, the second components or the first components resulting in at least the processor (e.g., 316) being configured to compare (e.g., 384(1)) the column sum (e.g., Col_Sum FIG. 3L) against corresponding ones of the fourth checksum (e.g., C_ChkSum_2 FIG. 3L) to identify a first column having a bit error.

In some embodiments, the forming intercouplings amongst the first components further results in at least, for each first group (e.g., 344+326A(Q–1)), the locus-inferable data generator (e.g., 326A) being further configured to perform the generation of one or more bit-error locus-inferable signals (e.g., Row_Sum FIGS. 3I-3J, Col_Sum FIGS. 3L-3M) subsequently to the one or more multiplications being performed by the multiplier (e.g., 251(N-1)).

Figure 6:
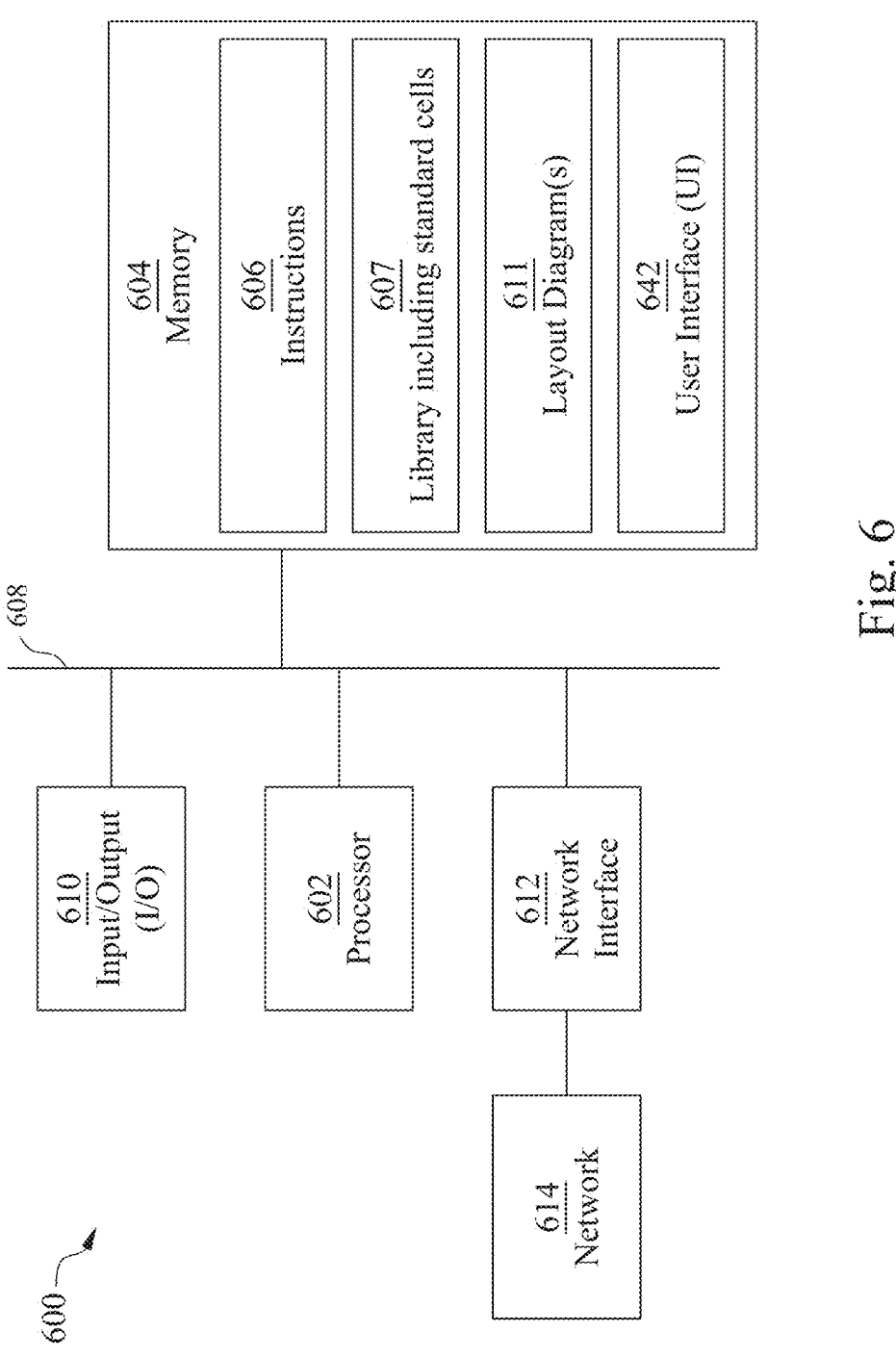
FIG. 6 is a functional block diagram of an electronic design automation (EDA) system in accordance with some embodiments.

FIG. 6 is a functional block diagram of an electronic design automation (EDA) system 600 in accordance with some embodiments.

In some embodiments, EDA system 600 includes an automatic placement and routing (APR) system. In some embodiments, EDA system 600 is a general purpose computing device including a hardware processor 602 and a non-transitory, computer-readable storage medium 604. Storage medium 604, amongst other things, is encoded with, i.e., stores, computer program code 606, i.e., a set of executable instructions. Execution of instructions, i.e., computer program code, 606 by hardware processor 602 represents (at least in part) an EDA tool which implements a portion or all of, e.g., methods such as the methods disclosed herein of generating layout diagrams, methods of generating layout diagrams such as the layout diagrams disclosed herein or layout diagrams corresponding to the devices disclosed herein, or the like, in accordance with one or more embodiments (hereinafter, the noted processes and/or methods).

Storage medium 604, amongst other things, stores layout diagrams 611 such as the layout diagrams disclosed herein, other the like.

Processor 602 is electrically coupled to computer-readable storage medium 604 via a bus 608. Processor 602 is further electrically coupled to an I/O interface 610 by a bus 608. A network interface 612 is further electrically connected to processor 602 via bus 608. Network interface 612 is connected to a network 614, so that processor 602 and computer-readable storage medium 604 are capable of connecting to external elements via network 614. Processor 602 is configured to execute computer program code 606 encoded in computer-readable storage medium 604 in order to cause system 600 to be usable for performing a portion or all of the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program code 606 configured to cause system 600 (where such execution represents (at least in part) the EDA tool) to be usable for performing a portion or all of the noted processes and/or methods. In one or more embodiments, storage medium 604 further stores information which facilitates performing a portion or all of the noted processes and/or methods. In one or more embodiments, storage medium 604 stores library 607 of standard cells including such standard cells as disclosed herein. In some embodiments, storage medium 604 stores one or more layout diagrams 611.

EDA system 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

EDA system 600 further includes network interface 612 coupled to processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 600.

System 600 is configured to receive information through I/O interface 610. The information received through I/O interface 610 includes one or more of instructions, data, design rules, libraries of standard cells, and/or other parameters for processing by processor 602. The information is transferred to processor 602 via bus 608. EDA system 600 is configured to receive information related to a user interface (UI) through I/O interface 610. The information is stored in computer-readable medium 604 as UI 642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 600. In some embodiments, a layout which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 7:
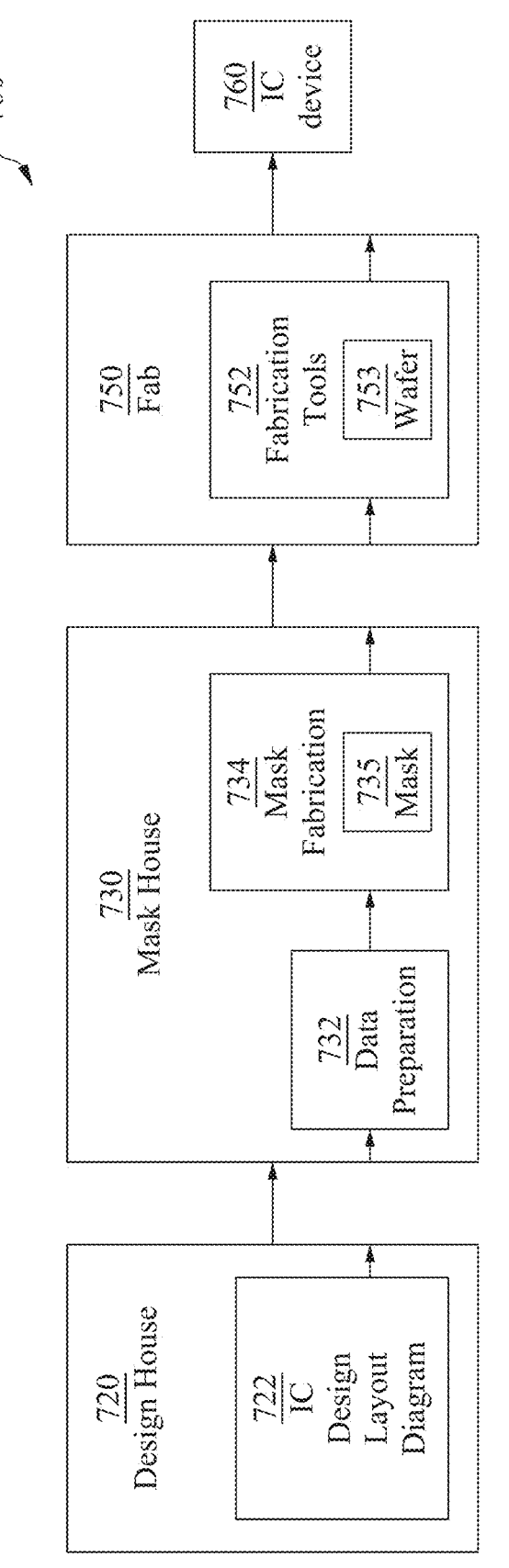
FIG. 7 is a functional block diagram of an integrated circuit (IC) manufacturing system, and an IC manufacturing flow associated therewith, in accordance with some embodiments.

FIG. 7 is a functional block diagram of an integrated circuit (IC) manufacturing system 700, and an IC manufacturing flow associated therewith, in accordance with some embodiments.

In some embodiments, based on the layout diagram generated by block 502 of FIG. 5A, the IC manufacturing system 700 implements block 504 of FIG. 5A wherein at least one of (A) one or more semiconductor masks or (B) at least one component in a layer of an inchoate semiconductor integrated circuit is fabricated using manufacturing system 700. In some embodiments, the IC manufacturing system 700 implements one or more of the flowcharts disclosed herein.

In FIG. 7, IC manufacturing system 700 includes entities, such as a design house 720, a mask house 730, and an IC manufacturer/fabricator ("fab") 750, that interact with one another in the design, development, and manufacturing cycles and/or services related to manufacturing an IC device 760. The entities in system 700 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and supplies services to and/or receives services from one or more of the other entities. In some embodiments, two or more of design house 720, mask house 730, and IC fab 750 is owned by a single larger company. In some embodiments, two or more of design house 720, mask house 730, and IC fab 750 coexist in a common facility and use common resources.

Design house (or design team) 720 generates an IC design layout 722. IC design layout 722 includes various geometrical patterns designed for an IC device 760. The geometrical patterns correspond to patterns of metal, oxide, or semiconductor layers that make up the various components of IC device 760 to be fabricated. The various layers combine to form various IC features. For example, a portion of IC design layout 722 includes various IC features, such as an active region, gate terminal, source and drain, metal lines or vias of an interlayer interconnection, and openings for bonding pads, to be formed in a semiconductor substrate (such as a silicon wafer) and various material layers disposed on the semiconductor substrate. Source/drain region(s) may refer to a source or a drain, individually or collectively, dependent upon the context. Design house 720 implements a proper design procedure to form IC design layout 722. The design procedure includes one or more of logic design, physical design or place and route. IC design layout 722 is presented in one or more data files having information of the geometrical patterns. For example, IC design layout 722 is expressed in a GDSII file format or DFII file format.

Mask house 730 includes data preparation 732 and mask fabrication 734. Mask house 730 uses IC design layout 722 to manufacture one or more masks 735 to be used for fabricating the various layers of IC device 760 according to IC design layout 722. Mask house 730 performs mask data preparation 732, where IC design layout 722 is translated into a representative data file ("RDF"). Mask data preparation 732 supplies the RDF to mask fabrication 734. Mask fabrication 734 includes a mask writer. A mask writer converts the RDF to an image on a substrate, such as a mask (reticle) or a semiconductor wafer. The design layout is manipulated by mask data preparation 732 to comply with particular characteristics of the mask writer and/or requirements of IC fab 750. In FIG. 7, mask data preparation 732, mask fabrication 734, and mask 735 are illustrated as separate elements. In some embodiments, mask data preparation 732 and mask fabrication 734 are collectively referred to as mask data preparation.

In some embodiments, mask data preparation 732 includes optical proximity correction (OPC) which uses lithography enhancement techniques to compensate for image errors, such as those that can arise from diffraction, interference, other process effects and the like. OPC adjusts IC design layout 722. In some embodiments, mask data preparation 732 further includes resolution enhancement techniques (RET), such as off-axis illumination, sub-resolution adjust features, phase-shifting masks, other suitable techniques, and the like or combinations thereof. In some embodiments, inverse lithography technology (ILT) is further used, which treats OPC as an inverse imaging problem.

In some embodiments, mask data preparation 732 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 734, which may undo part of the modifications performed by OPC in order to meet mask creation rules.

In some embodiments, mask data preparation 732 includes lithography process checking (LPC) that simulates processing that will be implemented by IC fab 750 to fabricate IC device 760. LPC simulates this processing based on IC design layout 722 to fabricate a simulated manufactured device, such as IC device 760. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been fabricated by LPC, if the simulated device is not close enough in shape to satisfy design rules, OPC and/or MRC are be repeated to further refine IC design layout 722.

The above description of mask data preparation 732 has been simplified for the purposes of clarity. In some embodiments, mask data preparation 732 includes additional features such as a logic operation (LOP) to modify the IC design layout according to manufacturing rules. Additionally, the processes applied to IC design layout 722 during data preparation 732 may be executed in a variety of different orders.

After mask data preparation 732 and during mask fabrication 734, a mask 735 or a group of masks 735 are fabricated based on the modified IC design layout. In some embodiments, an electron-beam (e-beam) or a mechanism of multiple e-beams is used to form a pattern on a mask (photomask or reticle) based on the modified IC design layout. The masks are formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask is an attenuated PSM or alternating PSM. The mask(s) generated by mask fabrication 734 is used in a variety of processes. For example, such a mask(s) is used in an ion implantation process to form various doped regions in the semiconductor wafer, in an etching process to form various etching regions in the semiconductor wafer, and/or in other suitable processes.

IC fab 750 is an IC fabrication business that includes one or more manufacturing facilities for the fabrication of a variety of different IC products. In some embodiments, IC fab 750 is a semiconductor foundry. For example, there may be a manufacturing facility for the front end fabrication of a plurality of IC products (front-end-of-line (FEOL) fabrication), while a second manufacturing facility may supply the back end fabrication for the interconnection and packaging of the IC products (back-end-of-line (BEOL) fabrication), and a third manufacturing facility may supply other services for the foundry business.

IC fab 750 uses mask (or masks) 735 fabricated by mask house 730 to fabricate IC device 760 using fabrication tools 752. Thus, IC fab 750 at least indirectly uses IC design layout 722 to fabricate IC device 760. In some embodiments, a semiconductor wafer 753 is fabricated by IC fab 750 using mask (or masks) 735 to form IC device 760. Semiconductor wafer 753 includes a silicon substrate or other proper substrate having material layers formed thereon. Semiconductor wafer further includes one or more of various doped regions, dielectric features, multilevel interconnects, and the like (formed at subsequent manufacturing steps).

In some embodiments, a compute-in-memory memory (CIM) system includes: in a first region of a semiconductor die, first components including memory cells correspondingly configured to store single bits, and arrays including multipliers and first bit-error detectors; first ones of the memory cells being arranged in corresponding first arrays and being configured to store first bits; second ones of the memory cells being arranged in corresponding second arrays and being configured to store parity bits corresponding to the first bits; and for first groups each of which including a corresponding one of the first arrays, the second arrays, the multipliers and the first bit-error detectors, the multiplier being configured to perform a multiplication of input bits and corresponding ones of the first bits, and the first bit-error detector being configured to perform a detection of a bit-error in the corresponding first bits based on the corresponding parity bits.

In some embodiments, for each first group, the first bit-error detector is further configured to perform the detection in parallel with the multiplication performed by the multiplier.

In some embodiments, the arrays of multipliers and first bit-error detectors correspondingly further include: multiplexers; and each first group further includes a corresponding one of the multiplexers; for each first group, and the multiplexer is configured to select (i) a product produced by the multiplier or (ii) a predefined value based on an output signal generated by the first bit-error detector.

In some embodiments, the CIM system further includes parity encoders, and wherein: each first group, further includes a corresponding one of the parity encoders; and for each first group, the parity encoder is configured to encode corresponding ones of the parity bits based on the corresponding first bits.

In some embodiments, for each first group, the first bit-error detector includes an exclusive OR (XOR) gate configured to receive the first bits and the parity bits as inputs and generate an output signal based thereon which represents a first flag signal that is assertable to indicate that a bit-error exists.

In some embodiments, the CIM system further includes: locus-inferable data generator configured to generate one or more bit-error locus-inferable signals based on the parity bits.

In some embodiments, for each first group: the first bit-error detector is further configured to generate an output signal which represents a first flag signal that is assertable to indicate that a bit-error exists; the first array is arranged in rows and Q columns, where Q is a positive integer; there are Q first groups and corresponding Q instances of the first flag signal; the locus-inferable data generator is configured to receive the Q instances of the first flag signal and includes a Q: P encoder configured to encode the Q instances of the first flag signal into a P bit signal which represents an error pointer, the error pointer being a first one of the one or more bit-error locus-inferable signals, and P being a positive integer, and a second bit-error detector configured to generate a second flag signal based on the Q instances of the first flag signal, the second flag signal being assertable to indicate that the error pointer is pointing to the bit-error, and the second flag signal being a second one of the one or more bit-error locus-inferable signals.

In some embodiments, the second bit-error detector includes: an OR gate configured to receive the Q instances of the first flag signal and generate an output signal based thereon which represents the second flag signal.

In some embodiments, the CIM system further includes a bit-error corrector configured to determine a corresponding one of the memory cells in a corresponding one of the first arrays as a data-corrupted cell which represents a location of the bit error based on the error pointer and the second flag signal.

In some embodiments, a method (of operating a compute-in-memory memory (CIM) system) including: the CIM system including first components thereof in a first region of a semiconductor die, the first components including memory cells correspondingly configured to store single bits and arranged in an array, an array of multipliers and first bit-error detectors, first ones of the memory cells being arranged in a first array and being configured to store first bits, second ones of the memory cells being arranged in a second array and being configured to store parity bits corresponding to the first bits: performing multiplication of input bits and corresponding ones of the first bits; and performing first error-detection of a bit-error in the corresponding first bits based on the corresponding parity bits, the performing first error-detection being executed in parallel with the multiplication.

In some embodiments, the method further includes, for each first group, the performing first error-detection includes: performing a logical exclusive OR (XOR) operation on the first bits and the parity bits as inputs to generate a first flag signal which is assertable to indicate that a bit-error exists.

In some embodiments, the method further includes, for each first group, generating one or more bit-error locus-inferable signals based on the parity bits.

In some embodiments, for each first group, the performing first error-detection includes: generating a first flag signal which is assertable to indicate that a bit-error exists; the first array is arranged in rows and Q columns, where Q is a positive integer; there are Q first groups and corresponding Q instances of the first flag signal; for each first group, the generating one or more bit-error locus-inferable signals includes performing a Q: P encodation by encoding the Q instances of the first flag signal into a P bit signal which represents an error pointer, the error pointer being a first one of the one or more bit-error locus-inferable signals; and P being a positive integer, and performing second error-detection to generate a second flag signal based on the Q instances of the first flag signal, the second flag signal being assertable to indicate that the error pointer is pointing to the bit-error, and the second flag signal being a second one of the one or more bit-error locus-inferable signals.

In some embodiments, for each first group, the performing second error-detection includes: performing a logical OR operation on the Q instances of the first flag signal to generate an output signal based thereon which represents the second flag signal.

In some embodiments, a compute-in-memory memory (CIM) system includes: in a first region of a semiconductor die, first components including memory cells correspondingly configured to store words, multipliers and a locus-inferable data generator; first ones of the memory cells being arranged in first arrays and being configured to store first words; for first groups each of which including a corresponding one of each of the first arrays, and the multipliers, and the locus-inferable data generator, and each of the first groups operating in relation to corresponding ones of the first words, the multiplier being configured to generate the first words of the first array by performing one or more multiplications of (A) input words and associated first checksum words and (B) corresponding weight words and associated second checksum words, and the locus-inferable data generator being configured to perform generation of one or more bit-error locus-inferable signals based on selected ones of the first words.

In some embodiments, for each first group: the first array is arranged in first rows and first columns, the first words being correspondingly at intersections of the first rows and first columns; the first words represent product words; and for each of the first groups, the locus-inferable data generator includes: a row sum generator configured to generate a row sum based on the product words.

In some embodiments, for each first group, the row sum is row vector comprised of second words; and the row sum generator includes: recursive adders corresponding to the first columns in the first array, each recursive adder being configured to generate a corresponding one of the second words in the row sum by column-wise recursively adding the first words in a corresponding one of the first columns.

In some embodiments, for each first group: the first array is arranged in first rows and first columns, the first words being correspondingly at intersections of the first rows and first columns; the first words represent product words; for each of the first groups, the locus-inferable data generator includes: a column sum generator configured to generate a column sum based on the product words.

In some embodiments, for each first group: the column sum is column vector comprised of second words; and the column sum generator includes an adder tree configured to generate the second words of the column sum on a row-by-row basis by adding the first words in a corresponding one of the first rows.

In some embodiments, for each first group: the locus-inferable data generator is further configured to perform the generation of one or more bit-error locus-inferable signals subsequently to the one or more multiplications performed by the multiplier.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A compute-in-memory memory (CIM) system comprising:
   in a first region of a semiconductor die, first components including memory cells correspondingly configured to store single bits (first bits), and alpha arrays including multipliers and first bit-error detectors;
   first ones of the memory cells being arranged in corresponding first arrays and being configured to store first bits;
   second ones of the memory cells being arranged in corresponding second arrays and being configured to store parity bits corresponding to the first bits; and
   for first groups each of which including a corresponding one of the first arrays, the second arrays, the multipliers and the first bit-error detectors,
      the multiplier being configured to perform a multiplication of input bits and corresponding ones of the first bits, and
      the first bit-error detector being configured to perform a detection of a bit-error in the corresponding first bits based on the corresponding parity bits, the detection of the bit-error by the first bit-error detector being performed in parallel with the multiplication performed by the multiplier.

2. The CIM system of claim 1, wherein:
   the alpha arrays of multipliers and first bit-error detectors correspondingly further include:
   multiplexers; and
   each first group further includes a corresponding one of the multiplexers; and
   for each first group,
      the multiplexer is configured to select (i) a product produced by the multiplier or (ii) a predefined value based on an output signal generated by the first bit-error detector.

3. The CIM system of claim 2, wherein:
   the CIM system is configured to perform localization of the bit-error after the detection of the bit-error is performed.

4. The CIM system of claim 1, further comprising:
   parity encoders; and
   wherein:
      each first group, further includes a corresponding one of the parity encoders; and
      for each first group,
         the parity encoder is configured to encode corresponding ones of the parity bits based on the corresponding first bits.

5. The CIM system of claim 1, wherein:
   for each first group,
      the first bit-error detector includes an exclusive OR (XOR) gate configured to receive the first bits and the parity bits as inputs and generate an output signal based thereon which represents a first flag signal that is assertable to indicate that a bit-error exists.

6. The CIM system of claim 1, further comprising:
   a locus-inferable data generator configured to generate one or more bit-error locus-inferable signals based on the parity bits.

7. The CIM system of claim 6, wherein for each first group:
   the first bit-error detector is further configured to generate an output signal which represents a first flag signal that is assertable to indicate that a bit-error exists;
   the first array is arranged in rows and Q columns, where Q is a positive integer;

there are Q first groups and corresponding Q instances of the first flag signal;

the locus-inferable data generator is configured to receive the Q instances of the first flag signal and includes:

a Q:P encoder configured to encode the Q instances of the first flag signal into a P bit signal which represents an error pointer, the error pointer being a first one of the one or more bit-error locus-inferable signals, and P being a positive integer; and a second bit-error detector configured to generate a second flag signal based on the Q instances of the first flag signal, the second flag signal being assertable to indicate that the error pointer is pointing to the bit-error, and the second flag signal being a second one of the one or more bit-error locus-inferable signals.

8. The CIM system of claim 7, wherein the second bit-error detector includes:

an OR gate configured to receive the Q instances of the first flag signal and generate an output signal based thereon which represents the second flag signal.

9. The CIM system of claim 7, further comprising:

a bit-error corrector configured to determine a corresponding one of the memory cells in a corresponding one of the first arrays as a data-corrupted cell which represents a location of the bit-error based on the error pointer and the second flag signal.

10. A method of operating a compute-in-memory memory (CIM) system, the CIM system including alpha arrays including multipliers and first bit-error detectors, the method comprising:

for first groups each of which including a corresponding one of the multipliers and a corresponding one of the first bit-error detectors, the CIM system including first components thereof in a first region of a semiconductor die, the first components including memory cells correspondingly configured to store single bits (first bits) and arranged in a memory array, first ones of the memory cells being arranged in a first array and being configured to store first bits, second ones of the memory cells being arranged in a second array and being configured to store parity bits corresponding to the first bits:

performing multiplication of input bits and corresponding ones of the first bits; and performing first error-detection of a bit-error in the corresponding first bits based on the corresponding parity bits, the performing first error-detection being executed in parallel with the multiplication.

11. The method of claim 10, wherein for each first group:

the performing first error-detection includes:

performing a logical exclusive OR (XOR) operation on the first bits and the parity bits as inputs to generate a first flag signal which is assertable to indicate that a bit-error exists.

12. The method of claim 10, further comprising:

for each first group, generating one or more bit-error locus-inferable signals based on the parity bits.

13. The method of claim 12, wherein:

for each first group, the performing first error-detection includes:

generating a first flag signal which is assertable to indicate that a bit-error exists;

the first array is arranged in rows and Q columns, where Q is a positive integer;

there are Q first groups and corresponding Q instances of the first flag signal;

for each first group, the generating one or more bit-error locus-inferable signals includes:

performing a Q:P encodation by encoding the Q instances of the first flag signal into a P bit signal which represents an error pointer, the error pointer being a first one of the one or more bit-error locus-inferable signals; and P being a positive integer; and performing second error-detection to generate a second flag signal based on the Q instances of the first flag signal, the second flag signal being assertable to indicate that the error pointer is pointing to the bit-error, and the second flag signal being a second one of the one or more bit-error locus-inferable signals.

14. The method of claim 13, wherein:

for each first group, the performing second error-detection includes:

performing a logical OR operation on the Q instances of the first flag signal to generate an output signal based thereon which represents the second flag signal.

15. A compute-in-memory memory (CIM) system comprising:

in a first region of a semiconductor die, first components including memory cells correspondingly configured to store words, multipliers and a locus-inferable data generator;

first ones of the memory cells being arranged in first arrays and being configured to store first words;

for first groups each of which including a corresponding one of each of the first arrays, and the multipliers, and the locus-inferable data generator, and each of the first groups operating in relation to corresponding ones of the first words, the multiplier being configured to generate the first words of the first array by performing one or more multiplications of (A) input words and associated first checksum words and (B) corresponding weight words and associated second checksum words, and the locus-inferable data generator being configured to perform generation of one or more bit-error locus-inferable signals based on selected ones of the first words.

16. The CIM system of claim 15, wherein for each first group:

the first array is arranged in first rows and first columns, the first words being correspondingly at intersections of the first rows and first columns;

the first words represent product words; and for each of the first groups, the locus-inferable data generator includes:

a row sum generator configured to generate a row sum based on the product words.

17. The CIM system of claim 16, wherein for each first group:

the row sum is row vector comprised of second words; and the row sum generator includes:

recursive adders corresponding to the first columns in the first array, each recursive adder being configured to generate a corresponding one of the second words in the row sum by column-wise recursively adding the first words in a corresponding one of the first columns.

18. The CIM system of claim 15, wherein for each first group:

the first array is arranged in first rows and first columns, the first words being correspondingly at intersections of the first rows and first columns;

the first words represent product words; and for each of the first groups, the locus-inferable data generator includes:

a column sum generator configured to generate a column sum based on the product words.

19. The CIM system of claim 18, wherein for each first group:

the column sum is column vector comprised of second words; and the column sum generator includes:

an adder tree configured to generate the second words of the column sum on a row-by-row basis by adding the first words in a corresponding one of the first rows.

20. The CIM system of claim 15, wherein for each first group:

the locus-inferable data generator is further configured to perform the generation of one or more bit-error locus-inferable signals subsequently to the one or more multiplications performed correspondingly by the multipliers.

* * * * *